United States Patent
Tucker et al.

(10) Patent No.: US 10,563,945 B2
(45) Date of Patent: Feb. 18, 2020

(54) MULTIPURPOSE SECURING SYSTEMS, KITS AND METHODOLOGIES

(71) Applicant: Evergreen Asset Management, LLC, St. Paul, MN (US)

(72) Inventors: David Sumner Tucker, Bloomington, MN (US); Jerry Dean Boggess, Wesley Chapel, FL (US)

(73) Assignee: Evergreen Asset Management, LLC, St. Paul, MN (US)

( * ) Notice: Subject to any disclaimer, the term of this patent is extended or adjusted under 35 U.S.C. 154(b) by 0 days.

(21) Appl. No.: 15/673,074

(22) Filed: Aug. 9, 2017

(65) Prior Publication Data

US 2017/0370671 A1    Dec. 28, 2017

Related U.S. Application Data

(63) Continuation of application No. 14/650,822, filed as application No. PCT/US2013/074158 on Dec. 10,
(Continued)

(51) Int. Cl.
*F41A 23/18* (2006.01)
*F41C 33/00* (2006.01)
(Continued)

(52) U.S. Cl.
CPC ............ *F41A 23/18* (2013.01); *F16B 1/00* (2013.01); *F16B 2/22* (2013.01); *F16M 13/02* (2013.01);
(Continued)

(58) Field of Classification Search
CPC .......... F41A 23/18; F41A 23/02; F41A 23/16; F16B 1/00; F16B 2/22; F16B 2001/10035;
(Continued)

(56) References Cited

U.S. PATENT DOCUMENTS

| | | | | |
|---|---|---|---|---|
| 582,086 A | * | 5/1897 | Poole et al. | B62H 3/00 211/22 |
| 2,191,782 A | * | 2/1940 | Valane | A61G 7/05 211/74 |

(Continued)

FOREIGN PATENT DOCUMENTS

| | | |
|---|---|---|
| DE | 94 01 086.2 U1 | 3/1994 |
| DE | 296 23 123 U1 | 4/1998 |

OTHER PUBLICATIONS

USPTO/ISA. PCT Search Report & Opinion—Application No. PCT/US2013/074158 (WO 2014/093363 A1), dated Apr. 25, 2014, 9 pgs.

(Continued)

*Primary Examiner* — Anita M King
(74) *Attorney, Agent, or Firm* — Crawford Maunu PLLC

(57) ABSTRACT

Securing mechanisms are provided for various applications. As consistent with one or more embodiments, first and second securing mechanisms respectively couple to a surface and an object to be secured. The first securing mechanism includes a device interface that secures a first portion of a device, and includes a rigid protrusion having a concave surface and a flexible structure coupled to the rigid protrusion and configured and arranged to flexibly secure the device via the concave surface. A first surface interface mitigates movement of the first securing mechanism and the first portion of the securable device relative to a surface. The second securing mechanism includes a device interface that secures a second portion of the securable device relative to the second securing mechanism, and a second surface interface that mitigates movement of the second securing mechanism and the second portion of the securable device, relative to the surface.

17 Claims, 69 Drawing Sheets

Related U.S. Application Data 2013, now Pat. No. 9,733,036, which is a continuation-in-part of application No. 13/842,524, filed on Mar. 15, 2013, now Pat. No. 9,134,085, and a continuation-in-part of application No. 13/842,685, filed on Mar. 15, 2013, now Pat. No. 8,973,297, and a continuation-in-part of application No. 13/842,886, filed on Mar. 15, 2013, now Pat. No. 9,250,034.

(60) Provisional application No. 61/735,236, filed on Dec. 10, 2012.

(51) Int. Cl.
| | |
|---|---|
| *F16B 1/00* | (2006.01) |
| *F16M 13/02* | (2006.01) |
| *F41A 23/02* | (2006.01) |
| *F41A 23/16* | (2006.01) |
| *F16B 2/22* | (2006.01) |
| *A47B 81/00* | (2006.01) |

(52) U.S. Cl.
CPC ........... *F16M 13/022* (2013.01); *F41A 23/02* (2013.01); *F41A 23/16* (2013.01); *F41C 33/003* (2013.01); *A47B 81/005* (2013.01); *F16B 2001/0035* (2013.01)

(58) Field of Classification Search
CPC .... F16M 13/02; F16M 13/022; F41C 33/003; A47B 81/005
See application file for complete search history.

(56) References Cited

U.S. PATENT DOCUMENTS

| | | | | |
|---|---|---|---|---|
| 2,919,058 | A | * | 12/1959 | Thompson ................ B60R 7/14 211/64 |
| 3,746,177 | A | | 7/1973 | Vilotti |
| 4,144,971 | A | | 3/1979 | Balibrea |
| 4,333,385 | A | | 6/1982 | Culver |
| 4,449,314 | A | | 5/1984 | Sorensen |
| 4,461,385 | A | | 7/1984 | Clouser |
| 4,792,050 | A | | 12/1988 | Allen |
| 4,936,531 | A | | 6/1990 | Bauser |
| 5,078,279 | A | | 1/1992 | Hancock et al. |
| 5,263,592 | A | | 11/1993 | Dingee, Jr. |
| 5,344,032 | A | * | 9/1994 | Ramsdell ............. A47B 81/005 211/64 |
| D357,802 | S | * | 5/1995 | Todd ........................... D22/107 |
| 5,495,969 | A | | 3/1996 | Cardenas |
| 5,626,379 | A | | 5/1997 | Scott |
| 5,680,939 | A | | 10/1997 | Oliver |
| 5,791,499 | A | | 8/1998 | Zebbedies |
| 5,915,572 | A | * | 6/1999 | Hancock ............. A47B 81/005 211/64 |
| 6,042,080 | A | | 3/2000 | Shepherd et al. |
| 6,155,523 | A | | 12/2000 | Pitre |
| 6,637,707 | B1 | | 10/2003 | Gates et al. |
| 6,695,183 | B2 | * | 2/2004 | Hancock ................ B60R 11/00 211/64 |
| 6,793,184 | B2 | | 9/2004 | Dougal et al. |
| 6,863,187 | B1 | | 3/2005 | Robertson |
| 6,902,089 | B2 | * | 6/2005 | Carnevali ................ B60R 7/14 224/401 |
| 6,929,223 | B2 | * | 8/2005 | Hancock ................ B60R 11/00 211/64 |
| 7,100,808 | B2 | * | 9/2006 | Hancock ................... F16L 3/10 224/547 |
| 7,165,750 | B2 | | 1/2007 | McCuskey et al. |
| 7,774,972 | B2 | | 8/2010 | Potterfield et al. |
| 8,096,077 | B1 | | 1/2012 | Caywood |
| 8,109,028 | B2 | | 2/2012 | Roberts et al. |
| 8,266,835 | B2 | | 9/2012 | Pintar et al. |
| 8,296,988 | B2 | | 10/2012 | Yale et al. |
| 8,403,278 | B1 | | 3/2013 | Kasbohm |
| 8,973,297 | B2 | | 3/2015 | Boggess et al. |
| 2002/0096610 | A1 | * | 7/2002 | Fernandez ................ G09F 7/18 248/218.4 |
| 2003/0150972 | A1 | | 8/2003 | Murray et al. |
| 2005/0115137 | A1 | | 6/2005 | Minneman |
| 2005/0133473 | A1 | | 6/2005 | Lesperance |
| 2005/0145585 | A1 | | 7/2005 | Pintar |
| 2005/0167378 | A1 | | 8/2005 | Scott, Jr. |
| 2006/0243686 | A1 | | 11/2006 | Grayson |
| 2007/0000851 | A1 | | 1/2007 | Matzick |
| 2008/0127815 | A1 | | 6/2008 | Yale et al. |
| 2010/0012691 | A1 | | 1/2010 | Hyle |
| 2010/0102184 | A1 | | 4/2010 | Gorsuch et al. |
| 2010/0236125 | A1 | | 9/2010 | Morrow et al. |
| 2011/0167705 | A1 | | 7/2011 | Cauley et al. |
| 2011/0168649 | A1 | | 7/2011 | Stolz |
| 2012/0193254 | A1 | * | 8/2012 | Kubiniec ............. A47B 81/005 206/317 |
| 2012/0246900 | A1 | | 10/2012 | Shimmel et al. |
| 2013/0269509 | A1 | | 10/2013 | Irwin |

OTHER PUBLICATIONS

Magnetic Gun Caddy™ (www.magnetguncaddy.com) 2009-2013 (retrieved Jun. 17, 2013), 2 pgs.
StickimUp Gun Magnets, Crime Intervention Devices Corp. LLC (www.stickimupgunmagnets.com), retrieved Dec. 5, 2013, 5 pgs.
Magnetic Barrel Rest (www.battenfeldtechnologies.com), retrieved Dec. 5, 2013, 3 pgs.
FastRak—Magnetic Gun and Fishing Pole Holder, The Outdoor Connection, Inc. (www.outdoorconnection.com), retrieved Dec. 5, 2013, 4 pgs.
Barrel and Rod Safe, Hunter's Specialties, Inc. (www.hunterspec.com), retrieved Dec. 2013, 4 pgs.
CIPO. Office Action dated Sep. 27, 2019, for related counterpart Canadian Patent Application No. 2,894,524, 9 pages.

\* cited by examiner

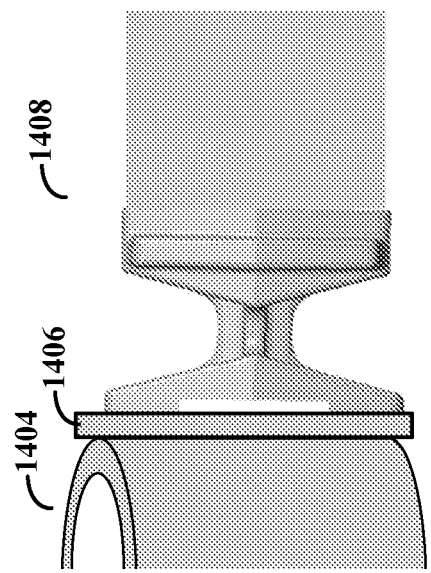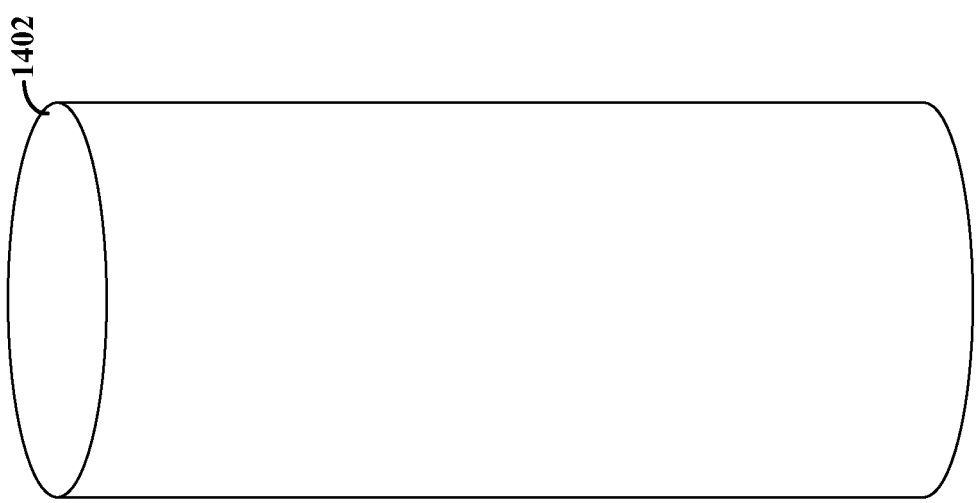
FIG. 14

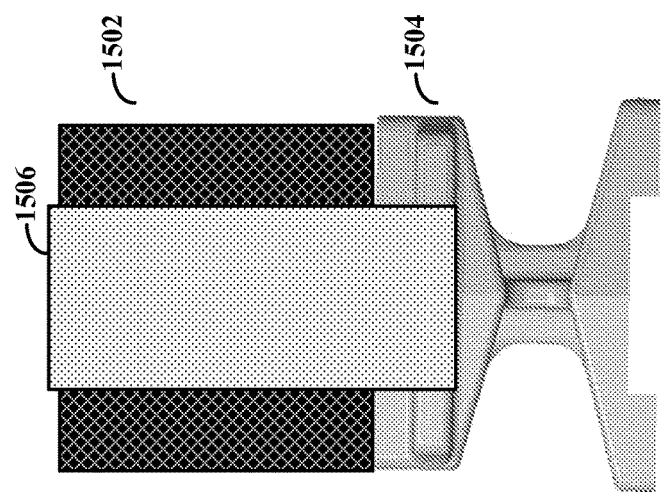
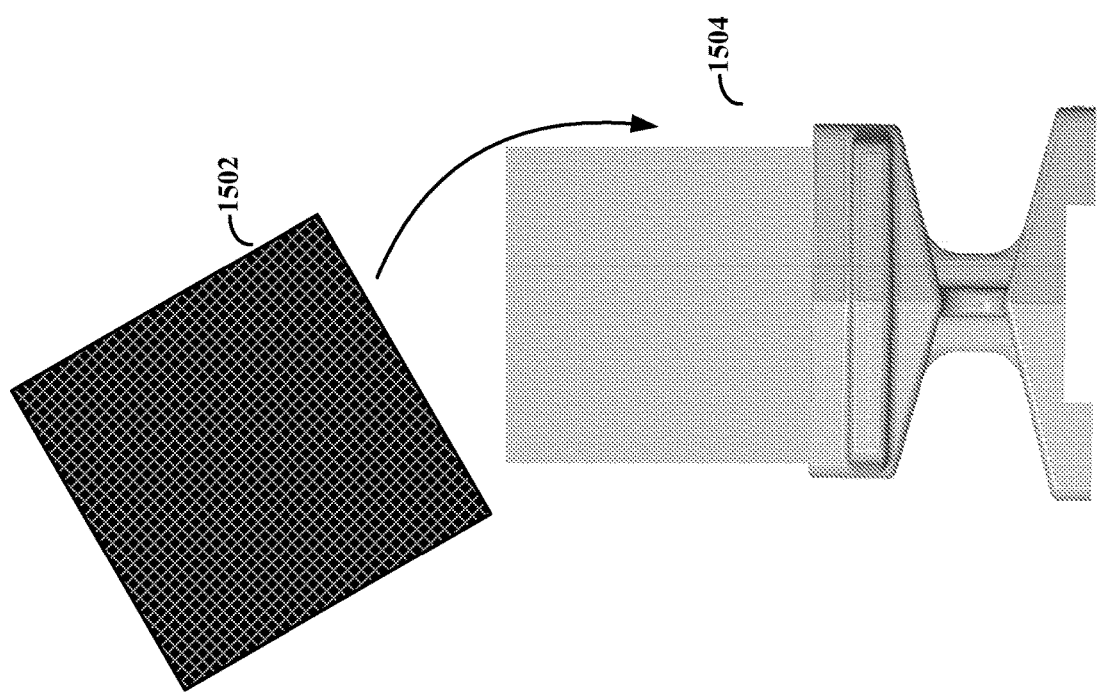
FIG. 15A
FIG. 15B

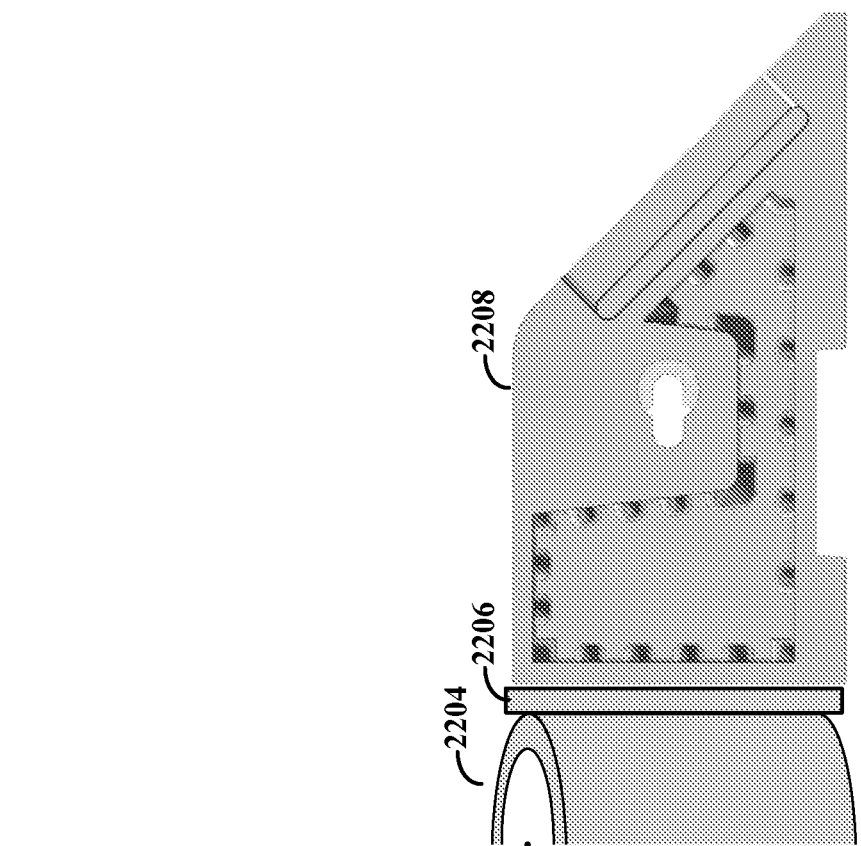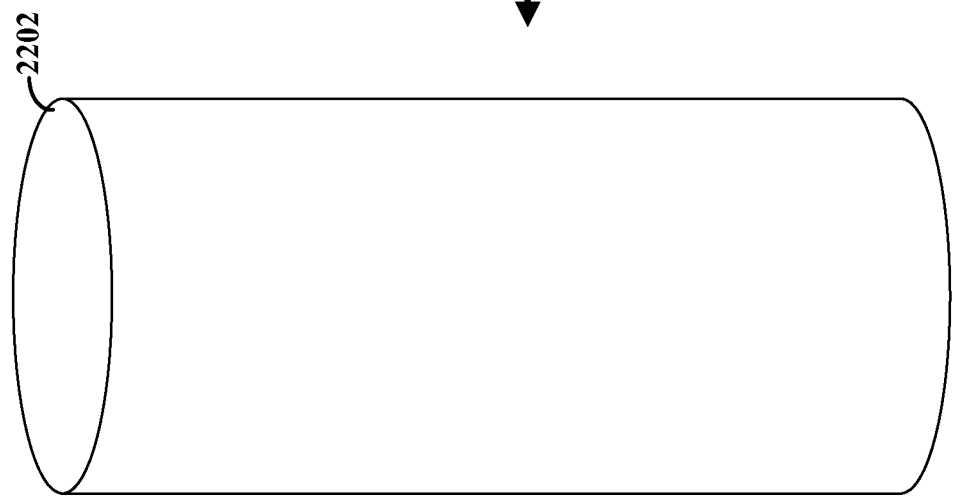
FIG. 22

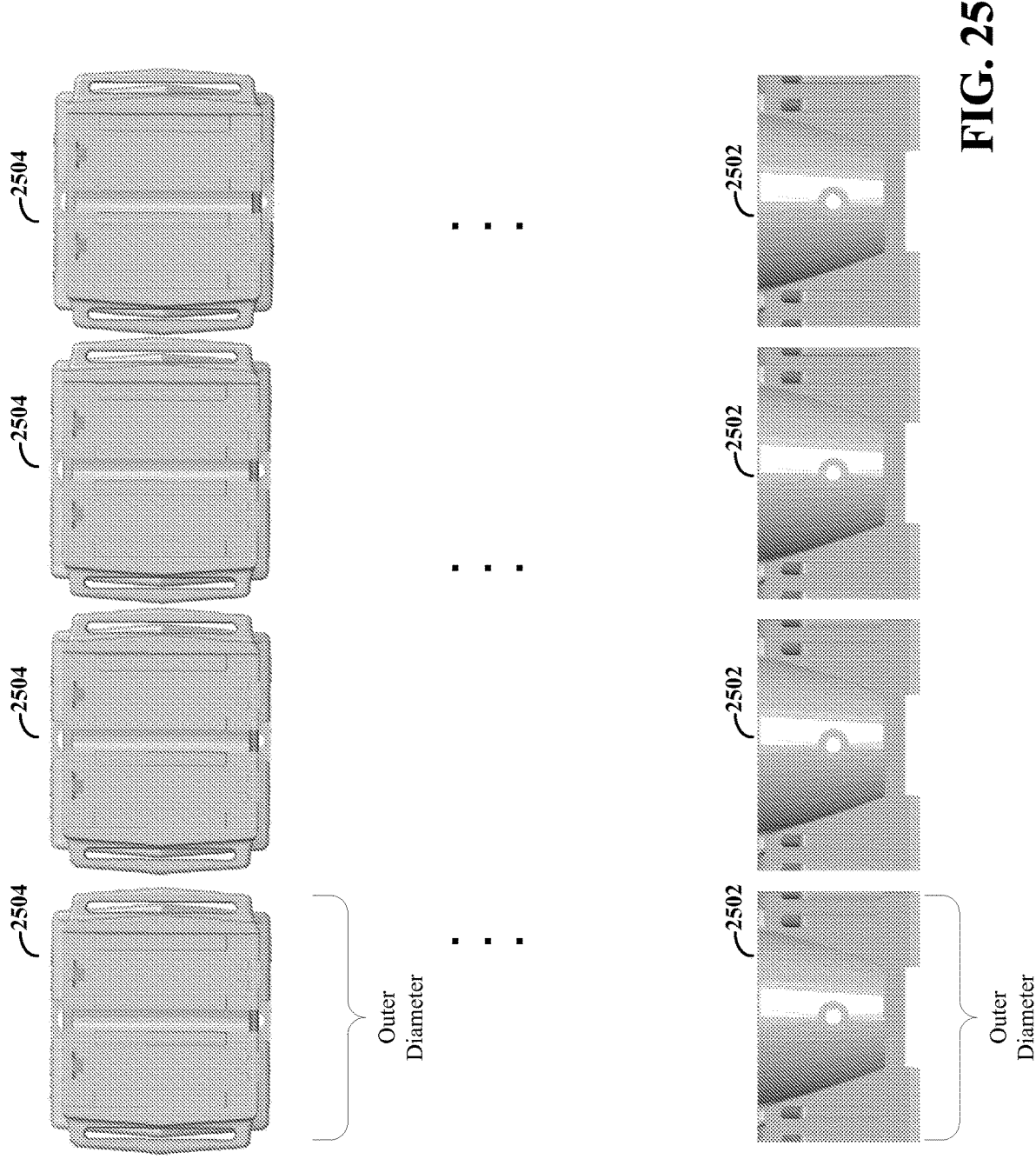

MULTIPURPOSE SECURING SYSTEMS, KITS AND METHODOLOGIES

BACKGROUND

Various approaches to securing items such as firearms, tools, sporting gear and others have been challenging to implement for a variety of applications. For instance, in various military and sporting applications, such items are desirably secured in vehicles or in temporary locations having varied and often unpredictable characteristics. With regard to vehicles, motion can be challenging to address with regard to securing items, particularly over rough terrain or water travel, and in military applications subject to conditions such as projectile impact and explosions.

Securing objects such as firearms can be particularly challenging. For example, long guns have extended lengths and are designed to be fired while braced against the shoulder. This feature along with the longer barrel and easier stabilization can increase accuracy for a shooter. The additional length, however, can make long guns difficult to carry and store. For instance, long guns can be particularly problematic when performing work in tight quarters, such as military personnel performing day-to-day activities on a naval vessel, in vehicles, aboard aircraft or even in the field. Improper storage can result in the weapons falling to the ground, striking other objects or even banging into other weapons. This can cause bent barrels, broken sights and instability of the optics, which can render the weapon unusable, inaccurate, and even unsafe. Moreover, a fallen weapon can be more difficult to retrieve, which may slow down a soldier when time may be of critical importance.

Permanently affixed storage weapon lockers and weapon racks offer adequate solutions for storing long guns. While such solutions can be useful, they require time and effort to install, and possibly prior knowledge of appropriate and effective storage locations. This is often less than ideal. For instance, soldiers may find the need to set down their weapons in unanticipated locations. Moreover, permanent solutions in multiple locations can be costly, take up valuable space and add unnecessary weight when placed on the vessels.

Soldiers also have a need to sight-in their weapons periodically. Resting the weapon barrel on a stable object can facilitate this action; however, a hard surface can damage the barrel. Accordingly, it can be difficult to find a suitable location and setup for sighting in the weapon.

For tools and sporting items such as fishing rods, securing items can also be challenging to implement for a variety of applications. For instance, it can be difficult to safely and securely store tools or sporting goods in environments subject to shaking or jarring, such as on an all-terrain vehicle navigating difficult terrain, or in a boat navigating rough waters. Further, storing such items can be challenging and/or expensive to implement. In addition, various approaches to storing items have been inflexible in nature, expensive and generally inflexible in application.

For military applications, improperly secured items can also present danger when subjected to adverse environments. For instance, while maintaining weapons or tools in a readily-accessible manner is important, such items can become projectiles/shrapnel upon impact of a vehicle or weapon, or explosion.

These and other matters have presented challenges to securing, storing and using items such as weapons, tools and sporting goods, among others, for a variety of applications.

SUMMARY

Aspects of the present disclosure relate to multipurpose solutions for securing items and addressing challenges, such as those discussed above. Certain aspects relate to securing tools or sporting goods. Specific aspects are directed to securing long arms and to solutions with particular usefulness in military environments. Certain aspects relate to various uses stemming from firearms being secured during activities, such as sighting, maintenance, cleaning or other acts. Various aspects of the present disclosure are accordingly directed to multipurpose securing systems, kits and methods of using, that address challenges including those discussed herein, and that are applicable to a variety of applications. These and other aspects of the present disclosure are exemplified in a number of implementations and applications, some of which are shown in the figures and characterized in the claims section that follows.

In accordance with one or more other embodiments, an apparatus includes a securing mechanism including a device interface and a surface interface. The device interface secures a securable device relative to the first securing mechanism, and has a rigid protrusion with a concave surface and a flexible structure coupled to the rigid protrusion. The flexible structure flexibly secures the securable device to the first securing mechanism via the concave surface. The surface interface is connected to the first device interface and, therewith, mitigates movement of the first securing mechanism and the securable device relative to a surface, by interfacing with the surface. A second securing mechanism includes another device interface that secures a different portion of the securable device relative to the second securing mechanism, and another surface interface that mitigates movement of the second securing mechanism and the second portion of the securable device, relative to the surface via an interface with the surface, With such approaches, objects such as weapons, tools and sporting goods can be secured to various surfaces (e.g., walls, ceilings and inclined surfaces), and under various conditions including those susceptible to shock.

Particular embodiments of the present disclosure are directed toward a multipurpose system for securing weapons such as small arms. The system can be specially configured with a number of features, some of which can be particularly useful for military applications.

Consistent with various embodiments, a firearm securing kit includes a barrel securing unit configured and arranged to secure a barrel of a firearm and including a securing mechanism configured and arranged to generate a holding force between the apparatus and a surface in response to an applied pressure. The kit can also include a butt plate securing unit configured and arranged to secure the butt plate of a firearm and including a securing mechanism configured and arranged to generate a holding force between the apparatus and a surface in response to an applied pressure.

Consistent with other embodiments, a method involves the use of a firearm securing system. A barrel securing unit is attached to a first surface, while a butt plate securing unit is attached to a second surface. The barrel of a firearm is secured using the attached barrel securing unit. A butt plate of the firearm is also secured using the attached butt plate securing unit. The firearm can then be removed from the butt plate securing unit. The barrel securing unit can be removed from the first surface (whether still securing the barrel or not). The barrel securing unit is then attached to a third surface. The barrel of the firearm is then (re)secured using barrel securing unit as attached to the third surface.

Other embodiments relate to manufacturing and uses of such multipurpose systems and devices.

The above summary is not intended to describe each illustrated embodiment or every implementation of the present disclosure.

BRIEF DESCRIPTION OF THE DRAWINGS

The disclosure may be more completely understood by considering the following detailed description of various embodiments of the disclosure in connection with the accompanying drawings, which are consistent with the various embodiments of the present disclosure as follows:

FIG. 14 depicts an MPWH with a non-planar attachment surface, consistent with embodiments of the present disclosure;

FIGS. 15A and 15B depict a protective cap for placement over the deformable portions when not in use, consistent with embodiments of the present disclosure;

FIG. 22 depicts an MPBPH with a non-planar attachment surface, consistent with embodiments of the present disclosure;

FIG. 25 depicts a plurality of MPWH and MPWBH devices used together, consistent with embodiments of the present disclosure;

Figure 1:
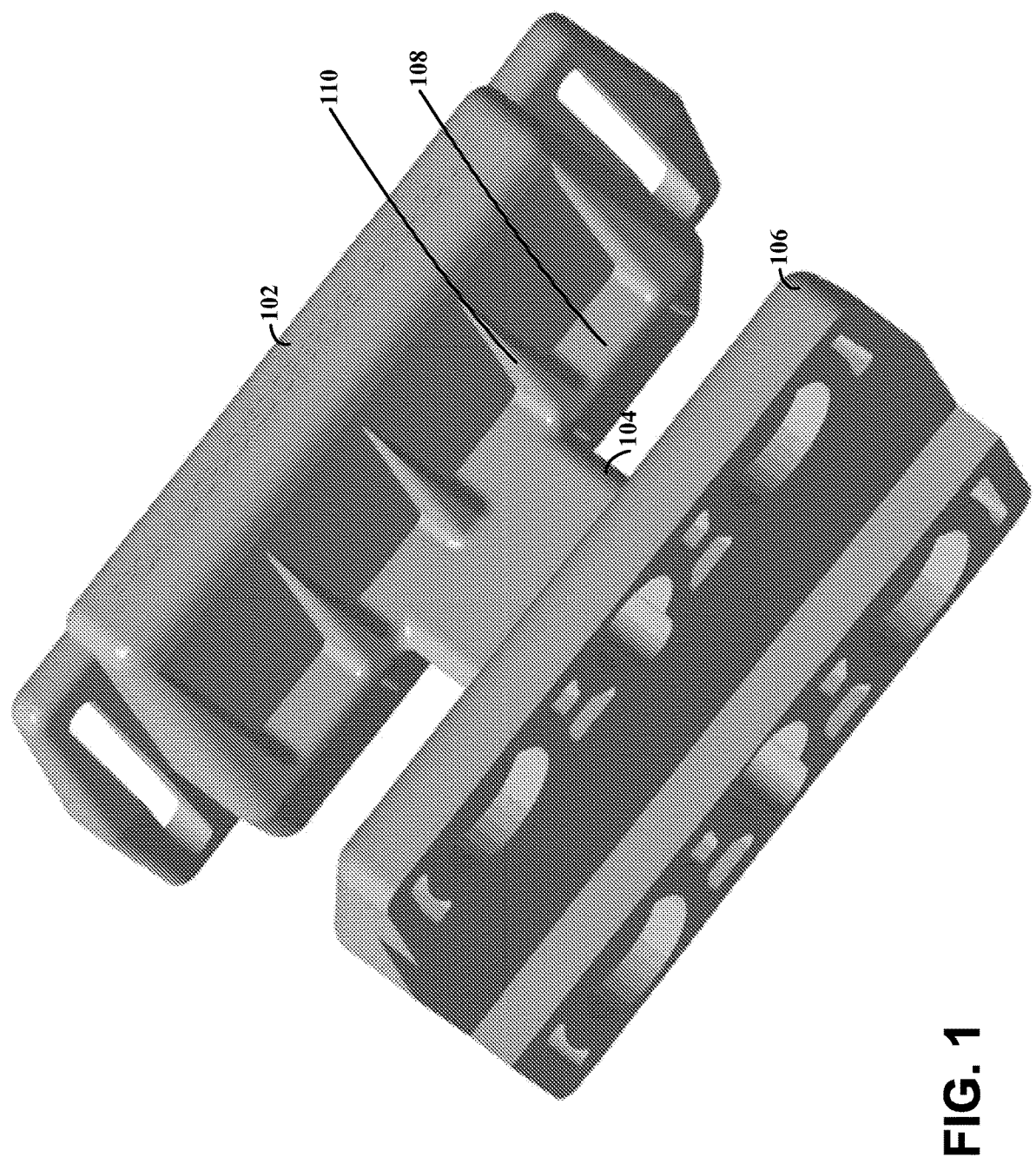
FIG. 1 depicts an experimental embodiment of a Multi-Purpose Weapon Holder ("MPWH") that includes an injection molded unit with two platforms (upper & lower) and a connecting unit between the platforms, consistent with embodiments of the present disclosure.

While the disclosure is amenable to various modifications and alternative forms, specifics of the disclosure are shown by way of example in the drawings and will be described in detail. It should be understood, however, that the disclosure is not necessarily limited to the particular embodiments described. On the contrary, the intention is to cover all modifications, equivalents, and alternatives falling within the spirit and scope of the disclosure.

DETAILED DESCRIPTION

Aspects of the present disclosure are directed to multi-purpose systems and kits for securing small arms and to related approaches, uses and systems. While the present disclosure is not necessarily limited to such applications, various aspects of the disclosure may be appreciated through a discussion of various examples.

Certain aspects of the present disclosure are directed toward a system that allows objects such as sporting goods, weapons and others to be secured to a variety of different surfaces. Particular embodiments include multiple securing units and accessory components that, together, allow the device to be relocated and reused in a variety of different locations having different attachment surfaces. Certain aspects are particularly applicable to military applications and uses.

As discussed herein, various embodiments are directed to a system having two or more securing units, a multi-purpose holding device (MPHD) with specific applications such as a multi-purpose weapon (barrel) holder (MPWH) device and a multi-purpose weapon butt holder (MPWBH). Each of these securing units can be used individually; however, two or more such units can be used together as part of a cohesive system. In this context, the discussion of the individual use of components is not meant to be limiting.

In accordance with one or more other embodiments, an apparatus includes two or more securing mechanisms that secure an object to a surface. One of the mechanisms includes a device interface and a surface interface. The device interface secures a securable device relative to the first securing mechanism, and has a rigid protrusion with a concave surface and a flexible structure coupled to the rigid protrusion. The flexible structure flexibly secures the securable device to the first securing mechanism via the concave surface. The surface interface is connected to the first device interface and, therewith, mitigates movement of the first securing mechanism and the securable device relative to a surface, by interfacing with the surface. The second securing mechanism may be implemented in a similar or different manner.

In some implementations, the second securing mechanism includes another device interface that secures a different portion of the securable device relative to the second securing mechanism, and another surface interface that mitigates movement of the second securing mechanism and the second portion of the securable device, relative to the surface via an interface with the surface.

The rigid protrusion may be implemented in one or more of a variety of manners. In some embodiments, the rigid protrusion secures the flexible structure relative to the first device interface in response to forces applied toward and away from the first device interface (e.g., holds an object from being pulled or pushed from the apparatus). In certain embodiments, two or more such rigid protrusions are used, may be aligned relative to one another (e.g., parallel), with the flexible structure coupled to the rigid protrusions. Both protrusions operate to mitigate movement of the object. In some embodiments, the rigid protrusion includes a first rigid portion that protrudes from a surface of the first device interface and a second portion having the concave surface, the first and second portions being secured to one another and providing a securing force to the securable device.

In further embodiments, one such rigid protrusion protrudes along a central portion of a surface of the first device interface, and second and third rigid protrusions extend along an edge portion of the surface and are about parallel with the central portion. For instance, a central portion may engage to hold/secure a portion of an object while the second and third protrusions may operate to secure a fastener or the flexible structure. In certain implementations, such second and third protrusions engage with the flexible structure via one or more lips and corresponding components of the flexible structure.

In another embodiment involving such second and third protrusions, latch regions within the protrusions engage with the flexible structure. The flexible structure has a center portion that engages with the rigid protrusion that protrudes along the central portion of the surface of the first device interface, and at least two flexible arms that extend in different directions and elastically engage with the latch regions upon application of a bending force. Upon release of the bending force, the alms apply an elastic force that secures the center portion to the rigid protrusion, thereby flexibly securing the first portion of the securable device to the first securing mechanism.

In yet another embodiment involving second and third protrusions, each protrusion has sidewalls that extend about parallel to one another, with respective sidewalls of the central protrusion facing a sidewall of each of the second and third protrusions. The flexible structure has a first set of opposing sidewall surfaces that respectively face and engage with facing sidewall surfaces of the central and second rigid protrusions, and a second set of opposing sidewall surfaces that respectively face and engage with facing sidewall surfaces of the central and third rigid protrusions. In some implementations, the flexible structure is separated into two separate structures, each respectively having one of the sets of opposing sidewall surfaces.

The flexible structure is secured using one or more of a variety of approaches. In some implementations, the flexible structure has respective surfaces that engage with the rigid protrusion to mitigate relative movement of the flexible structure both toward and away from a surface from which the rigid protrusion extends. In other implementations, a device interface as discussed above has latch regions therein, and the flexible structure includes a center portion configured and arranged to engage with the rigid protrusion, and at least two flexible arms that engage with the latch regions. The arms respectively extend, in different directions, from the center portion to an end portion, with the end portion of each arm elastically engaging with the latch regions upon application of a bending force. Via the engagement with the latch regions and upon release of the bending force, the arms apply an elastic force that secures the center portion to the rigid protrusion, thereby flexibly securing the first portion of the securable device to the first securing mechanism.

In some embodiments, an object is secured to one or both securing mechanisms as follows. A flexible fastener secures the securable device by extending around a portion of the securable device and applying a force to a surface of the securable device that faces away from the second device interface. With this approach, movement of the securable device can be mitigated in response to a force applied to the securable device in a direction away from the first plane.

Objects secured as described above can be held in response to a variety of forces, in various directions. For instance, sidewalls of a lower platform device can prevent dislodging of an object resting between the sidewalls.

Aspects of the present disclosure are also directed toward a kit that includes multiple components, such as modular components, which can be used together and easily replaced. For instance, the MPHD can be configured and arranged with one or more replaceable deformable (foam) retaining pieces. Moreover, (adhesive-based) strips can be configured and arranged to function as one-half of a reclosable fastening system that can be placed on a variety of different support structures. The MPHR devices can then be fastened to the placed strips.

Further, different components can be replaced or modified to replace damaged components or to change the operation of the system. For instance, the deformable (foam) retaining pieces can be replaced to accommodate different needs in the field. This can include, as non-limiting examples, a different coloring (e.g., for camouflage), a different size (e.g., for different firearms) and or a different stiffness (e.g., for use in different environments).

Certain aspects of the present disclosure are directed toward a MPWH device that allows small arms to be secured to a variety of different surfaces by securing the barrel. This MPWH device can be used alone; however, it can also be used as part of a system and/or kit. Unless otherwise stated, the various aspects of the MPWH device can be used in combination with other components of the systems discussed herein.

Particular embodiments include one or more securing mechanisms that allow a MPHD device to be relocated and reused in a variety of different locations having different attachment surfaces. Certain aspects are particularly applicable to military applications and uses.

Embodiments are directed toward a MPHD device that facilitates aiming of small arms while also securing and providing protection for the barrel. The MPHD device can be configured to allow for the firearm to be canted in different directions so that it can be aimed, while also providing support and stability. A carefully-designed support structure cushions the barrel to help reduce potential damage that can result from the recoil of the firearm.

Consistent with embodiments discussed in more detail herein, a device includes two major faces or platforms. The use of two separate platforms (connected by a thinner support piece) can be useful in a number of different settings. Embodiments of the present disclosure are directed toward uses, improvements and/or supplements for a two-platform structure.

According to certain embodiments, a first platform can be configured to interface with a structure such as a wall. This first platform can include one or more attachment mechanisms for allowing the device to be attached, removed and reattached to different structures and in different positions and locations. Thus, certain embodiments include multiple attachment mechanisms, each of which may be suitable in different situations and for different structures. For example, military personnel may carry a portable MPHD device in order to secure a tool or firearm in a wide variety of locations, and/or in order to stabilize the firearm during use, all with a quick setup time and while allowing a firearm to be seized at a moment's notice.

The attachment mechanisms can include various fasteners, such as magnets. Consistent with these approaches, magnets can be placed in recessed cavities, as shown in several references such as U.S. Pat. No. 6,155,523 (discussing a magnet within a recessed casing) and U.S. Pat. No. 6,793,184 (discussing a magnetic attachment using countersunk magnets and recessed portions), each of which is fully incorporated herein by reference. The use of recessed cavities can facilitate flush placement of the device against a metal surface and/or maintain an air gap between the magnet and the magnetic surface to which the device is attached. While this attachment mechanism has its uses, it has been discovered that other attachment options may be desirable, particularly in certain specialty applications such as military applications, e.g., due to the fact that certain military vessels and vehicles use non-ferromagnetic materials. Accordingly, embodiments are directed toward various types of specialized attachment solutions, which can be used alone or in combination.

The second platform can be configured to include a deformable securing portion. This securing portion can be configured and arranged to allow components of different objects to be secured to the device. For instance, the deformable portion can include a (curved) cavity that is sized and configured to secure the barrel of a firearm. The deformable aspect can form an opening to the cavity that is smaller than the barrel, but that elastically deforms with pressure so as to allow the barrel to traverse the opening. After insertion of the barrel, the deformable portion then returns to its original form, thereby securing the firearm. Particular embodiments of the present disclosure are directed toward a device that includes a deformable portion that provides resistance sufficient to prevent unintentional dislodging of the firearm from the deformable portion by minimal force (e.g., by movement of a vehicle/vessel/aircraft). Moreover, the MPHD can be designed such that the force required to dislodge or remove the object from the MPHD device is less than the force required to remove the MPHD device from a support structure. This arrangement allows a person to use the object (e.g., firearm) without first removing the MPHD device from a support structure. A person wishing to remove or move the MPHD device can do so after removing the firearm and by applying additional force. Thus, the securing mechanism can be configured to provide sufficient holding force to allow the firearm to be removed, but not so much as to prevent or make it difficult for a person to remove the MPHD device from the support structure using the strength in their hands.

Consistent with certain embodiments, a strap can be used to provide additional holding strength. This can be particularly useful when there are significant external forces (e.g., from movement of motor vehicles, aircraft, naval vessels, etc.). Moreover, the MPHD device can also be designed to remain on an object as it is removed from a support structure. For instance, a solider may need to quickly access a firearm or tool that is secured to a wall using magnets (or a reclosable fastener system) on the MPHD. If the strap is employed, the solder can simply grab the object to disengage the magnets from the wall, while leaving the MPHD strapped to the object. This may also be advantageous when the soldier needs to take the firearm to a new location, but simply does not want to take the extra time to remove the MPHD. The light-weight construction and relatively small size of the MPHD can reduce any adverse effects caused by leaving the MPHD on the object. Moreover, as discussed in more detail herein, the MPHD's multiple platform design can be particularly useful for providing a platform to stabilize a firearm during aiming. Thus, there are many situations where it can be desirable to leave the MPHD on the object.

The MPHD can be designed for attachment to a wide variety of different structures. A few non-limiting example structures include walls, floors, ceilings, doors, windows, vehicle panels, trees, rocks, boats, airplanes, wheels, sheds, cabinets, boxes, chairs, tables, desks, armored vehicles, fences, utility poles and more. For ease of discussion, the identification of a particular type of structure (e.g., a wall) will be understood to not be limiting unless otherwise stated.

Particular embodiments of the present disclosure are directed toward the contacting portion of the bottom platform being substantially planar, i.e., the portion that attaches to the support structure. A planar configuration conforms to numerous surfaces, even surfaces that are themselves not perfectly planar. The bottom platform, of other embodiments, has a non-planar interface, an example of which would include a curved interface. This can be particularly useful for attachment of the device to poles and similar objects. Another embodiment can be shaped as an L-bracket, which can be particularly useful when the device is placed at the corners of exterior walls or at the top of a wall, among other places. Other variations of the platform configuration are also possible.

The bottom platform can also be configured to include graspable portion(s) or handle(s) that can be used when securing the MPHD device to a structure and also when removing the MPHD device from the structure. The distance between the two platforms (which is partially defined by the length of the support piece connecting the platforms) can be sufficient to allow a person to grasp the platform and/or graspable portion while the device is flush with a flat surface. This distance can be configured such that a person will have enough leverage to remove the device using only his/her hands. Moreover, space between the platforms can be provided in order to facilitate attachment of the device to a wall or similar structure. This type of configuration can be particularly useful for an adhesive-like securing mechanism that requires a rocking motion and pressure to fully engage.

Consistent with certain embodiments, the MPHD configuration can facilitate canting of a firearm in multiple directions to allow it to be aimed and discharged (e.g., to adjust sights on the firearm or even during combat situations). For instance, the MPHD can facilitate canting of the gun by providing a raised platform that can easily tip backwards and forwards (using a rocking motion), and that can easily be rotated left to right. (With the latter design, the bottom platform is left unattached.) This tipping action can be facilitated by providing sufficient distance between the two platforms, which results from a support piece having suitable length. Further canting can be facilitated through the use of two separate deformable pieces that are designed to allow for some movement of the barrel within the MPHD. In addition, canting can be further facilitated by providing moveable joint(s) between the two platforms. With this design, each platform can move independently from the other platform, at least to the extent allowed by the joint(s).

In certain embodiments of the present disclosure, the device includes a leverage point in the form of an opening or protrusion that allows a tool to be inserted between the device and a wall or other structure. In particular, the leverage point allows the user to dislodge the device from a wall by inserting a lever that provides mechanical force between the wall and the device. For instance, the leverage point can be designed to accommodate readily available equipment, such as a multi-tool or a knife blade. The leverage point can be provided with additional support and/or reinforcement to withstand the force used to remove the device from an attached structure. Such support may include additional thickness in the platform near the leverage point and/or plating the leverage point with a sturdy material, such as metal.

Consistent with various embodiments, the top of the lower platform and the bottom of the upper platform can be ergonomically designed to allow the user to quickly and comfortably engage or disengage the MPHD unit using one or more of the attachment mechanisms, which may include adhesives, interlocking materials (e.g., hook and loop, VEL-CRO (Velcro of Manchester, NH), PaiGrip (Paiho of Valencia, CA) and/or Dual Lock (3M of St. Paul, MN)), magnets or key slots. The open space between platforms permits a firm grip on both platforms and support stem, even when wet. The space between the platforms may also allow for storage of an optional hook and loop strap when not in use.

In certain embodiments, a specially-designed tool can designed into the molded device. For instance, the device can include an integrated extension member that provides additional leverage for removal of the device from a wall or similar structure. In other embodiments, the tool can be provided as a separate item. For instance, the tool can take the form of a curved bar where the curved portion is designed to act as a fulcrum point (against a wall) when one end of the tool is in contact with the leverage point. This bar can be carried separately from the device. In other embodiments, the device can include a holding mechanism for storing the tool when it is not in use. The tool can then be removed and used whenever the device is to be removed from a wall or other structure.

Various experimental devices and related uses are discussed hereafter. These experimental features provide support for numerous different embodiments and are not meant to be limiting.

FIG. 1 depicts a base unit for an embodiment of a Multi-Purpose Weapon Holder ("MPWH") that includes an injection molded unit with two platforms (upper & lower) 102, 106 and a connecting unit 104 between the platforms, consistent with embodiments of the present disclosure. The surface of each platform 102, 106 can be configured with extra support structures to provide additional strength while minimizing weight and material cost. For instance, one or more of the platforms 102, 106 can be configured to include a center stabilizing bar 108 and a series of multiple (e.g., five) buttresses 110 on either side of the stabilizing bar 108. This design can be particularly useful for allowing the MPWH to be both lightweight and strong. Further, while characterized for holding weapons, such approaches can be implemented for holding a variety of objects that may or may not include weapons.

Figure 2:
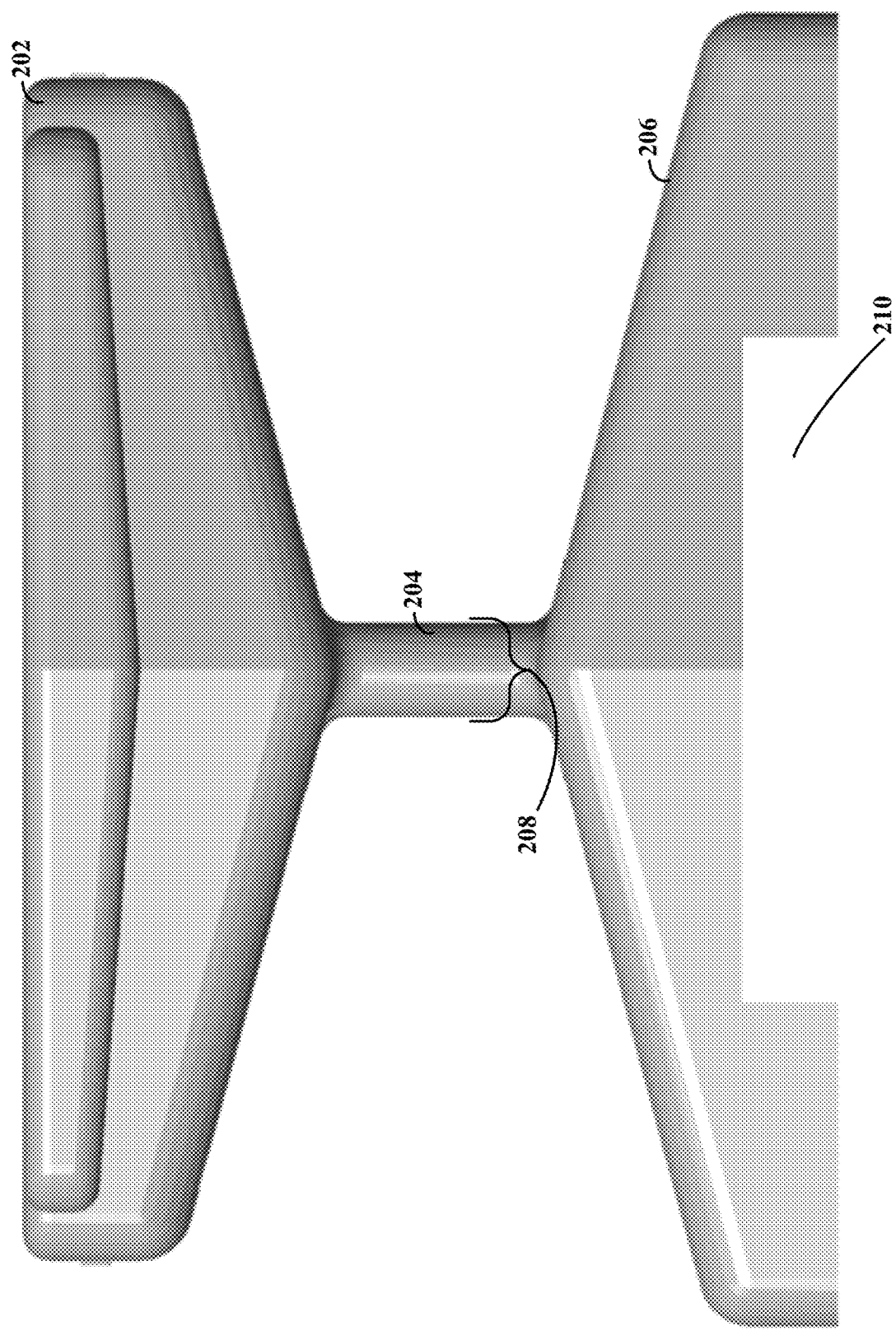
FIG. 2 depicts a side view of the MPWH in which the connecting/support between the platforms is shown, consistent with embodiments of the present disclosure.

FIG. 2 shows a side view of base unit for the MPWH in which the connecting support 204 between the platforms is shown, consistent with embodiments of the present disclosure. The support 204 connects the two platforms 202 and 206. As shown, the support 204 can extend between the two platforms and in the direction not visible in FIG. 2, while being comparatively thin in the visible direction 208. This configuration facilitates gripping of the upper platform 202 while the device is attached to a structure at the lower platform in 206. Moreover, the distance between the two platforms allows leverage to be applied with a rocking motion on the device, which can be useful for both securing the device to the structure and subsequent removal. Channel/slot 210 in the platform in 206 can be filled with an adhesive-like material (e.g., hook and loop, PaiGrip and/or 3M Dual Lock®) to permit attachment of the device to many different types of surfaces.

In certain embodiments, channel 210 is filled with a fastener material (not shown) that interfaces with another opposing material. This fastener material may be reclosable, adhesive-backed, flexible fasteners consisting of continuous fields of plastic stems with mushroom-shaped plastic heads, which tightly interlock when pressed together. For instance, PaiGrip or 3M Dual Lock® can be used as the fastener material. For example, a section of the Dual Lock material can be affixed to a wall at a desired location, while being sized and configured to interface with a corresponding section of the fastener material attached to the device.

Figure 3:
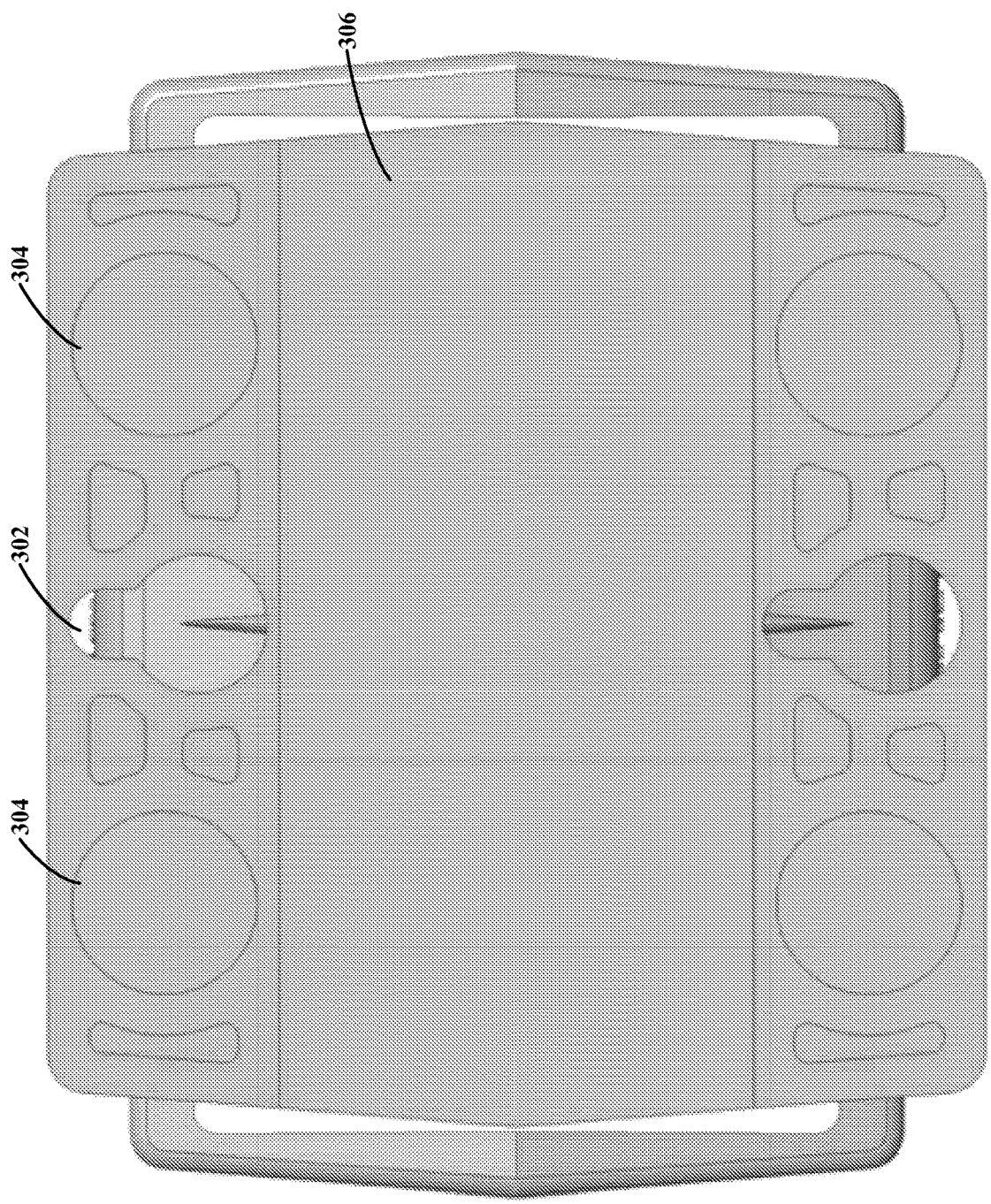
FIG. 3 depicts a view of the underside of the lower platform of the MPWH, consistent with embodiments of the present disclosure.

FIG. 3 shows the underside of the lower platform of the MPWH, consistent with embodiments of the present disclosure. The lower platform can be configured with one or more features designed to provide attachment options for securing the device to a wall or similar structure. As non-limiting examples, the attachment mechanism can include an adhesive-type material (e.g., hook and loop, PaiGrip and/or 3M Dual Lock®), which is placed in a channel 306 that is located in the lower platform. The attachment mechanism can also be configured to adhere in the location of one or more key slots 302. In some instances, magnets can be placed in depressions 304. These attachment mechanisms can be combined with a gripping material, such as a material that is configured to resist shearing forces that are parallel to the support structure (e.g., downward pressure when attached to a wall).

Figure 4:
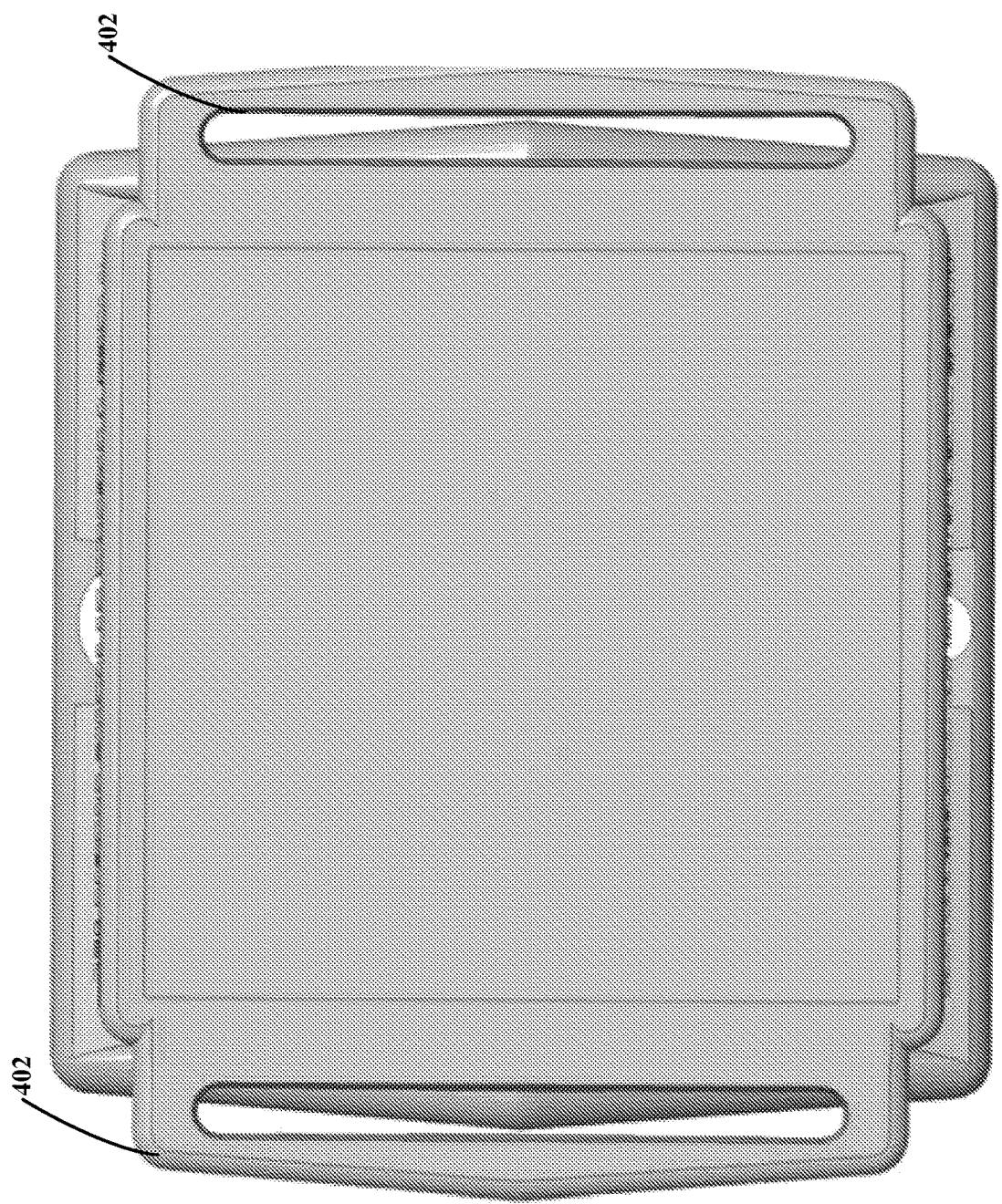
FIG. 4 depicts a top down view of the underside of the upper platform of the MPWH, consistent with embodiments of the present disclosure.

FIG. 4 shows a top down view of the upper platform of the MPWH, consistent with embodiments of the present disclosure. The upper platform can be configured to include extension elements 402 that serve dual purposes: providing a slot for inserting a strap or other attachment mechanism, and providing a graspable structure for the user of the device. In certain embodiments, a strap can be inserted into the slots of extension elements 402. This strap can include a VELCRO strip or a snap that can be used for storing the device when not in use. This can be particularly useful for allowing a soldier to store the device on their clothing or carried equipment. The extension elements 402 can also facilitate attachment and removal of the device from a wall or other structure by providing a graspable extension for applying additional leverage, if necessary.

Figure 5:
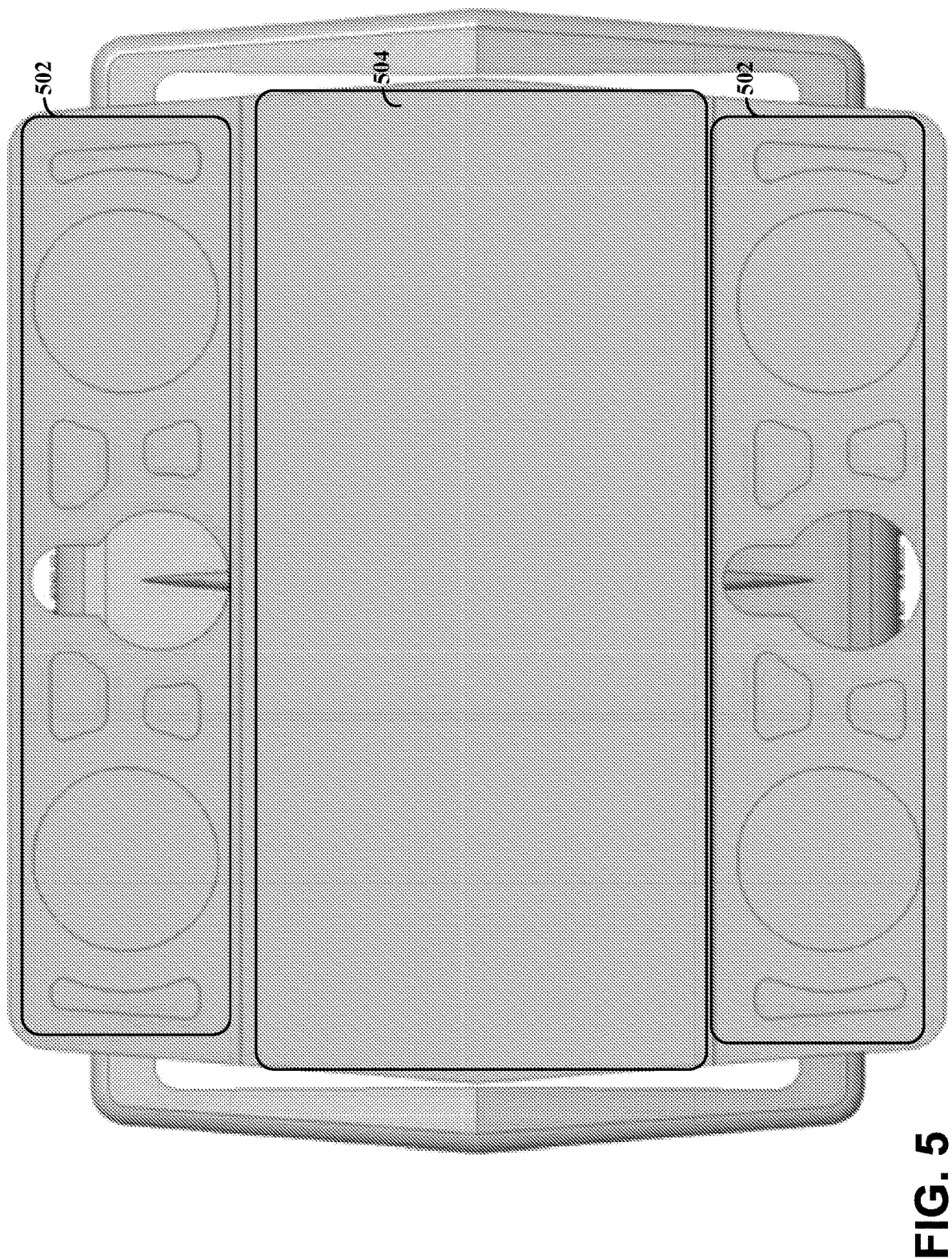
FIG. 5 depicts a top down view of the lower platform of the MPWH with an adhesive-like material and gripping material, consistent with embodiments of the present disclosure.

FIG. 5 shows a view of the bottom side of the lower platform of the MPWH with an adhesive-like material and gripping material, consistent with embodiments of the present disclosure. As shown in FIG. 5, adhesive-like material 504 can be placed in one or more slots. In certain embodiments the adhesive-like material can be a fastener material such as the 3M Dual Lock®. In other embodiments, the adhesive material may be in gel, liquid, foam or cream form, and may be reapplied as necessary. The location and configuration of the gripping material will depend upon the mechanical interface between the material's components. In one instance, the adhesive-like material can be placed in the center of the slot at location 504. The gripping material can be placed at locations 502. Other configurations are possible, including but not limited to, patterning of the gripping material and the adhesive-like material. In addition, various different types of adhesive materials can be used (e.g., the type of adhesive material being customized or tailored depending upon the different types of support structures or substrates). In certain instances, the gripping material can be placed within a recess of the platform. This can be particularly useful in the event that attachment is also provided through the use of one or more magnets that require close contact with a wall or similar structure.

Embodiments of the present disclosure allow for gripping material to be over-molded directly into the platform at locations 502 and 504. This can cover one or more of the recesses so as to provide additional surface area for the gripping material to interface with an attached surface. For example, the over-molding can cover all areas of the platform's surface—other than the locations of the two key slots and/or two magnets in opposite corners of the lower platform.

Consistent with certain embodiments, a directional gripping material can be applied to a lower platform as described herein. This can be particularly useful to ease removal of a device while providing gripping action in the most problematic direction. For instance, the gripping material could be oriented to resist downward movement caused by gravity, while allowing the device to easily slide in an upward direction for its removal from the structure.

Other embodiments of the present disclosure recognize that it may not be desirable to have multiple attachment mechanisms being used concurrently. For instance, if a MPHD is placed on a ferromagnetic wall, the combination of a magnet coupled with an adhesive, may require a detachment force that exceeds the desired range (e.g., relative to human hand strength). Accordingly, certain embodiments of the present disclosure permit the user to temporarily disable one or more attachment mechanisms. As a non-limiting example, a thin (plastic) covering piece can be provided to cover the adhesive portion of the MPHD device. The covering piece can prevent the adhesive from sticking to a wall or similar structure, while still allowing another attachment mechanism, such as magnets, to operate as the primary attachment mechanism. The covering piece can also protect the adhesive portion from exposure to dirt or other contaminants which might be on the wall or in the air. The covering piece may also protect the adhesive portion from damage or wear while the MPHD is not in use. In one instance, this covering piece can be held in place by the adhesive portion itself. In other instances, the covering piece can snap or slide into place.

Figure 6:
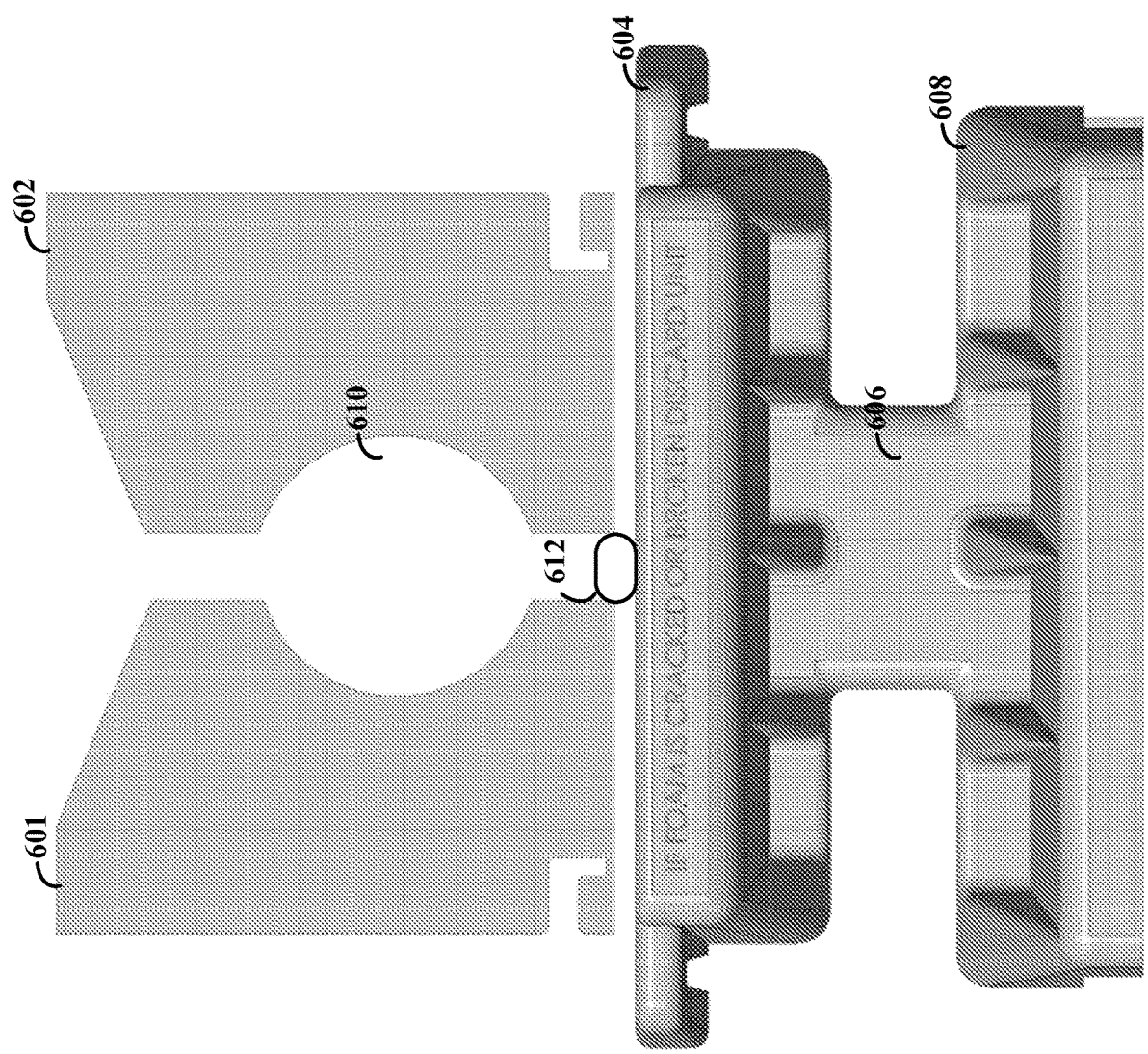
FIG. 6 depicts a front view of the MPWH in which a deformable component is attached to the upper platform, consistent with embodiments of the present disclosure.

FIG. 6 depicts a front view in which a deformable component is attached to an upper platform, consistent with embodiments of the present disclosure. FIG. 6 depicts elastically deformable components 601, 602 attached to the upper platform 604 of a MPHD device. The MPHD device can be attached to a wall or similar structure using attachment options located on the lower platform 608. Support unit 606 connects the two platforms.

Together, deformable components 601, 602 form a cavity 610 that is designed to secure an object such as by securing the barrel of a firearm. For instance, an example dimension of about 0.75 inches diameter may be suitable for a 20 gauge firearm. These deformable components 601, 602 are configured to change position or shape in response to the barrel of a firearm being pressed into the opening. When sufficient pressure is applied, the deformation will be sufficient to allow the barrel of the firearm to enter the cavity 610. After insertion of the barrel, the deformable components 601, 602 return to their original shape and position and thereby hold the firearm within cavity 610.

With certain embodiments, the deformable components 601, 602 are configured to provide resistance sufficient to prevent an object from being dislodged from the opening 610 by expected forces (e.g., by movement of a vehicle/vessel or by light jostling from people or objects). The use of an optional strap can provide further resistance. Moreover, the force required to dislodge the object from the MPHD device can be set to a value that is less than the force required to remove the MPHD device from support structure. This allows a person to use the object without removing the MPHD device from the wall or other structure. For instance, the size of the cavity 610 can be changed to increase or reduce the resistance. In addition, the type of material of the deformable components 601, 602 can be modified. This can include the use of deformable components that are designed to keep the MPHD on the object in a more permanent fashion. In particular, the required removal force can be set at a relatively high level, such that the MPHD can be removed from an attached structure by pulling on the object.

Particular embodiments of the present disclosure relate to different materials and/or structures for the deformable components 601, 602 in order to provide different resistances depending on whether the firearm is being inserted or removed from the cavity 610. For instance, a directional adhesive material can be used to facilitate insertion of the object into the device, while at the same time resisting removal of the firearm.

The device depicted in FIG. 6 can also include (optional) material 612, which is located between the deformable components 601, 602. In certain embodiments, this material can be configured to facilitate use of an object while positioned between the deformable components. For instance, the material 612 can be designed to provide stability to a firearm during aiming and also cushion the barrel from impacts caused by firearm recoil.

In certain embodiments, the deformable components 601, 602 and the material 612 can be designed such that a firearm does not normally touch the material 612 unless significant force is applied to the firearm in the direction toward the material 612. This type of force may be caused, for example, by firearm in recoil.

The exterior edges of the top surface of the upper platform form a frame to create a short well or depression on the top of the platform. The well can be used to seat and attach deformable elements, such as a 2"×2"×1.75" sheath of flame-retardant, closed cell, polyethylene foam. The foam can be attached to the platform with either appropriate liquid glues or double-sided foam tape. The foam sheath can thereby be used to accommodate and protect the barrels and sights of a weapon.

Figure 7:
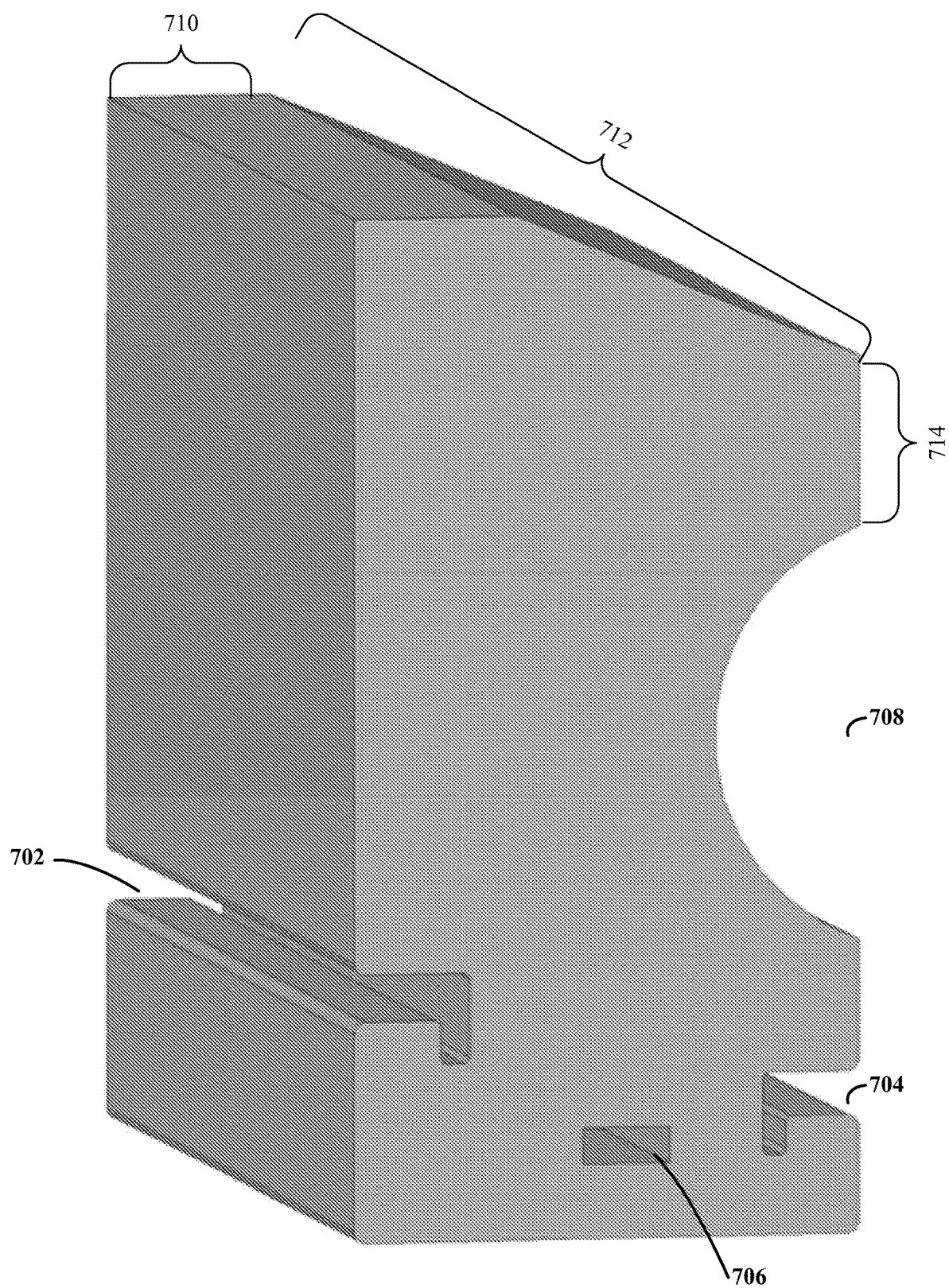
FIG. 7 depicts a deformable piece that is configured and arranged to be used with an MPWH device, consistent with embodiments of the present disclosure.

FIG. 7 depicts a deformable piece that is configured and arranged to be used with an MPHD device, consistent with certain embodiments of the present disclosure. Similar to the design shown in FIG. 6, two deformable pieces can be positioned to create a cavity 708 that can accommodate an object such as the barrel of a firearm.

As discussed herein, one or more deformable pieces can be attached to base unit using adhesive materials. The deformable piece depicted in FIG. 7 also includes a number of connection points that facilitate other attachment mechanisms. For instance, the base unit can have openings or structures that mate with (and secure) the deformable piece. This can include structures that mate with "L" grooves 702, 704 and channel 706. Corresponding structures (e.g., "tabs" and/or "rails") on the base unit can fit within such grooves and channels and thereby secure the deformable piece(s) to the base unit. In particular embodiments, the deformable piece is configured to snap/slide into place. Such features have been discovered to be particularly useful for achieving manufacturing efficiency on a large scale. In comparison, adhesives can be more labor intensive and more prone to quality control challenges. Moreover, features such as those shown in FIG. 7 can be more readily produced by using (fully or partially) automated assembly procedures.

Consistent with certain, non-limiting embodiments, the L-shaped grooves 702, 704 are fabricated in each deformable piece as a 2" long groove. Consistent with certain embodiments, the base unit can include molded plastic rails which are shorter (e.g., 1.5" long). The (0.5") difference in length allows the molded plastic rails of the platform to remain protected by the outside edges of the deformable piece(s) (because of the 0.25" overhang of the deformable pieces beyond each end of the rail). According to various embodiments, a channel 706 can be configured as a rectangular opening that measures around 0.150"×0.062".

Large scale use of MPHD devices is facilitated by the use of modular components that can be readily replaced, changed and supplemented. For instance, certain types of foam can deteriorate when exposed to ultra-violet rays from sunlight, and the damaged foam may need to be quickly and securely replaced. The MPHD device can be configured to allow a user to quickly replace part or all of the deformable pieces while in the field, and without tools.

The use of deformable pieces that can snap/slide into place can be particularly useful in this regard. For instance, damaged deformable pieces can be easily removed and replaced without having to scrap the entire MPHD device. Moreover, the deformable pieces can be upgraded or changed to accommodate new weapons or to change the color (e.g., for camouflage purposes specific to a new deployment location).

Certain embodiments are directed toward the use of deformable pieces that are nearly identical. This can be particularly useful for simplifying manufacturing and replacement of the deformable pieces. For instance, a single, spare deformable piece can be kept on hand for use in the event of damage to either one of the current deformable pieces.

Other embodiments recognize that two different types of deformable pieces can be used together. For instance, deformable pieces with different stiffness can be used in combination. This can allow for different levels of support to be provided for the object to be secured. Moreover, one deformable piece can provide a solid and less pliable platform, while the other deformable piece facilitates insertion and removal of the object by being more pliable and/or less firm.

As an example, the MPHD device can be placed upon a wall at an angle that causes the weight of a firearm to rest on the solid deformable piece. The solid deformable piece can even be horizontal. The higher stiffness of one of the pieces can help support the weight of the firearm, while the more pliable nature of the other piece facilitates the insertion and removal of the firearm. In certain situations, one of the pieces can be substantially non-deformable (e.g., a rigid plastic or metal material). The other, opposing piece can be sufficiently pliable to still allow a firearm to be inserted and removed.

Consistent with certain embodiments, the deformable pieces can form a replaceable foam sheath made from specially fabricated, flame-retardant, closed cell, polyethylene foam. The foam can be specially formulated for the MPHD to meet or exceed military and UL fire retardant requirements and ratings. These types of ratings often apply to equipment aboard military ships and airplanes.

In certain embodiments, the deformable pieces form a sheath to protect and secure the firearm. The two-piece design of the sheath facilitates the use of different foam configurations for accommodating different weapons with different barrel sizes. The two-piece design can also facilitate various combinations of different fabrications and different densities of foam for the two opposing pieces. The features fabricated into each section of the sheath serve one of two general purposes, attachment or performance.

Although additional variations are contemplated, particular embodiments can be designed with one or more of the following dimensions. When secured, the top 710 of each deformable piece can be flat from the outer corner toward the midline for a distance of about 0.285". At this point, the deformable piece can be angled downward (712) at 22.625 degrees toward the center of the sheath. The flat section/top 710 may provide a useful surface for accommodating the force of a strap that may rest upon the deformable piece while securing a firearm. For instance, by increasing the effective surface area of the interface between a strap and the deformable piece, the force of the strap can be distributed over a larger area.

In certain embodiments, an angled midline 712 can be useful for serving as an entry point for the barrel of the weapon or other component of an object as it is inserted into the cavity 708. A flat section 714 can extend for about 0.297" above the cavity 708. This flat section 714 can be particularly useful for extending the life of the deformable pieces. For instance, a pointed corner at this location could be prone to breakage due to interference with the strapping system or the barrel of a weapon.

The cavity 708 can be sized and configured to house the barrel of the weapon. For instance, the radius of the circle/cavity 708 can be 0.250". When both of the deformable pieces are secured in the MPHD, the diameter of the circle can be 0.750", which is 0.250" more than the combined radii of the cavities 708. The additional 0.250" is due to the distance between the deformable pieces once they are secured. In certain embodiments, the distance between the deformable pieces is created by a raised portion or ridge that provides the physical separation. This added 0.250" spacing also appears at both the bottom and the top of the cavity 708. The 0.250" space created at the top of the circle 708 allows the barrel to enter the circle. The dimensions of the angles and the radius of the circle are particularly useful for accommodating many US and NATO non-crew served weapons; however, they can also be adjusted to accommodate different barrel sizes and a variety of objects.

Figure 8:
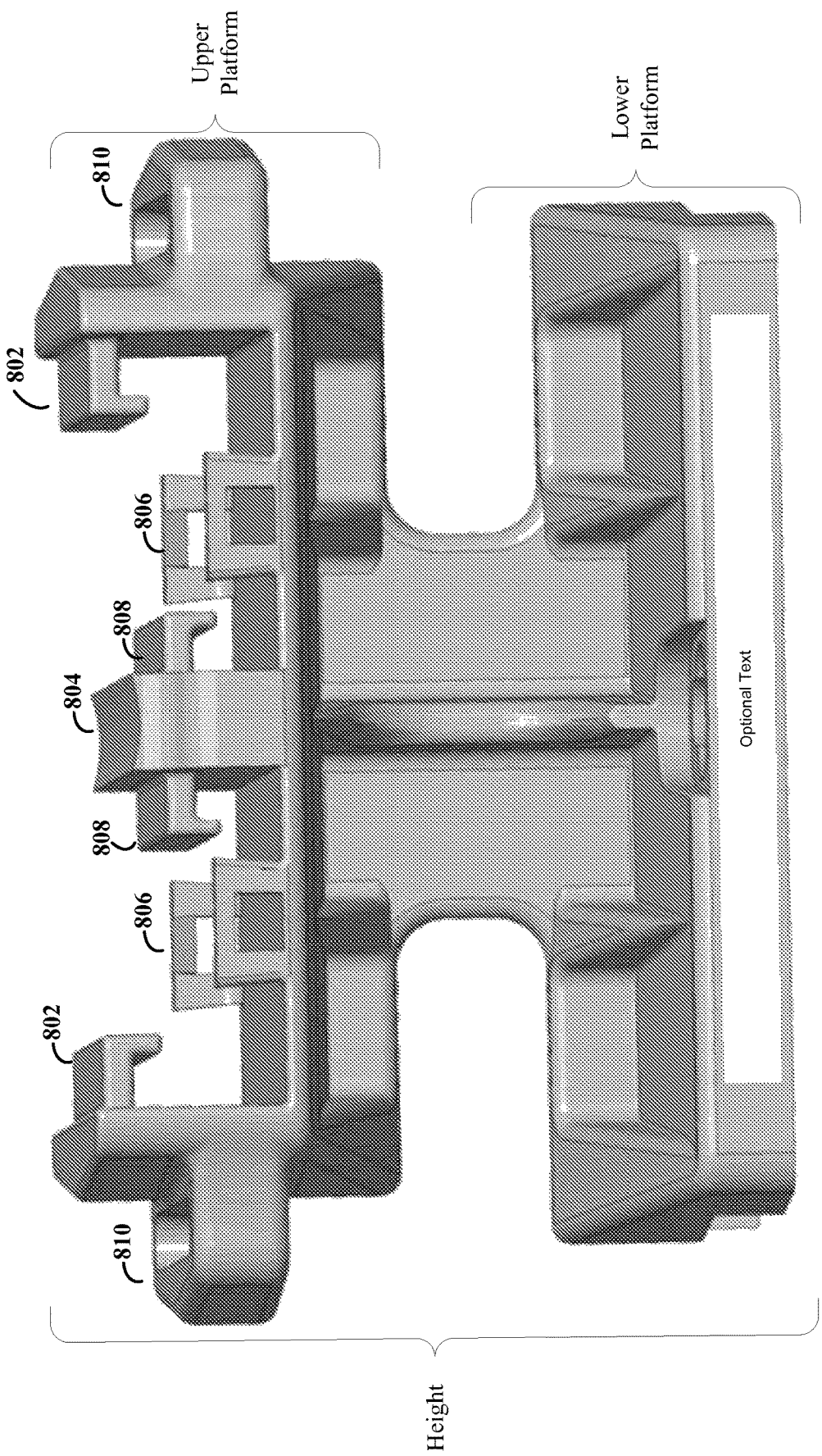
FIG. 8 depicts a front view of a base unit with attachment structures, consistent with embodiments of the present disclosure.

Optional text, such as safety instructions, can be molded into the sides of a platform, as shown in FIGS. 6 and 8. The section of the mold containing the instructions may consist of a removable plate that can be changed to provide different instructions, even different languages (sometimes referred to as a "slug").

FIG. 8 depicts an alternate view of a base unit having multiple attachment structures, consistent with certain embodiments of the present disclosure. The upper platform of the WPHD can include several specialized components, each with its own function. These specialized components can include attachment/securing rails 802, 808, securing tabs 806, center ridge support (CRS) 804 and handles 810. An object can be secured to the MPHD when these components are used in conjunction with the deformable piece(s) and/or with a strapping system. For example, attachment rails 802 can be configured to fit into the L-shaped groove 702 (shown in FIG. 7), while attachment rails 808 can be configured to fit into the L-shaped groove 704. Similarly, tabs 806 can be configured to fit within channel 706.

The CRS 804 bisects the upper platform. In certain embodiments, the top of the CRS 804 is concave and is over-molded with a non-skid gripping material, such as 3M Gripping Material. In some implementations, this design conforms to the shape of and allows the barrel of a weapon to nest on top of the CRS 804, The non-skid material (resin) can help to prevent the weapon (or other object) from sliding forward or backwards. The CRS 804 can also be configured to include securing rails 808, one on each sidewall of the CRS. The securing rails 808 may be part of a comprehensive foam securing system designed to hold in place deformable components (e.g., foam pieces) in the upper platform.

FIG. 8 depicts four different attachment rails 802, 808. Consistent with certain embodiments, the attachment rails 802,808 are molded, L-shaped rails that run parallel to each other. They can be specially designed to fit into L-shaped grooves/slots 702, 704 in the deformable pieces. In other words, the L-shaped grooves/slots 702, 704 are designed to slide/snap over the attachment rails 802, 802, which then become locked into place. The deformable pieces can still be removed; however, a significant amount of force may be required for such removal.

The L-shape shown in FIG. 8 is but one example of possible shapes and attachment solutions. For instance, the MPHD can be designed to a T-shaped or saw tooth shape for locking attachments. Moreover, the attachments can have different angles for insertion. For instance, the attachment rails 802, 808 can be angled upwards at a 45° angle relative to the sidewalls, and have a saw tooth, T- or L-shape. The deformable pieces can have corresponding grooves or openings. The use of such an angle can both facilitate insertion and allow for additional thickness in the base of the deformable pieces.

As non-limiting examples, each side of the upper platform can include an attachment rail 808 that extends from the sidewall of the CRS 804. The other attachment rail 802 is attached to the inside of the upper platform's end wall. The heights of the attachment rails 808 can be offset to provide additional support to the deformable pieces. For instance, the attachment rails 802 attached to the end walls can be placed higher to secure the outer edges of the sheath within the upper platform. Together, the attachment rails 802, 808 on the CRS 804 can secure the lower midsection of the sheath creating a strong, yet flexible, center connection.

Tabs 806 may have a wedge-like shape that is designed to securely fit into a strategically placed rectangular core or channel 706 in the deformable piece. This combination of attachment elements helps to secure the foam in place to withstand forces from all directions.

Although additional variations are contemplated, particular embodiments can be designed with one or more of the following dimensions. In certain embodiments, the overall (outside dimensions) height can be around 1.8". The height from the bottom platform to where the deformable pieces are situated can be about 1.305". In embodiments where the deformable pieces are about 1.750", the total height of the MPWH can be about 3.055". When measured along the CRS 804, the upper platform can be about 2.250" at the outer dimensions. The outer dimensions of upper platform when measured handle to handle can be about 3.072" at the outer dimensions. The overall size of the lower platform, measured in the direction of the recessed channel 906, can be about 2.696". The overall size measured perpendicular to the recessed channel 906 width can be about 2.500". These sizes are provided as examples and are not meant to limit all embodiments.

The CRS 804 can also be designed to provide a 0.25" space between the two deformable pieces. With straight-lined deformable pieces, there will be a 0.25" gap between the two pieces of the sheath at the top. The resulting opening between the deformable pieces allows a user to easily push an object in a downward motion to securely seat the object in the circular opening of the deformable pieces. Optional angled portions in the deformable pieces can be included to guide an object into the gap. In particular embodiments, when the object is secured, the top of the CRS 804 remains about 0.125" below the bottom of the circular opening and the object.

Consistent with certain embodiments, an MPHD device can be configured to include slotted handles 810 that extend from the outer edges of each end of the upper platform. The slots can be designed to accommodate a strapping system that can serve a number of purposes, including securing an object within the MPHD device. For instance, the slots can be 1.75" wide and 0.150" thick to accommodate a strap of slightly smaller dimensions. The handles 810 can also been designed to withstand forces necessary to disengage the MPHD device when engaged with a surface (e.g., with adhesives, Dual Lock or magnets). A user can disengage the MPHD by pulling in an upward motion directly on a handle or the strap.

Various embodiments are directed toward a strapping system, which can use flame-retardant VELCRO or another attachment material that meets military specifications. The flame-retardant properties can be particularly useful for use on ships and aircraft. In certain instances, the strap can be 1.5" wide and 10.625" long. A black molded plastic D Ring can be attached (e.g., heat welded) to one end of the strap. The other end of the strap can be rounded to prevent injuries from sharp edges. Extending six inches from the D ring, the strap is fabricated from VELCRO-type loop material. Four inches of VELCRO hook material can be attached (e.g., heat welded) to the end of the loop material.

To secure an object in the foam sheath, the strap can be fed through one of the slotted handles 810, placed over the top of the foam sheath (not shown in FIG. 8), and then down through the other, second slotted handle. When the strap is pulled tight, the D ring can be designed to rest directly against the underside of the handle 810. To secure the strap, the rounded end is pulled tight and placed against the loop material over the sheath. To release the strap, the rounded end is pulled in an upward direction.

In addition to securing an object in the MPHD, the strap can be used to disengage the MPHD by pulling the strap in an upward motion when the unit is fastened to a support structure (e.g., by Dual Lock or magnets). The strap can also be used to fasten the MPHD to a user's vest and to stack arms. When not in use, the strap can be efficiently folded and stored between the upper and lower platforms of the MPHD.

Figure 9:
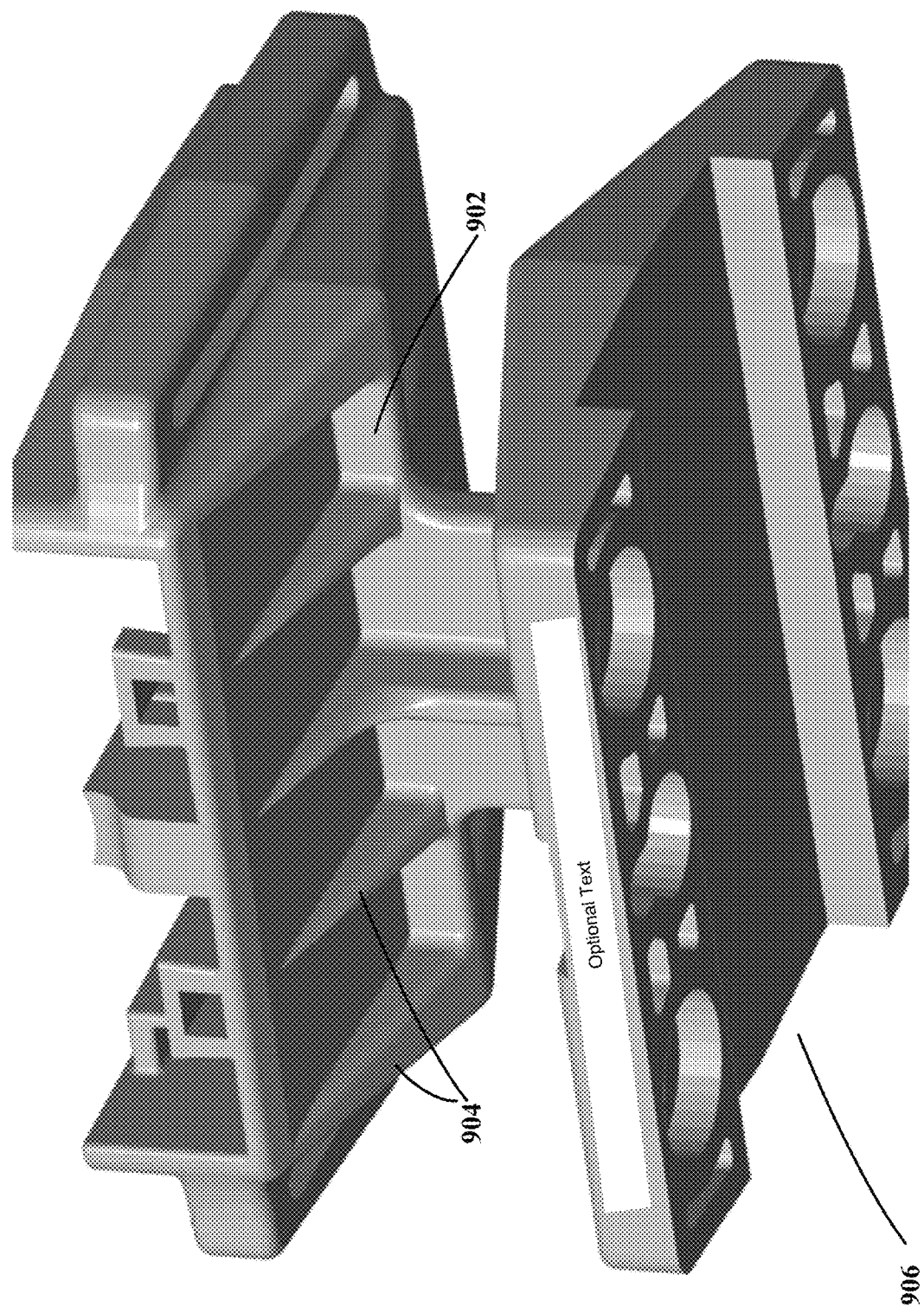
FIG. 9 depicts the underside of the upper platform, consistent with embodiments of the present disclosure.

FIG. 9 depicts the underside of the upper platform, consistent with embodiments of the present disclosure. The underside of the upper platform has a center stabilizing bar 902 that can run the length of the platform between the slotted handles. In certain instances, the stabilizing bar 902 can provide structural support for the upper tray or platform. The stabilizing bar 902 can also include a total of ten buttresses 904 (five on each side) extending in directions perpendicular to the length of the stabilizing bar 902. The buttresses 904 can provide structural support for and strengthen the outer edges of the tray. Recessed channel 906 can include one half of a reclosable fastener system.

Similarly, the upper surface of the lower platform can also have a stabilizing bar running the length of the platform. A total of ten fingers/buttresses connect to the stabilizing bar, five on each side. The buttresses provide support for and strengthen the lower tray or platform, The center buttress on both sides of the stabilizing bar is shortened to allow for the placement of key slot attaching mechanisms in the center of both sides of the platform. The shortened buttresses also serve as a connecting point for one section of the connecting stem.

This design can be particularly useful for an MPHD device that is both lightweight and strong enough to withstand the stresses caused by engagement and disengagement of its attaching mechanisms (e.g., Dual Lock, magnets, etc.).

Figure 10:
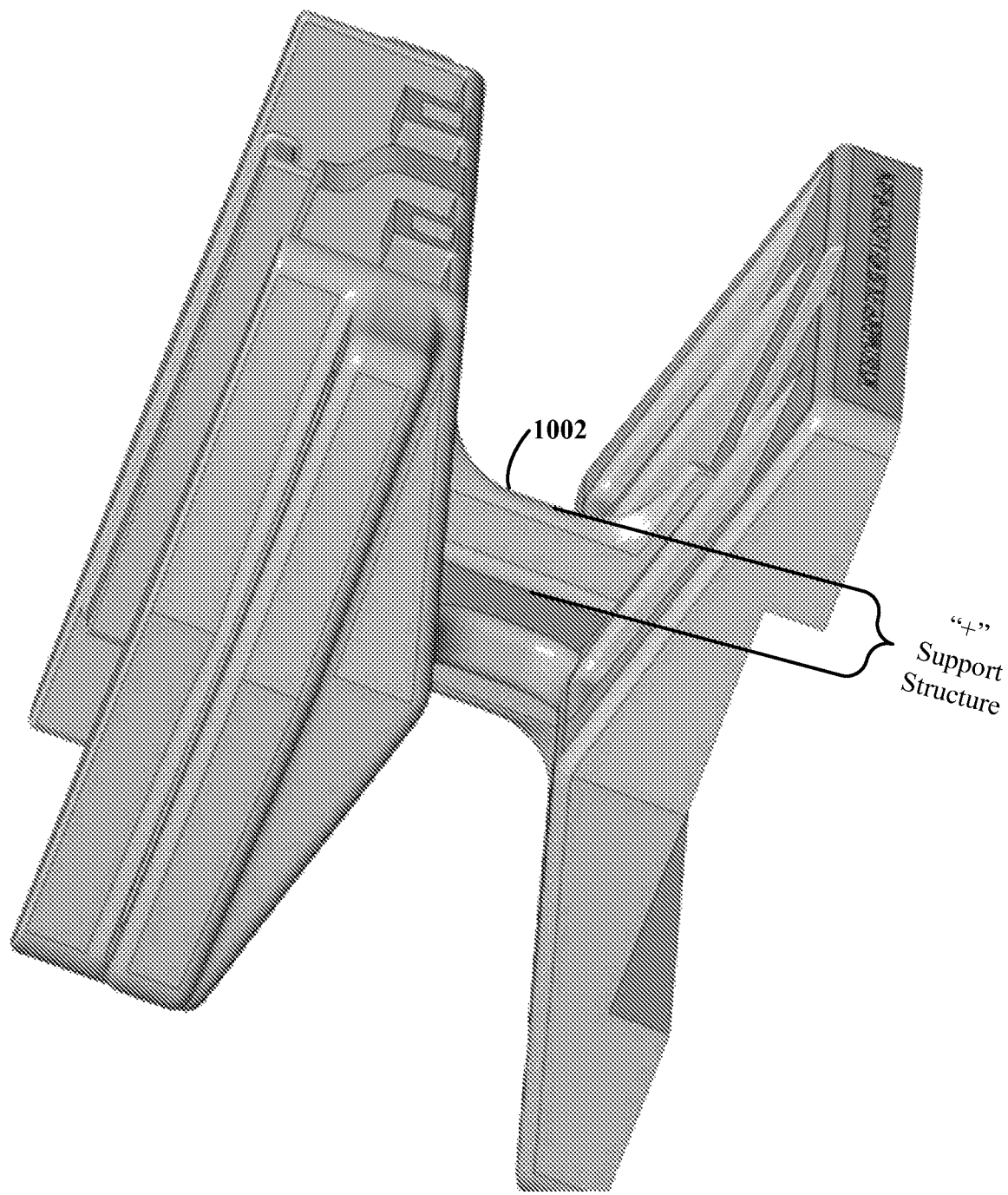
FIG. 10 depicts a view of the support structure between two platforms, consistent with embodiments of the present disclosure.

FIG. 10 depicts a view of the support structure between two platforms, consistent with embodiments of the present disclosure. The support (stem) structure 1002 can be designed to provide additional structural support while still permitting the MPHD device to be lightweight. Accordingly, the support structure 1002 can be designed with support flanges that extend along different directions of the platforms. For instance, the flanges can be configured and arranged in a "+" or "X" shape in which the flanges extend in four different directions. This can provide a significant amount of additional strength, but is less weight than a solid square or rectangular shape of material, One section of the stem can also be connected to the center stabilizing bars of both the upper and lower platforms. The other section of the stem can connect to the center buttress on both sides of the stabilizing bars on both platforms. All four flanges of the connecting stem can be designed to be relatively wide at the point of connection to each platform, allowing pressure to be dispersed from above or below.

Figure 11:
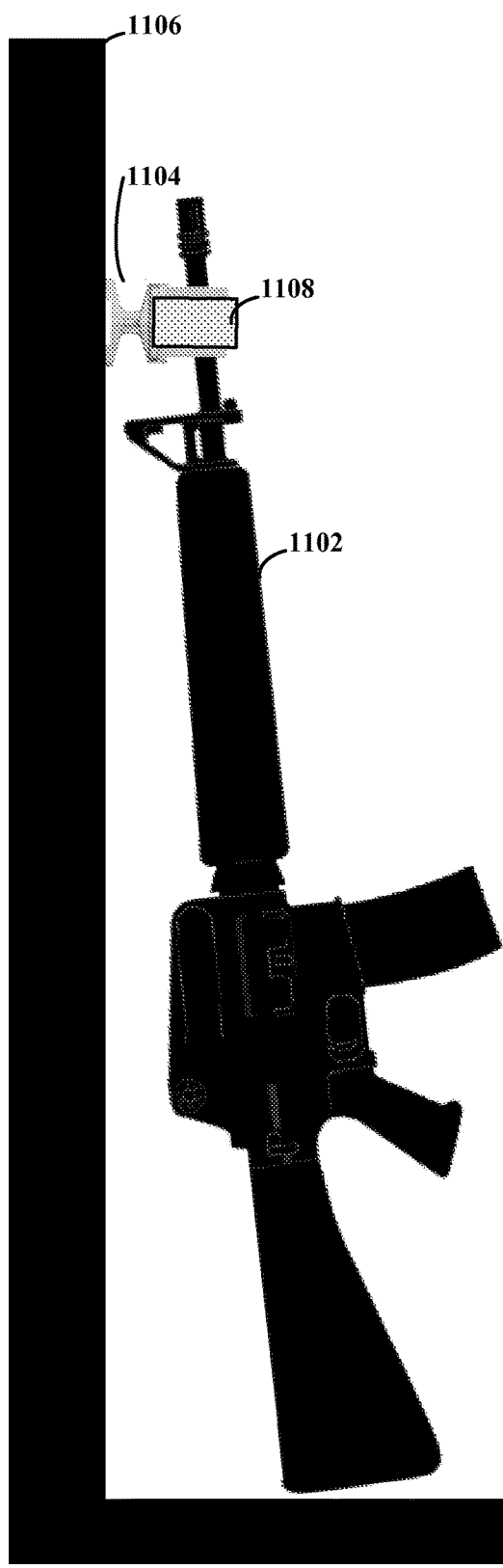
FIG. 11 depicts the use of an MPWH device to secure a firearm against a structure, consistent with embodiments of the present disclosure.

FIG. 11 depicts the use of an MPHD device to secure an object against a structure, consistent with embodiments of the present disclosure. By way of example, a firearm 1102 is shown being secured against a structure 1106. The structure 1106 can be any number of different structures including, but not limited to, a wall of a building. FIG. 11 depicts structure 1106 as being substantially vertical; however, the structure can be at various angles relative to a level surface (such as the floor of a building). For instance, the firearm 1102 can be secured to the floor (0°), wall (90°) or other structures having a variety of different angles.

MPHD 1104 can secure the firearm 1102 by containing the barrel within deformable portions. In certain optional embodiments, a strapping system 1108 can be used to further secure the firearm 1102. MPHD 1104 can be secured, in turn, to the structure 1106 by various different attachment solutions, some of which are discussed in more detail herein.

MPHD 1104 may have a two-platform design that can facilitate placement and removal from the structure 1106. This two-platform design includes, but is not limited to, handles with open gripping space where a thinner support structure or stem connects the two platforms. The stem allows for the application of leverage at the point of the handles in order to apply and disengage the securing mechanisms on the structure 1106.

Figure 12:
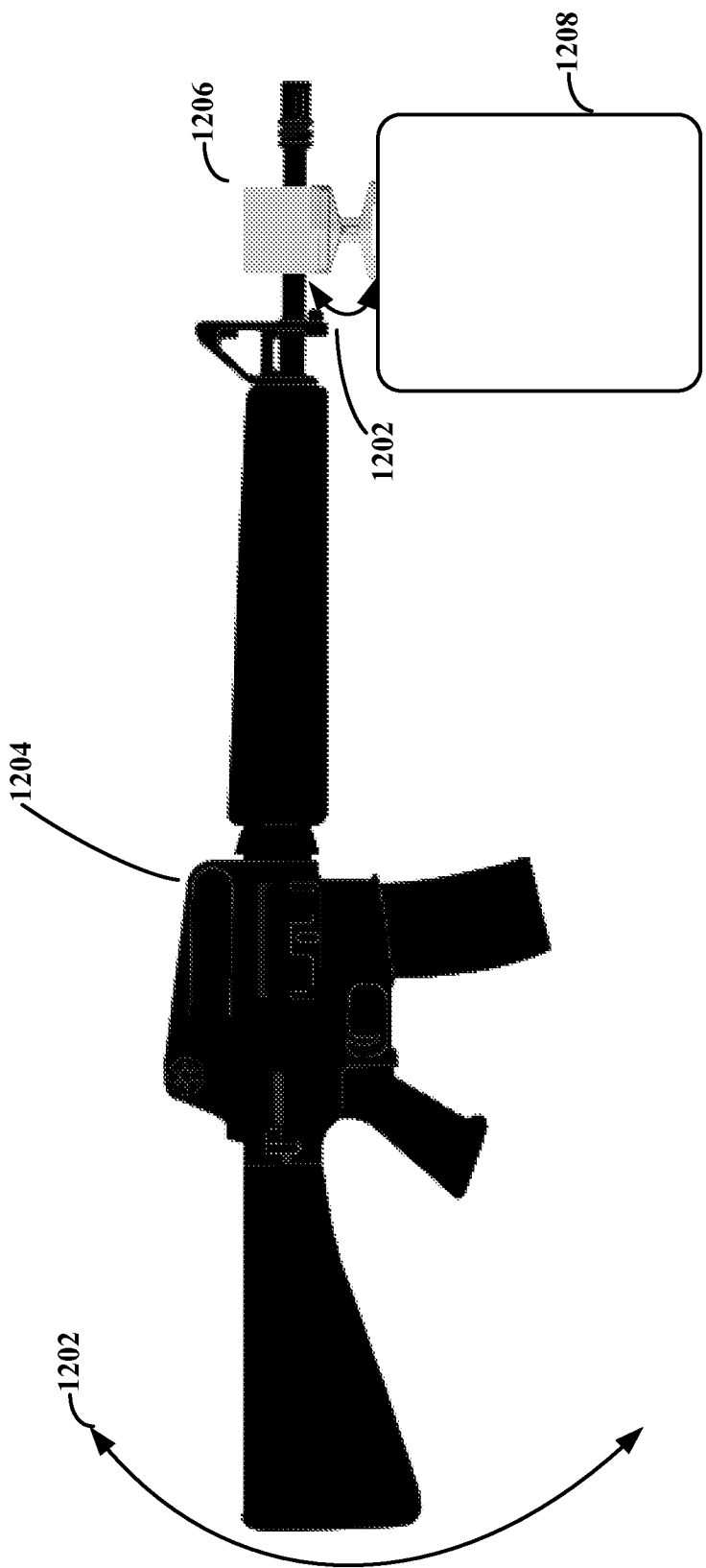
FIG. 12 depicts the use of an MPWH device to stabilize a firearm during aiming or sighting of the firearm, consistent with embodiments of the present disclosure.

FIG. 12 depicts the use of an MPHD as a MPWH device to stabilize a firearm that is being aimed or sighted, consistent with embodiments of the present disclosure. Firearm 1204 is secured within MPWH 1206, which rests upon a structure 1208, When firearm 1204 is discharged, the weapon recoil can result in an impact between the weapon and any structure upon which the barrel rests. If the structure 1208 is hard, this impact can damage the weapon and/or the structure. Thus, it can be undesirable for the structure 1208 to be relatively hard, as may be the case with materials such as metal, wood, rock, glass or other hard or brittle materials. As discussed herein, MPWH 1206 can be configured to cushion the firearm 1204 and thereby permit the structure 1208 to be made of any number of different materials, including relatively hard materials.

Moreover, MPWH 1104 can be designed to facilitate canting of the firearm as indicated by arrows 1202, For instance, when the MPWH has a two-platform design, the height provided by a support structure or stem connecting the two platforms can facilitate the rotation of the MPWH 1104 on the structure 1208. Such canting can also be facilitated by rounding the edges of the bottom platform and/or by providing a raised portion upon which the MPWH 1104 can pivot.

Figure 13B:
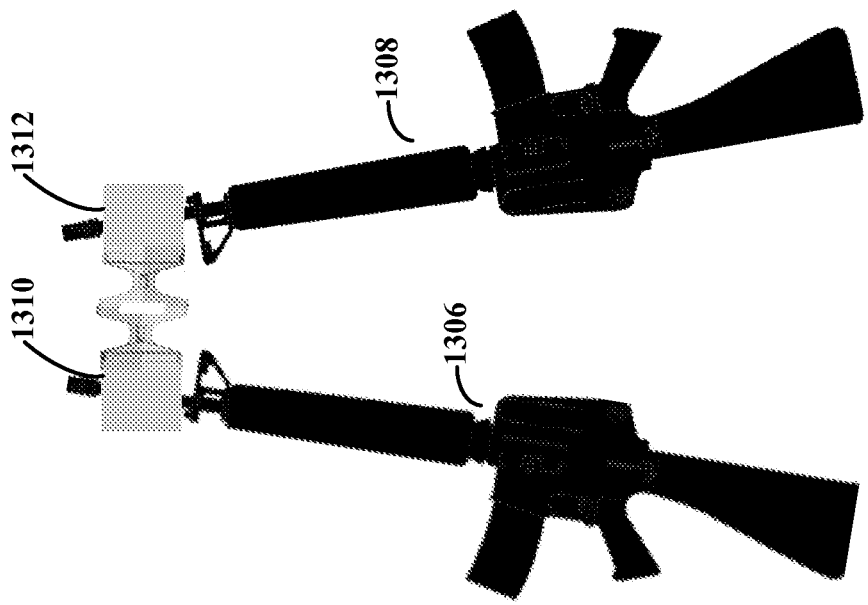
FIG. 13B depicts a use of multiple MPWH's to stack arms, consistent with embodiments of the present disclosure.
Figure 13A:
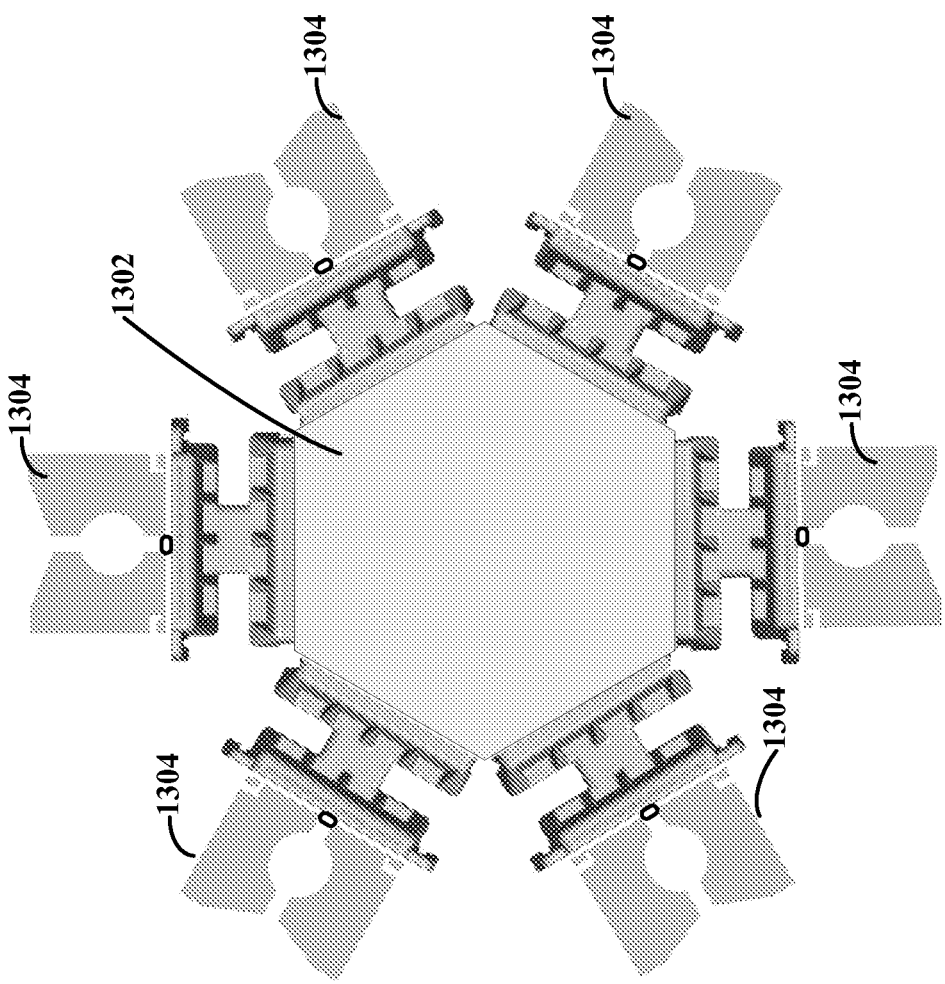
FIG. 13A depicts a component for securing multiple MPWH's devices to facilitate stacking of arms, consistent with embodiments of the present disclosure.

FIG. 13A depicts an apparatus for securing multiple MPWH devices to facilitate stacking of arms, consistent with embodiments of the present disclosure. Component or apparatus 1302 provides a number of interfaces upon which MPWH devices 1304 can be attached. For instance, apparatus 1302 can have a flat, central plastic piece surrounded by multiple pegs that fit within key slots on the MPWH devices 1304. (Other attachment solutions are also possible). Two or more MPWH devices 1304 can then be attached to the apparatus so that multiple firearms can be held upright by counterbalancing themselves against one another. In this manner, apparatus 1302 and the MPWH devices 1304 can function as a free standing firearm securing system that can be located virtually anywhere. This can be particularly useful for storing and keeping the firearms off the ground where there are few (or no) suitable support structures for attachment of an MPWH device 1304. The particular hexagonal shape of component 1302 as shown in FIG. 13A is not limiting, and other shapes are possible including, but not limited to, squares, circles, pentagons and octagons.

FIG. 13B depicts a method of stacking multiple arms using multiple MPWH devices, consistent with embodiments of the present disclosure. Firearms 1306 and 1308 can be used to counterbalance one another in a freestanding configuration by securing two MPWH devices 1302, 1304 to each other. In certain embodiments, the two MPWH devices 1302, 1304 can be secured to one another using strapping systems (not shown in FIG. 13B).

In other embodiments, the two MPWH devices 1310, 1312 can be provided with magnets, and the two devices 1310, 1312 can be connected by aligning their respective magnets to enable a magnetic attraction. This alignment can be facilitated by manufacturing the MPWH devices 1310, 1312 with specific alignment of north and south magnetic poles. For instance, each MPWH 1310, 1312 can be configured with two magnets in opposite corners and with different north or south poles exposed. In other instances, metallic plugs can be placed in one or more remaining recesses in the bottom platform. The magnetic attraction between the magnets of the opposing MPWH devices 1310, 1312 and the metal plugs can hold the MPWH devices to one another. In certain embodiments, two strips of a reclosable fastener system can be placed back-to-back. The opposing MPWH devices 1310, 1312 can then each be connected to a different side of the back-to-back strips of a reclosable fastener system.

FIG. 14 depicts a MPWH device having a non-planar attachment surface, consistent with embodiments of the present disclosure. The non-planar attachment surface is sized and configured to correspond with the size and shape of a support structure 1402. Embodiments of the present disclosure are directed toward the use of an attachment surface for the lower platform that is specially designed in non-planar configurations for attachment to different surfaces. For instance, it may be desirable to attach an MPWH device to a curved surface (such as a round pole 1402) or to an angled surface (such as the corner of a building). Consistent with certain embodiments, customized MPWH devices may have a lower platform that has the desired shape, whether curved, angled or otherwise. FIG. 14 depicts alternate embodiments where an MPWH device 1408, having a relatively planar lower platform, is modified by adding an attachment surface 1404 that has the desired shape (depicted in FIG. 14 as curved). An interface piece 1406 can connect the attachment surface 1404 to the MPWH device 1408.

FIGS. 15A and 15B depict a protective cap for placement over the deformable portions when not in use, consistent with embodiments of the present disclosure. The deformable portions of MPHD 1504 can be particularly susceptible to physical damage. For instance, many deformable materials can be broken, chipped or permanently bent. Moreover, certain deformable materials can degrade with exposure to natural elements, such as sunlight or water. Accordingly, a protective cap 1502 can be provided to cover the deformable portion(s) when not in use. In certain embodiments, this protective cap 1502 can be attached using the strapping system 1506; however, other attachment solutions are possible (e.g., a center piece within the cap 1502 that fits within the deformable portion's aperture like the barrel of a firearm).

In one embodiment, an MPHD can be molded using a mixture of (virgin) ABS resins and fiberglass (e.g., at a ratio of 80% resin and 20% fiberglass). In one embodiment, the MPHD can be molded using a mixture of nylon and fiberglass (e.g., at a ratio of 70% resin and 30% fiberglass). This can be particularly useful for providing suitable strength. The use of nylon can provide extra flex, which can help accommodate stresses. The exterior surfaces of the MPHD can be heavily textured to achieve a sandpaper-like texture for easy gripping even in wet conditions. The device may also include a stealthy matte finish that will not reflect light. Various components of the MPHD can be designed to function in extreme temperature ranges to assure proper functioning, whether being used in Arctic or desert conditions.

Embodiments of the present disclosure recognize that a MPHD as discussed herein can be used to secure an object such as a tool or weapon/firearm on vertical, horizontal and sloped planes or support surfaces. Moreover, such MPHDs can be secured to almost any surface. In some implementations, a MPHD allows the user to stabilize a weapon for zeroing in on a target (sighting) in both stationary and moving environments. An MPHD may also provide a stable platform for performing weapon cleaning and maintenance. In certain embodiments, the supporting piece or stem between the two platforms can be a moveable joint (e.g., a swivel or ball joint), which allows the weapon to be rotated relative to the device's bottom platform (which could then be secured to a support structure such as a wall or a vehicle hood), whether for aiming or other purposes. Additionally, a locking mechanism can be included to prevent further movement of the weapon once a desired position is achieved or if the MPHD is being used strictly for storage of a firearm.

An MPHD can be designed to be small enough and light enough to be portable for use in the field. When brought to the field, an MPHD can include a VELCRO strap that can be used for securing the MPHD to the user's vest. In a vehicle or airplane, the strap can also be used to prevent a weapon from dislodging due to bumps or turbulence. Moreover, the strap can secure additional components such as a removal tool or covering piece, as discussed herein. The MPHD can be semi-permanently attached to almost any surface for side by side use in any type of weapon storage equipment, unit or facility.

Weapons that are stored shipboard must often contend with rolling seas and engine vibration, conditions that may cause weapon damage. Newer ships are being made of lighter metals such as stainless steel and aluminum. Magnets will not work on these metals. When attaching a MPWH to these types of metals, a reclosable (e.g., Dual Lock) fastening system can be employed to attach the MPWH on these metals. In addition, the VELCRO strap may help secure weapons and minimize damage in rough weather.

Consistent with embodiments of the present disclosure, the design of the lower platform may have multiple methods of securing a MPHD to a wide range of surfaces. These attachment mechanisms may include a fastener material such as 3M Dual Lock®, key slots, and magnets. A gripping material can also be used to resist sheering pressures. The combination of Dual Lock, magnets, gripping material and key slots allow the MPHD to securely adhere to almost any surface under any condition.

Dual Lock is a reclosable fastening system containing hundreds of mushroom-shaped plastic stems that audibly snap together to form a secure attachment approximately five times stronger than VELCRO. Dual Lock has an adhesive backing. Different adhesives are available for different applications. Two opposing pieces of Dual Lock fasten to each other in order to create the bond. Dual Lock comes in varying stem densities, with a higher stem density resulting in a stronger bond. Dual Lock is easier to clean than VELCRO. For instance, sand, dirt and mud may render VELCRO inoperable, while the Dual Lock material can generally be rinsed clean with water to extend its useful life.

To properly engage (attach together) two pieces of Dual Lock, a rocking motion should be employed, fastening the pieces from one end to the other. The two-platform design of the MPWH's molded base allows the user to quickly and securely grip the MPWH while engaging the Dual Lock with a rocking motion. The pressure required to disengage (separate) two pieces of Dual lock is twice the amount of pressure required to engage the pieces. The use of Dual Lock allows the MPWH to be secured in a stationary manner to any surface, both vertically and horizontally, and in all weather conditions.

The bottom of the lower platform has a horizontal channel which runs completely through it and is visible on either end of the platform. Adhesive-type material (e.g., 3M 250 stem Dual Lock with VHB adhesive: SJ3550CF) can be placed in the channel. The open ends of the channel allow a MPHD to be rapidly secured, and allow the user to visually line up the Dual Lock on the MPHD with the Dual Lock attached to the fastening portion of the support surface. The channel can have a sufficient depth such that the Dual Lock material will not interfere with the function of the other fastening components (such as magnets and key slots), while still allowing for effective interaction of opposing piece of Dual Lock.

The use of the SJ3550CF Dual Lock material, a 250 stem version provided as a non-limiting example, can be particularly useful in connection with embodiments where the die cut ends of the Dual Lock are visible at the ends of the platform channel. The use of the CF (clear foam adhesive) allows the Dual Lock material to blend with any resin color, whereas other Dual Lock products have white foam which would be suitable in certain situations, e.g., where camouflage is important. Each MPHD can be provided with additional pieces of SJ3551CF Dual Lock, a 400 stem version provided as a non-limiting example, as well as an isopropyl alcohol wipe for cleaning the support surface to which the Dual Lock is to be adhered.

Embodiments of the present disclosure are directed toward MPHD devices that are configured and arranged to provide bond strength that meets a threshold value. The threshold bond strength can be met by modifying several factors. One factor is the type of re-closable fastening system that is used. For instance, the stem density is a variable for re-closable fastening systems such as Dual Lock. Another factor is the total area available for bonding. This can be controlled by adjusting the amount/area of useable re-closable fastening material that is on the MPHD and/or on the surface to which the MPHD is to be attached, In certain embodiments, different sized strips can be designed for attachment to the surface. A user of the MPHD can select the appropriate strip size based upon the desired bond strength. For instance, the user may seek greater bond strength when the surface is a ground vehicle that will be traveling over rough terrain and less bond strength when the surface is a stable structure, such as the wall of a building.

Embodiments of the present disclosure are directed toward the use of strips of one-half of a reclosable fastener system that can be conveniently placed on different structures. The MPHD can then be secured to these strips by connecting to the other half of the reclosable fastener system located in channel 906. Certain embodiments recognize that these strips can have varying sizes, which can balance between the desired bond strength and ease of application. For instance, it has been discovered that the use of strips that are smaller than the channel 906 can facilitate alignment.

The bottom of the lower platform can also be configured with cavities designed to include magnets. For instance, circular depressions can be placed near each corner. In a particular experimental embodiment, the cavities can be designed with a specific taper or draft to accommodate neodymium-iron-boron (NdFeB) magnets, which are provided here as an example of one of many magnet types. For instance, circular magnets can be sized and configured to snap into corresponding molded cavities to provide attachment without the use of glue or adhesives; however, adhesives can be used instead of or in addition to the magnet snaps. The number and placement of magnets can vary according to the magnets' size and strength as well as the desired use. For instance, magnets can be placed in each corner for situations where very high levels of magnetism are desired. Aspects of the present disclosure are directed toward a manufacturing process that uses a mold designed to accommodate one or more plugs in the magnet cavities. The use of these plugs allows for the magnet cavities to be selectively implemented. In some embodiments, unused magnetic cavities can also be covered with a (over-molded) gripping material.

Consistent with certain embodiments, the magnets have a protective coating (e.g., a phenolic coating), which can be particularly useful for several reasons. For instance, the phenolic coating can dull the appearance of the magnets by coloring them black, which can reduce the visibility of a MPHD and help with camouflage. Moreover, magnets, such as neodymium-iron-boron magnets, may be susceptible to corrosion/oxidation. The phenolic coating can provide corrosion resistance, as well as providing abrasion resistance and chemical resistance.

The flat surfaces on either side of the platform's center channel can be covered by, over-molded or made from a gripping material (e.g., Santoprene as available from ExxonMobile Chemical Company of Houston, Tex., or 3M Gripping Material/Tile (St. Paul, Minn.)). The gripping material can prevent an MPHD from sliding on both vertical and horizontal planes, even when magnets (or other attachment mechanisms) are also present. Other embodiments allow the use of silicon-based products. Consistent with certain embodiments, the gripping material can be molded directly into the plastic of the platform. For example, the use of a Santoprene resin or a 3M Gripping Tile can provide a thin profile, which is useful for maintaining the effective magnetic strength.

In certain embodiments, one or more key slots can be molded into the outer edges of the bottom of the lower platform. The key slots provide a third method of fastening/securing the MPHD to the support structure. In controlled environments such as armories and offices, screws may be placed to facilitate key slot use. In the field, any protruding nail or screw may be used to hook the key slot to secure the MPWH. The combination of Dual Lock fastener material, magnets, gripping material and key slots allow the MPHD to securely adhere to almost any surface under any environmental condition.

The top of the lower platform and the bottom of the upper platform can be ergonomically designed to allow the user to quickly and comfortably engage or disengage the unit using either the Dual Lock fastener material, magnets or key slots. The open space between platforms and textured surfaces allow for a firm grip on both platforms even when wet.

The center of a 2"×2" foam sheath can be fabricated to accommodate barrels of a wide range of weapons and should be large enough to be appropriate for all non-crew served weapons used by the United States military and NATO allies.

The UL rated flame retardant foam can be specially formulated for use in a MPHD in order to meet military specifications. Fire prevention is a paramount concern onboard ships, and various foams can ignite quickly and also release toxic gases. Use of the flame-retardant foam greatly reduces the possibility of the MPHD catching fire.

As previously discussed, a VELCRO strapping system can secure an object or the barrel of a weapon in the protective foam sheath. This feature prevents the object from falling out of the MPHD in a wide range of conditions, whether used on an aircraft, on a ship, in the field, or in a storage area.

Camouflage can be an important aspect of military and tactical equipment and operations. An MPHD can be manufactured to meet all current and standard camouflage colors: black, desert sand, forest green and navy grey. The foam component can also be colored to meet any camouflage requirement. The textured surface can be used to diffuse light that strikes the MPHD to reduce visibility of the MPHD (e.g., due to light reflecting off the surface).

An MPHD can be designed to facilitate the safe handling and storage of military and tactical weapons. For example, such a MPHD can be designed to secure a rifle in a wide range of conditions. Many of the MPHD features can be specifically designed for use by members of all branches of the Armed Forces. These features can be also useful for other tactical organizations using weapons, e.g., Homeland Security, Border Patrol, state and local police departments, and SWAT teams.

Another component of the system can include a portable Multi-Purpose Butt Plate Holder ("MPBPH") device that can also be used to secure the firearm at a wide variety of locations and/or stabilize the weapon, while still being able to seize a firearm at a moment's notice. This MPBPH device can be used alone; however, it can also be used as part of a system and/or kit. Unless otherwise stated, the various aspects of the MPBPH device can be used in combination with other components of the systems discussed herein.

The MPBPH device can be configured with sidewalls designed to secure the butt of a weapon/firearm. These securing sidewalls can be configured and arranged to allow the butts of different types of firearms to be secured to the device. For instance, the sidewalls can be shaped in a "U" shape with a curved back stop for the butt. In certain embodiments, the sidewalls can be angled to create a cavity that is sized to secure the butts of multiple different types of firearms.

Embodiments of the MPBPH device are designed for use with additional attachment solutions and/or as a standalone item for securing a weapon. The MPBPH device can also be designed for attachment to a wide variety of different structures. A few non-limiting example structures include walls, floors, ceilings, doors, windows, vehicle panels, wheel or track vehicles, boats, planes, helicopters, trees, rocks, boats, airplanes, wheels, sheds, cabinets, boxes, chairs, tables, desks, armored vehicles, wall lockers, fences, utility poles and more. For ease of discussion, the identification of a particular type of structure (e.g., a floor or wall) will be understood to not be limiting unless otherwise stated.

Particular embodiments of the present disclosure are directed toward the contacting portion of the first surface being substantially planar. A planar configuration conforms to numerous surfaces, even surfaces that are themselves not perfectly planar. Other embodiments of the present disclosure are directed toward the first surface having a non-planar interface. For instance, one embodiment can include a curved interface. This can be particularly useful for attachment of the device to poles and similar objects. Another embodiment can be shaped as an L-bracket. This can be particularly useful for placement at the corners of exterior walls or at the top of a wall, among other uses. Other variations are also possible.

The first surface can also be configured to include graspable portion(s) or handle(s) that can be used when applying/securing the device to a structure and also when removing the MPBPH device from the structure. This can be particularly useful for an adhesive-like securing mechanism that uses a rocking motion and pressure to fully engage.

In certain embodiments of the present disclosure, a MPHD includes a leverage point in the form of an opening or protrusion that allows a tool to be inserted between the device and a wall or other structure. In particular, some type of lever can be used to dislodge the device from a wall by inserting the lever to provide mechanical force to separate the wall and the device. For instance, the leverage point can be designed to accommodate readily available equipment, such as a multi-tool or a knife blade. The leverage point can be designed with additional support and/or reinforced to withstand the force used to remove the device from an attached structure. The support can include additional thickness in the first surface around the leverage point and/or plating the leverage point with a sturdy material, such as metal.

Consistent with various embodiments, the device can be ergonomically designed to allow the user to quickly and comfortably engage or disengage the unit using one or more of attachment mechanisms, such as Dual Lock fastening material, magnets or key slots. The handles can include textured surfaces to allow for a firm grip, even when wet.

In certain embodiments, a specially-designed tool can be included with the MPBPH device. In one instance, the tool can be a separate item. For instance, the tool can take the form of a curved bar where the curved portion is designed to act as a fulcrum point (against a wall) when one end of the tool is in contact with the leverage point. This bar can be carried separately from the device. In other embodiments, the device can also include a holding mechanism for storing the tool when it is not in use. The tool can then be removed and used whenever the device is to be removed from a wall or other structure.

In other embodiments, the device can include an integrated tool. For instance, the device can include an integrated extension member that provides additional leverage for removal of the device from a wall or similar structure.

Various experimental devices and related uses are discussed herein. These experimental aspects provide support for numerous different embodiments and are not meant to be limiting. The MPBPH can be made from a variety of materials, including various thermoplastics. Certain embodiments are directed toward the use of a glass filled nylon material and/or a glass filled polypropylene material. In other embodiments, the MPBPH is injection molded using Santoprene, a resin with properties similar to vulcanized rubber. The injection molded MPBPH can be secured to virtually any type of surface using at least one of: magnets, screws, nails or a reclosable fastener system. For instance, screw holes and screws allow the MPBPH to be (relatively) permanently mounted to a surface from any of four different sides (left, right, the rear or the bottom). This can be particularly useful in controlled environments, such as vehicles, ships, planes, armories and offices. These attachment mechanisms can be combined with a gripping material. The gripping material can be configured to resist shearing pressures that are parallel to the attached surface (e.g., to resist downward pressure when the device is attached to a wall).

Figure 16:
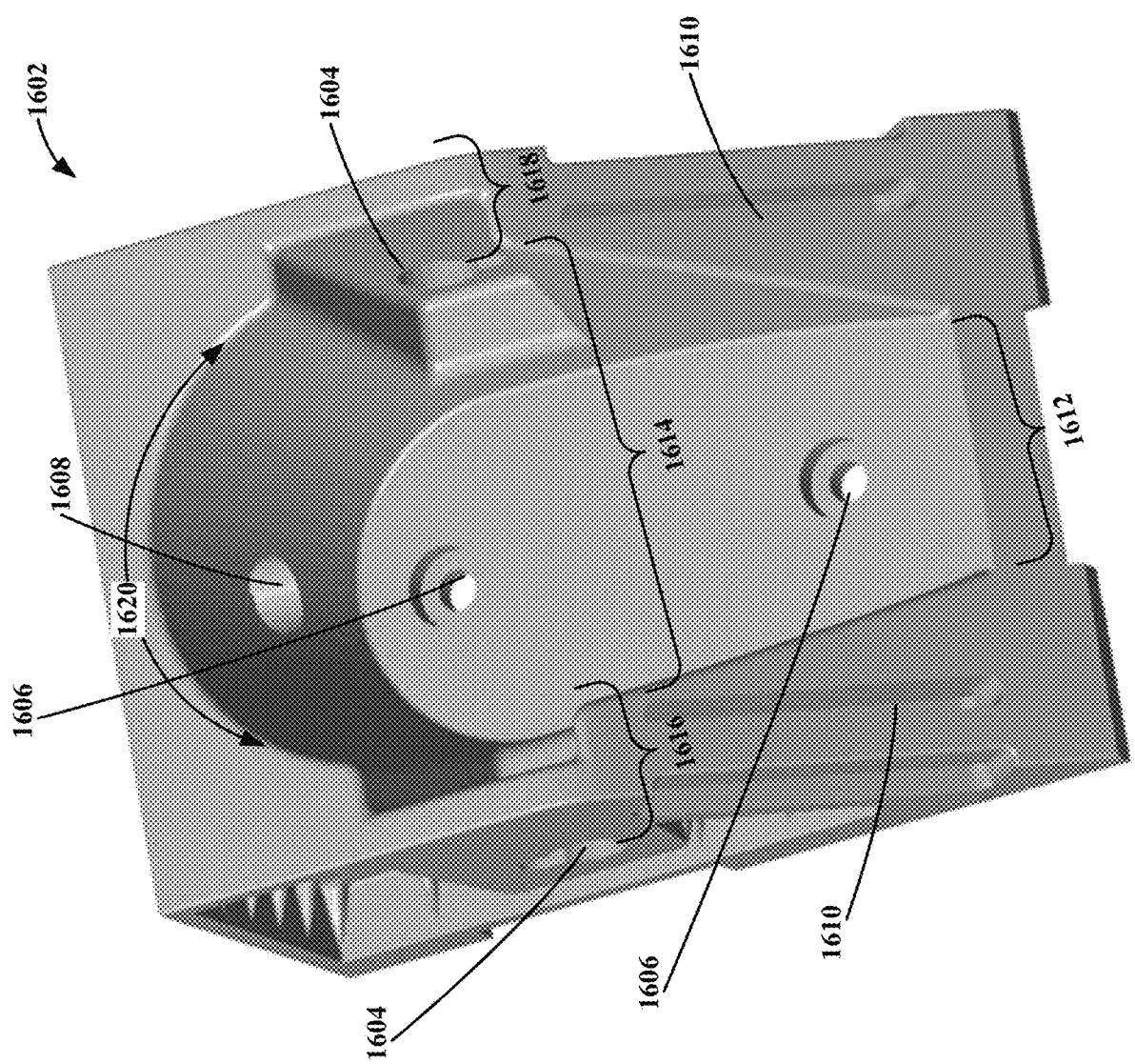
FIG. 16 depicts a unit for an experimental embodiment of a Multi-Purpose Butt Plate Holder ("MPBPH"), consistent with embodiments of the present disclosure.

FIG. 16 depicts a unit for an experimental embodiment of a MPBPH, consistent with embodiments of the present disclosure, as may be implemented with weapons, tools or other objects. MPBPH 1602 has sidewalls 1616 and 1618. Together, these sidewalls form an opening, identified by locations 1612, 1614, that is configured and arranged to receive and support the butts of different firearms. Consistent with certain embodiments, the sidewalls can be angled such that the width of the opening is smaller at one location 1612 relative to another location 1614. This "V" like shape helps to guide the weapon butt into the MPBPH. The sidewalls can also be connected by a curved portion 1620. When the MPBPH is in use, the curved portion of the butt can fit against the curved portion 1620. This curved portion 1620 can increase in radius toward the top of the MPBPH, which can also help to guide the weapon butt into the MPBPH. The use of the term "butt plate" does not necessarily exclude the stock, buttstock or shoulder stock. For instance, the butt plate can be inserted into the MPBPH device and secured therein. At the same time, the buttstock or shoulder stock can also be secured.

The MPBPH can be configured and arranged to facilitate the insertion and removal of a firearm butt plate from multiple directions and as might be relevant for different orientations of the firearm. For instance, when the firearm is to be secured in a vertical direction (relative to gravity), it can be convenient to insert and remove the firearm in the vertical direction. The V-like shape can be particularly useful for such uses by guiding the firearm butt plate down toward the base of the MPBPH. The MPBPH can also include a horizontal opening at locations 1612, 1614. This opening can facilitate insertion and removal of a firearm butt plate in the horizontal direction, which can be particularly useful for when the firearm is to be secured in a horizontal orientation. For instance, the firearm can be lowered into the MPBPH until it contacts and rests upon the curved portion 1620.

Consistent with particular embodiments, the MPBPH is approximately 3" by 4" in size and can accommodate weapons with butt widths up to 1.625" and 6" long. This will accommodate many (or even most all) non-crew served weapons used by the United States Armed Forces. A slightly larger version of the MPBPH accommodating butt widths up to 2.5" would secure the larger, non-crew served weapons, which may not fit in the 1.625" version.

This is facilitated by making the opening for the weapon stock in the form a V. The butt of the weapon is also slid to the rear of the holder. The butt stock of the weapon can then secured to the base by using a (VELCRO) strapping system.

The MPBPH also includes graspable portions/handles 1610, which can include slots for attaching a securing component such as a flexible strap. This flexible strap can be configured and arranged to secure the butt of the firearm.

Various embodiments are directed toward a strapping system, which can use military spec/flame retardant VELCRO, or other material that meets military specifications. The flame retardant properties can be particularly useful for use on ships and aircraft. In certain instances, the strap can be 1.5" wide and 16" long, although the strap can be longer or shorter if desired. A (black) molded plastic D Ring can be attached (e.g., heat welded) to one end of the strap. The other end can be rounded to prevent injuries from sharp edges. Extending twelve inches from the D ring, the strap is fabricated from VELCRO-type loop material. Four inches of VELCRO hook material can be attached (e.g., heat welded) to the end of the loop material.

To use the strap, a rounded end is inserted up through the slot on either handle 1610 of the MPBPH. The strap is pulled over the butt stock of the weapon, fed down through the other handle, pulled tight and the rounded or hooked end is placed on the loop material and secured. Special cavities have been designed to accommodate the D ring on the sides of the MPBPH next to the handles. When the strap is pulled tight, the D ring is pulled into and can nest flush in one of the cavities. This protects the D ring and allows two MPBPH units to be put side by side without obstruction by the D ring. When not in use, the strap can be fed through the handles and secured to itself.

Consistent with embodiments of the present disclosure, a MPBPH can include one or more openings (or holes) that allow a screw or nail to be used for attaching the MPBPH to different surfaces. For instance, screw/nail holes at locations 1606 allow the MPBPH to be screwed/nailed to a surface that is substantially perpendicular to the orientation of a secured firearm. For instance, if the firearm is secured vertically relative to the ground, the MPBPH can be nailed to the floor or to a similar horizontal surface, such as a table top. Screw/nail hole 1608 allows the MPBPH to be attached to a surface that is substantially parallel to the orientation of a secured firearm. For instance, if the firearm is secured vertically, the MPBPH can be nailed to a wall or to a similar vertical surface. Key slots 1604 allow the MPBPH to be attached to a surface that is substantially parallel to the orientation of a secured firearm; however, the MPBPH and the secured firearm can be rotated ninety degrees relative to when the hole at location 1608 is used. The particular configuration of key slots and screw/nail holes can be modified as desired. For instance, key slots can be used in place of screw/nail holes in either of locations 1606 or 1608 and vice versa. Consistent with embodiments of the present disclosure, the screw holes at locations 1606, 1608 can be countersunk so that the head of a nail or screw does not contact or damage a firearm that is secured in the MPBPH.

Figure 17:
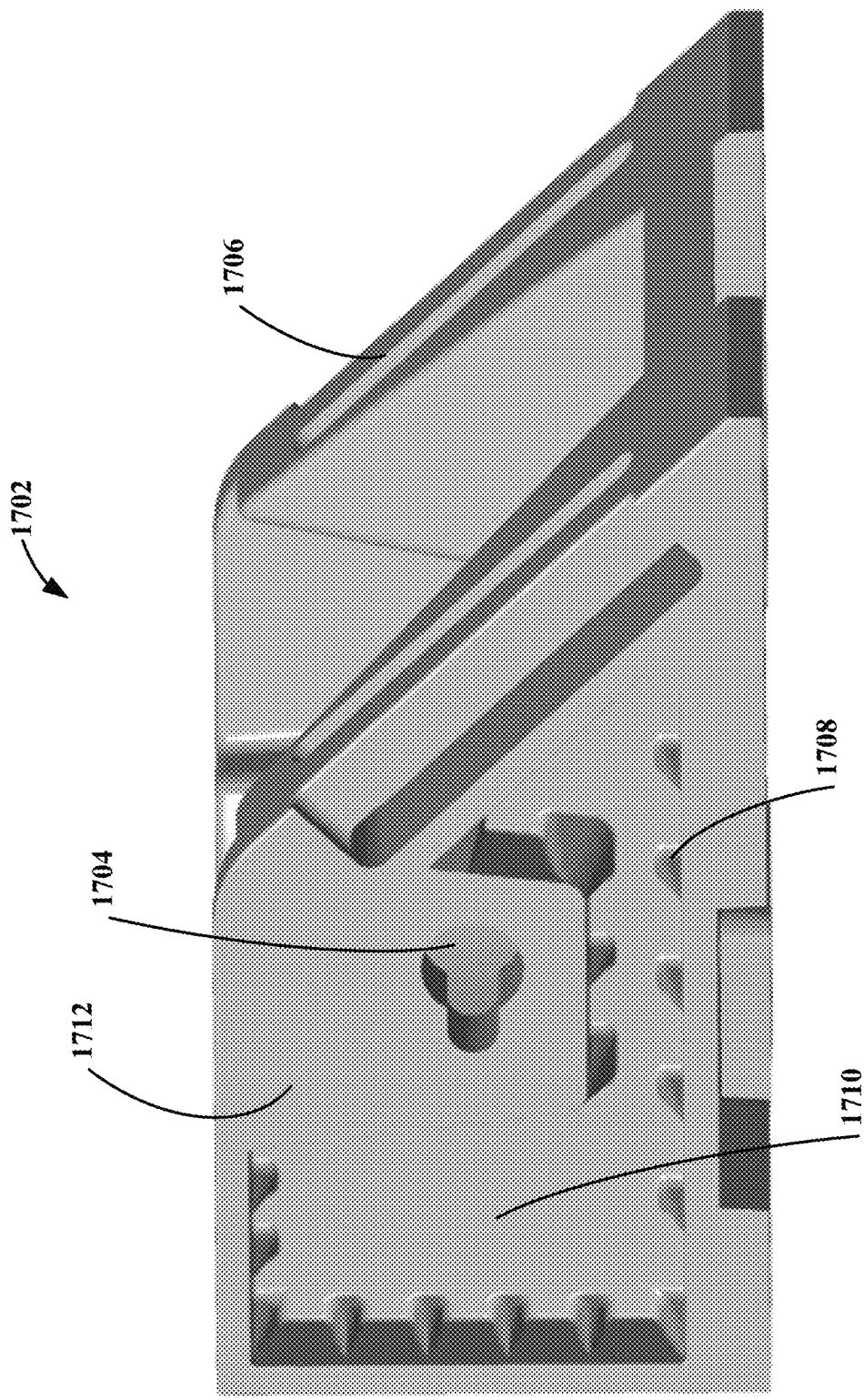
FIG. 17 depicts a side view of an experimental embodiment of an MPBPH, consistent with embodiments of the present disclosure.

FIG. 17 depicts a side view of an embodiment of a MPBPH, consistent with embodiments of the present disclosure. MPBPH 1702 includes both key slot 1704 and slots 1706, as discussed in connection with FIG. 16. Moreover, the sidewall 1712 is configured with a recessed portion 1710 and support fingers/buttresses 1708, which extend from within the recessed portion. The recessed portion 1710 can be useful for reducing the weight of the MPBPH and/or for providing a graspable location. For instance, a person using the MPBPH can more easily grasp the device so that it can be secured onto or removed from a suitable support structure. This is particularly useful when using a reclosable fastener system that requires pressure in order to apply or remove the MPBPH from a support structure. The buttresses 1708 can be configured and arranged to provide additional strength to the sidewalls.

Figure 18:
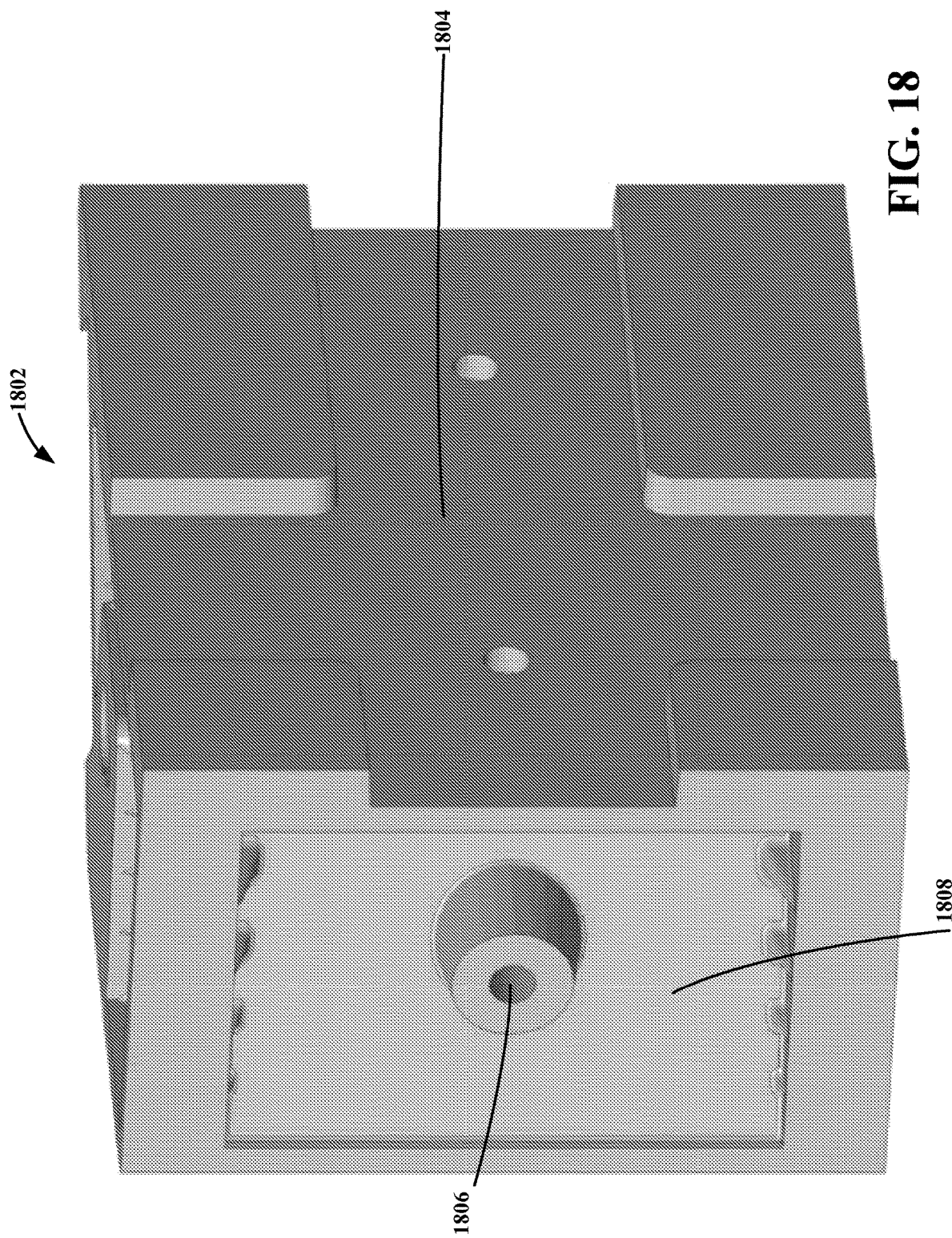
FIG. 18 depicts a view of the bottom and back of an experimental embodiment of an MPBPH, consistent with embodiments of the present disclosure.

FIG. 18 depicts a view of the bottom and back of an experimental embodiment of a MPBPH, consistent with embodiments of the present disclosure. The rear wall of the MPBPH 1802 can include a recessed portion 1808. This recessed portion can be useful for reducing the weight of the MPBPH 1802 and/or for providing a graspable location. As shown in FIG. 18, the recessed portion is deeper toward the bottom the MPBPH 1802 because it follows the change in size/radius for the curved portion of the rear wall. In certain embodiments, support buttresses can be included to provide additional strength.

As shown in FIG. 18, the screw/nail hole can include an extension piece 1806 that is configured and arranged to be flush with the external surface of the rear wall of the MPBPH 1802. This extension piece 1806 can thereby provide additional stability when the MPBPH 1802 is attached to a planar surface, such as a wall.

FIG. 18 also depicts a channel 1804 in the bottom of the MPBPH 1802, formed by a "+" shaped recess. This channel can be filled with one half of a reclosable fastening system, such as 3M Dual Lock, which contains hundreds of mushroom-shaped plastic stems that audibly snap together to form a secure attachment approximately five times stronger than VELCRO. Two opposing pieces of a reclosable fastening system fasten to each other in order to create the bond. In this manner, one half of the reclosable fastening system can be located within the channel 1804, and the other half can be placed upon a support structure, such as a wall or the floor. When a strip of a reclosable fastening system is placed on a support structure, the + shape for the channel 1804 allows for the MPBPH to be turned 90 degrees and still be attached to the applied strip. This can be particularly useful when an object has large protrusions, such as a firearm having a large optical sighting scope.

Aspects of the present disclosure are directed to features of another half of a reclosable fastening system as discussed herein, which allows the device to be secured to a variety of different surfaces. For instance, the other half of the reclosable fastening system (e.g., the Dual Lock material) can be located on a first side of a double-sided strip. The other side of the strip can have an adhesive that allows the strip to be attached to a wall, floor or other structure. The second side can include the other half of the reclosable fastening system that bonds to a MPBPH in a reusable manner.

In particular embodiments, adhesive material (e.g., 3M 250 stem Dual Lock with VHB adhesive: SJ3550CF) can be placed in the channel 1804. The four open ends of the + shaped channel 1804 allow the user to visually line up the two halves of the reclosable fastening system (e.g., to line up Dual Lock on the MPBPH and Dual Lock attached to the fastening surface).

Consistent with embodiments of the present disclosure, the channels can be designed to have a sufficient depth such that the reclosable fastening material (e.g., Dual Lock material) will not interfere with the functions of other fastening components (such as magnets and screw holes), but the material will still be able to interact with the opposing half of the reclosable fastening system. Placing one half of the reclosable fastening system within the channel 1804 can also be useful for allowing the use of screw holes without damaging the reclosable fastening system.

In certain embodiments of the present disclosure, the remaining raised sections can be covered with a gripping material (e.g., Santoprene or a 3M Gripping Material/Tile). This gripping material can be over-molded directly into the bottom of the MPBPH 1802. In particular embodiments, the over-molding can cover all areas other than the locations of magnets, such as two magnets (not shown in FIG. 18) in opposite corners of the lower platform.

Embodiments of the present disclosure are directed toward camouflage and/or concerns over the visibility of the MPBPH 1802 to an enemy combatant. A clear reclosable fastening system can blend with any resin color of the MPBPH 1802. A non-limiting example is 3M SJ3550CF Dual Lock, which has die cut ends that are visible for helping to align the platform channels. A clear foam adhesive allows the SJ3550CF to blend with different resin color.

Embodiments of the present disclosure are directed toward the use of additional pieces of reclosable fastening material, as well as providing an isopropyl alcohol wipe to clean a surface to which the reclosable fastening system is to be adhered.

Reclosable fastening systems are available in varying bond strengths (e.g., Dual Lock has different stem densities, with a higher stem density resulting in a stronger bond). The particular bond strength can be selected according to the particular application. Embodiments of the present disclosure are directed toward MPHDs that provide bond strength that meets a threshold value. The threshold bond strength can be met by modifying several factors. One factor is the type of reclosable fastening system that is used. For instance, the stem density is a variable for reclosable fastening systems such as Dual Lock. Another factor is the total area available for bonding. This can be controlled by adjusting the amount/area of useable reclosable fastening material that is on the MPHD and/or on the surface to which the MPHD is to be attached. In certain embodiments, different sized strips can be designed for attachment to the surface. A user of the MPHD can select the appropriate strip size based upon the desired bond strength. For instance, the user may seek greater bond strength when the surface is a ground vehicle that will be traveling over rough terrain and less bond strength when the surface is a stable structure, such as the wall of a building.

To properly engage (attach together) two pieces of Dual Lock, a rocking motion should be employed, fastening the pieces from one end to the other. The force required to disengage or separate two pieces of Dual Lock is twice the amount of force required to engage the pieces. The use of Dual lock allows an MPHD to be secured in a stationary manner to any surface, both vertically and horizontally (even upside down) and in all weather conditions.

Although not shown, the bottom of an MPHD can also include one or more magnets. These magnets can be located within cavities, or recesses, designed to house the magnets. For instance, circular depressions can be placed in each corner, sized and configured to accommodate corresponding magnets (e.g., neodymium-iron-boron (NdFeB) magnets). The circular magnets can snap into the molded depressions without the use of glue or adhesives; however adhesives can be used instead (or in addition). Experimental testing suggests that fewer than four magnets can provide sufficient holding power; however, the use of four magnets may be particularly useful in situations where very high levels of magnetism are required.

Consistent with certain embodiments, the magnets have a phenolic coating. This coating can be particularly useful for several reasons. For instance, the phenolic coating can dull the magnets by coloring them black, which can reduce the visibility of an MPHD and help with camouflage. Moreover, magnets, such as NdFeB magnets, can be subject to corrosion. The phenolic coating can provide corrosion resistance, abrasion resistance and chemical resistance.

Other embodiments of the present disclosure recognize that it may not be desirable to have multiple attachment mechanisms being used concurrently. For instance, if an MPHD is placed on a ferromagnetic wall, the combination of the magnet, gripping material and adhesive may require a detachment force that exceeds the desired range (e.g., relative to human hand strength). Accordingly, embodiments of the present disclosure are directed toward temporarily disabling one or more attachment mechanisms. As a non-limiting example, a thin (plastic) covering piece can be provided to cover the adhesive portion of the MPHD. The covering piece can thereby prevent the adhesive from sticking to a wall or similar structure, while still allowing the magnets to be used as the primary attachment mechanism. The covering piece can also protect the adhesive portion from exposure to dirt or other contaminants which might be on the wall. In one instance, this covering piece can be held in place by the adhesive portion itself; in other instances, the covering piece can snap or slide into place. Moreover, the covering piece can be used to protect the adhesive portion from damage or wear while the WPHD is not in use.

Figure 19:
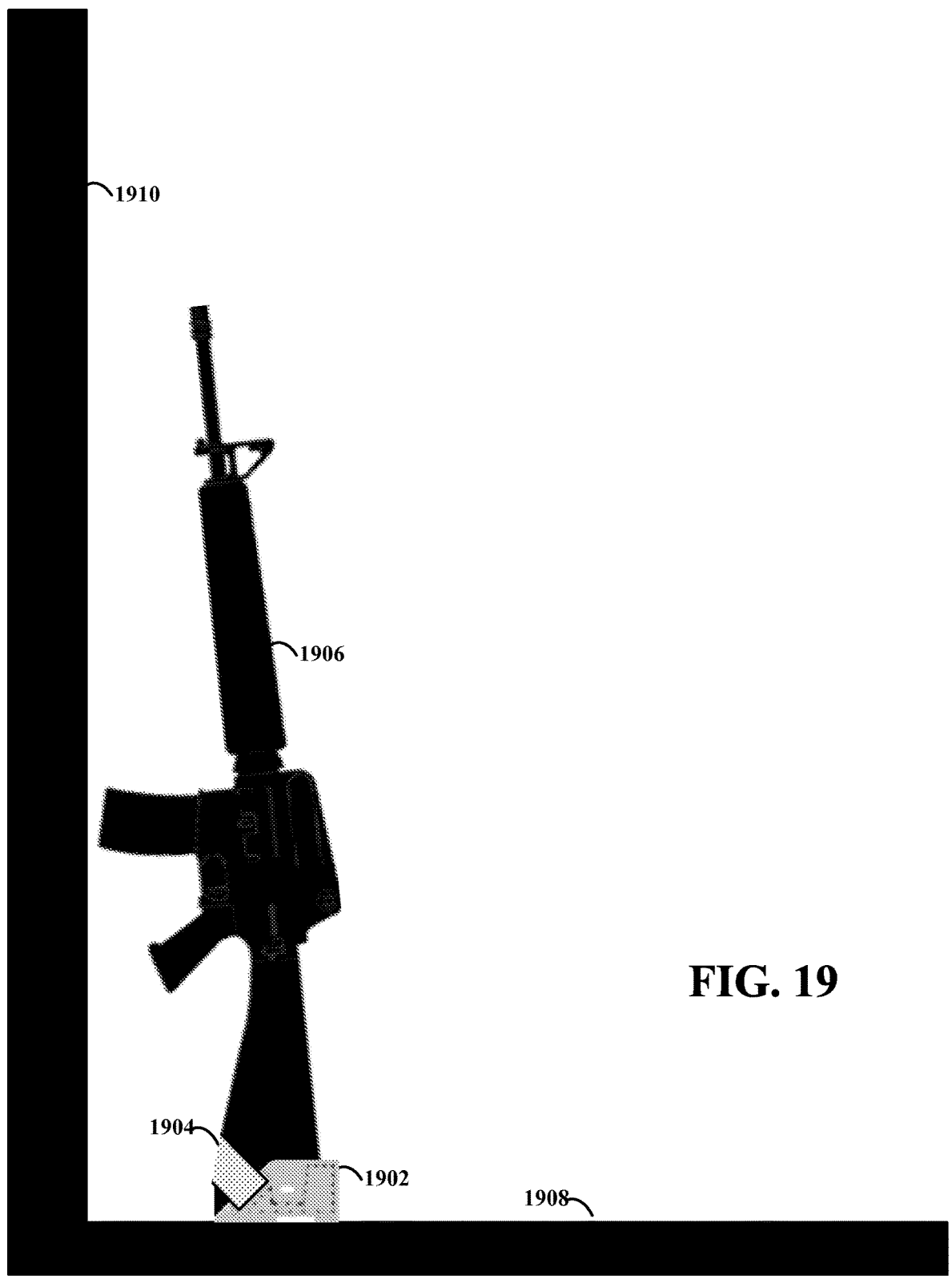
FIG. 19 depicts an MPBPH used to secure an object such as a firearm in a substantially vertical fashion, consistent with embodiments of the present disclosure.

FIG. 19 depicts a MPBPH used to secure a firearm in a substantially vertical fashion, consistent with embodiments of the present disclosure. Firearm 1906 is shown as being secured by MPBPH 1902. MPBPH 1902 is secured to the horizontal surface 1908 (e.g., the floor of a building, vessel or aircraft). For instance, MPBPH 1902 can be fastened to surface 1908 using one or more of a reclosable fastening system, screws, nails or magnets.

The butt of the firearm 1906 is placed within the MPBPH 1902 such that the sidewalls help to secure the firearm 1906. In this manner, the firearm 1906 is prevented from falling side to side by the sidewalls. Strap 1904 can then be used to further secure firearm 1906. Firearm 1906 can also be stabilized by being in contact with the vertical surface 1910

(e.g., a wall of a building, vessel or aircraft). Thus, MPBPH 1902 can be located sufficiently close to accommodate this contact with the vertical surface 1910. Moreover, a MPWH device (not shown) can also be used in conjunction with the MPBPH 1902.

Consistent with certain embodiments, additional support devices or elements can be used in conjunction with MPBPH 1902. For instance, a support device can be placed on vertical surface 1910 to secure the barrel of the firearm 1906.

When the firearm 1906 is removed from the storage location, the MPBPH 1902 can also be removed so that it can later be used in another location. For instance, a solider may place a first strip of a reclosable fastener on the floor in a first location of a naval vessel. The MPBPH 1902 can then be secured to the strip of a reclosable fastener and the firearm 1906 can be secured. When the solider leaves this area, the firearm 1906 can be removed along with the MPBPH 1902. The solider may subsequently place a second strip of a reclosable fastener on the floor in a second location of a naval vessel, and use the MPBPH 1902 at this second location. Soldiers can then continue to reuse these strips whenever they are in either of these locations.

Figure 20:
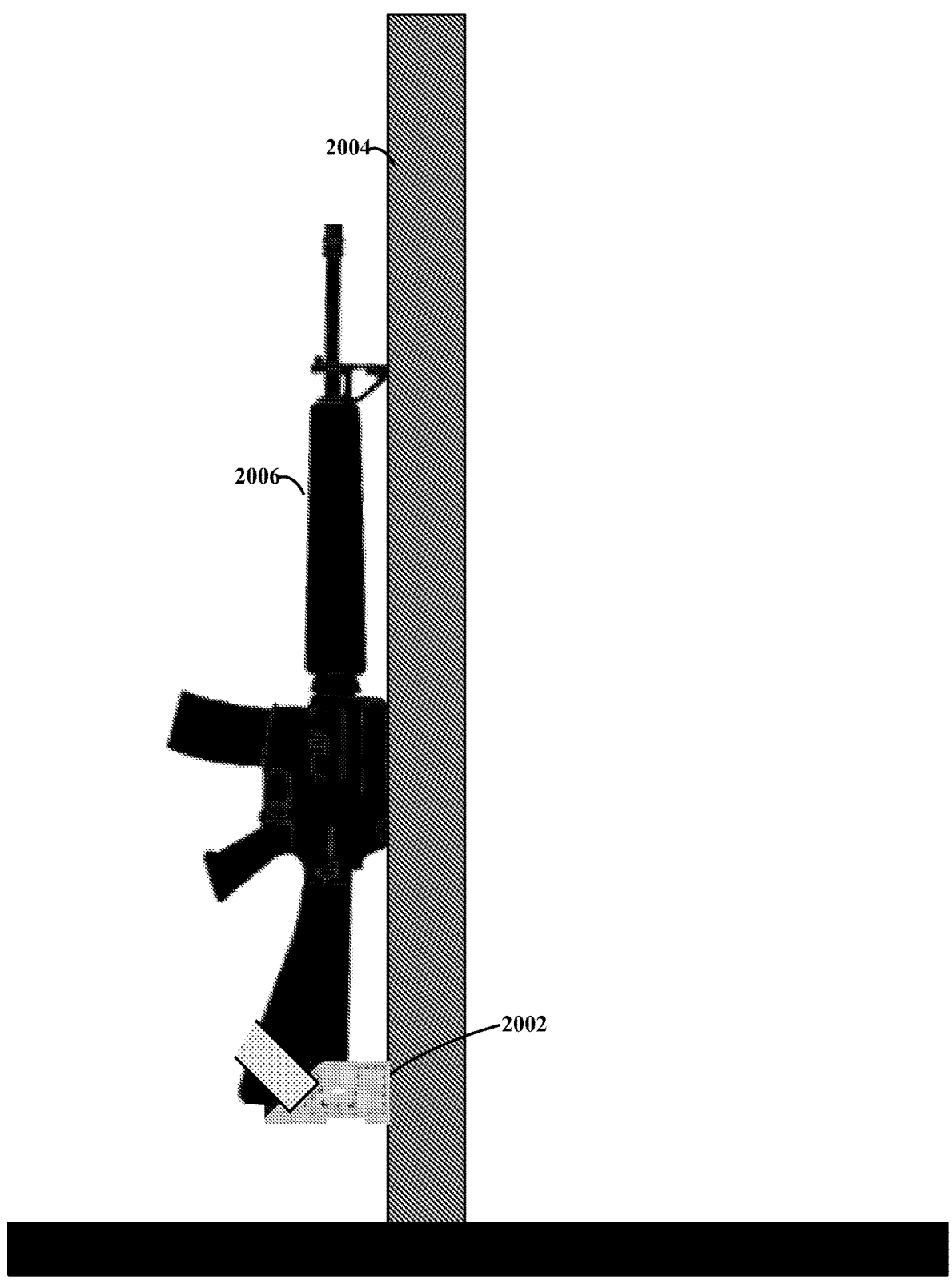
FIG. 20 depicts an MPBPH used to secure an object such as a firearm in a substantially vertical fashion while raised off of the ground, consistent with embodiments of the present disclosure.

FIG. 20 depicts a MPBPH used to secure a firearm in a substantially vertical fashion while raised off of the ground, consistent with embodiments of the present disclosure. FIG. 20 shows some of the versatility of the MPBPH 2002. Here, the MPBPH 2002 has been fixed to vertical surface 2004. This allows for the firearm 2006 to be secured off of the ground, which may protect the firearm from water and/or place the firearm at a more convenient height for retrieval. Moreover, a MPWH device (not shown) can also be used in conjunction with the MPBPH 2002.

Figure 21:
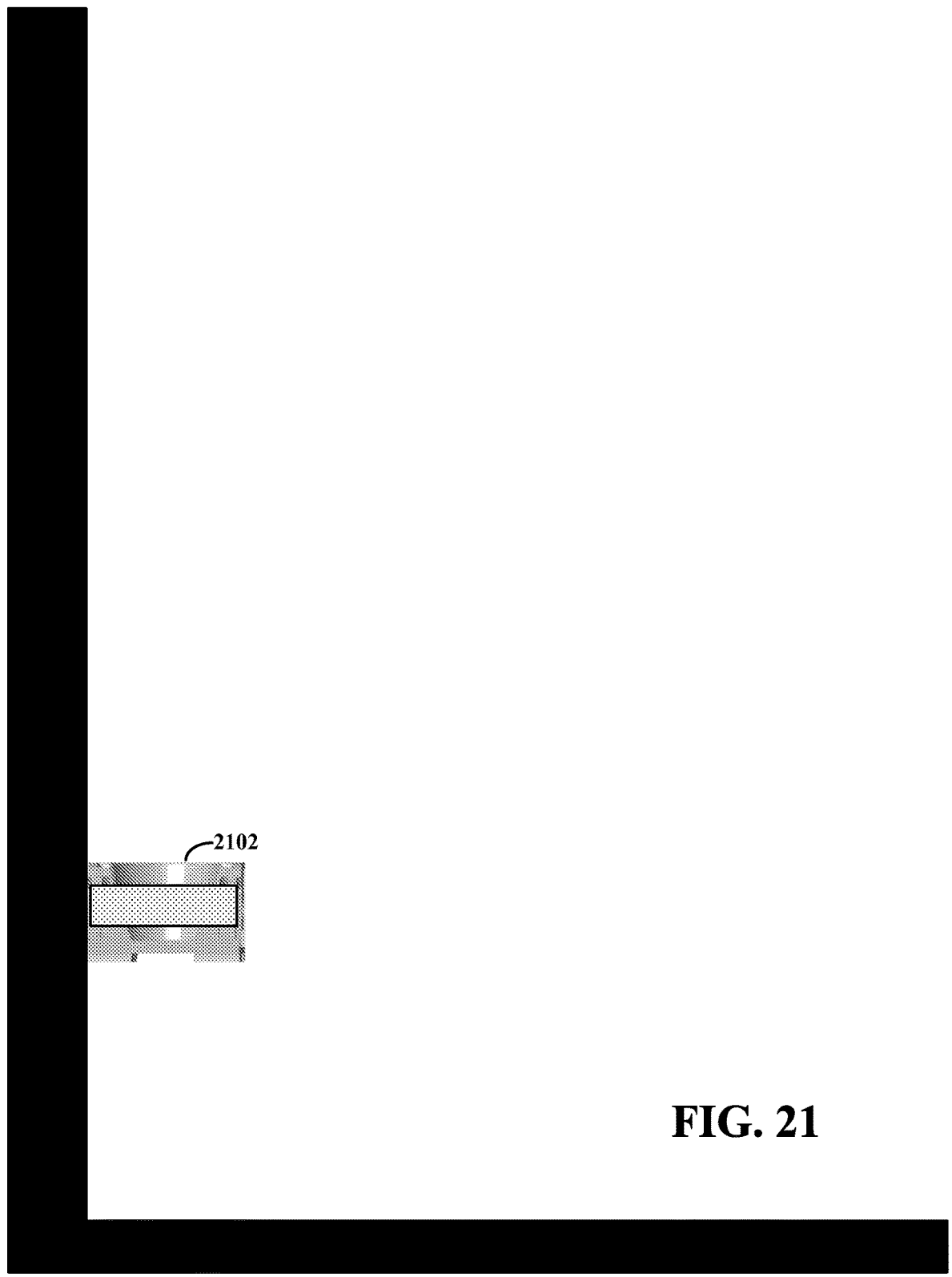
FIG. 21 depicts an MPBPH used to secure an object such as a firearm in a substantially vertical fashion while raised off of the ground and rotated, consistent with embodiments of the present disclosure.

FIG. 21 depicts a MPBPH used to secure a firearm in a substantially vertical fashion while raised off of the ground and rotated, consistent with embodiments of the present disclosure. The MPBPH 2102 is attached off of the ground, as shown in FIG. 20; however, the MPBPH 2102 has been rotated ninety degrees. This can be particularly useful for accommodating different sized and shaped firearms, which might otherwise not fit against the attached wall. A WWII device (not shown) can also be used.

FIG. 22 depicts a MPBPH with a non-planar attachment surface, consistent with embodiments of the present disclosure. Embodiments of the present disclosure are directed toward the use of attachment surface(s) that can be specially designed in non-planar configurations. This can facilitate attachment to different, non-planar surfaces. For instance, it may be desirable to attach the MPBPH 2208 to a curved surface (such as a round pole 2202) or to an angled surface (such as the corner of a building). Consistent with certain embodiments, customized MPBPHs can be designed with an outer surface that has the desired shape, whether curved, angled or otherwise. FIG. 22 depicts alternate embodiments where a MPBPH 2208 with a relatively planer outer surface is modified by adding an attachment surface 2204 that has the desired shape (depicted here as curved). An interface piece 2206 can (optionally) connect the attachment surface 2204 to the MPBPH 2208.

It has been recognized that large scale uses of MPBPH devices by organizations such as the U.S. military can benefit from the use of modular components that can be readily replaced, changed and supplemented. For instance, certain types of reclosable fasteners can deteriorate from exposure to dirt, chemicals or environmental factor, and it can be important for a soldier to be able to quickly and securely replace damaged fasteners. The MPBPH device can be configured and arranged to allow a soldier to replace part or all of the reclosable fasteners while in the field, in seconds, and without tools.

The use of reclosable fasteners that are connected with adhesive can facilitate this action. For instance, damaged reclosable fasteners can be removed and replaced by pulling off (or scraping off) the reclosable fasteners, without having to scrap the entire MPBPH device.

Optional text, such as safety instructions, can be molded into the sides of the MPBPH. The section of the mold containing the instructions can be in the form of a removable plate that can be changed to accommodate different instructions, even different languages (sometimes referred to as a "slug").

Consistent with certain embodiments, a MPBPH device can be configured designed to accommodate a strapping system that can serve a number of purposes, including securing a weapon within the MPBPH device. The handles can also been designed to withstand forces necessary to disengage the MPBPH device when engaged with a surface (e.g., with adhesives, Dual Lock or magnets). A soldier can disengage the MPBPH by pulling in an upward motion directly on a handle or the strap.

Various embodiments are directed toward a strapping system, which can use military spec/flame retardant hook-and-loop or VELCRO material. The flame retardant properties can be particularly useful for use on ships and aircraft. A black molded plastic D Ring can be attached (e.g., heat welded) to one end of the strap. The other end can be rounded to prevent injuries from sharp edges. Extending twelve inches from the D ring, the strap is fabricated from VELCRO-type loop material. Four inches of VELCRO hook material can be attached (e.g., heat welded) to the end of the loop material.

To secure a weapon, the strap can be fed up through one of the slotted handles, placed over the top of the butt stock of the weapon and down through the other slotted handle. When the strap is pulled tight, the D ring can be designed to rest within the specially designed cavities on the outer edges of the MPBPH (behind/next to the slotted handles). To secure the strap, the rounded end is pulled tight and placed against the loop material over the sheath. To release the strap, the rounded end is pulled in an upward direction.

In addition to securing a weapon in the MPBPH, the strap can be used to disengage the MPBPH by pulling the strap in an upward motion when the unit is fastened by reclosable fasteners or magnets.

The MPBPH can be molded using Santoprene or other resins. Santoprene has properties similar to vulcanized rubber and is strong enough to withstand being stepped on and having metal butt plates pushed into it repeatedly. Various components of the MPBPH can also be designed to function in extreme temperature ranges to assure proper functioning from Arctic to desert conditions. For instance, Santoprene meets the needs of temperature extremes faced by the military with a functional range from −60° C. to 135° C. (−81° F. to 275° F.) with no cracking or tackiness. Santoprene also has good resistance to many acids, bases and aqueous solutions. A dull black color and stealthy matte finish can be used to reduce the amount of reflected light, which can improve camouflage qualities. In other embodiments, different types of materials, such as thermoplastics or a mixture of (virgin) ABS resins and fiberglass can be used. If the materials are smooth, the exterior surfaces can be heavily textured to achieve a sandpaper-like texture for easy gripping even in wet conditions.

The MPBPH can be designed to be small enough and light enough to be portable for use in the field. In a vehicle or airplane, the strap can also be used to prevent a weapon from dislodging due to bumps or turbulence. Moreover, the strap can secure additional components such as a removal tool or covering piece, as discussed herein. The MPBPH can be semi-permanently attached to almost any surface for side by side use in any type of weapon storage equipment, unit or facility.

Weapons that are stored shipboard must often contend with rolling seas and engine vibration, conditions that regularly cause weapon damage. Newer ships are being made of lighter metals such as stainless steel and aluminum. Magnets will not work on these metals. The MPBPH's Dual Lock fastening system can be designed to work on these metals and the VELCRO strap will help to secure weapons and minimize damage in rough weather.

Consistent with embodiments of the present disclosure, the design may employ multiple methods of securing the MPBPH to a wide range of surfaces. These methods include a fastener material such as 3M Dual Lock®, key slots, and magnets. A gripping material can also be used to resist sheering pressures. The combination of Dual Lock, magnets, gripping material and key slots allow the MPBPH to securely adhere to almost any surface under any condition. For instance, embodiments of the present disclosure recognize that the MPBPH can be used to secure a weapon/firearm on vertical, horizontal and sloped planes, and recognize that the MPBPH can be secured to almost any surface.

The MPBPH can be designed to facilitate the safe handling and storage of military and tactical weapons. For example, the MPBPH can be designed to secure a rifle in a wide range of conditions. Many of the MPBPH features can be specifically designed for use by members of the Armed Forces. These features can be also useful for other tactical organizations using weapons, e.g., Homeland Security, Border Patrol, state and local police departments, and SWAT teams.

Figure 23:
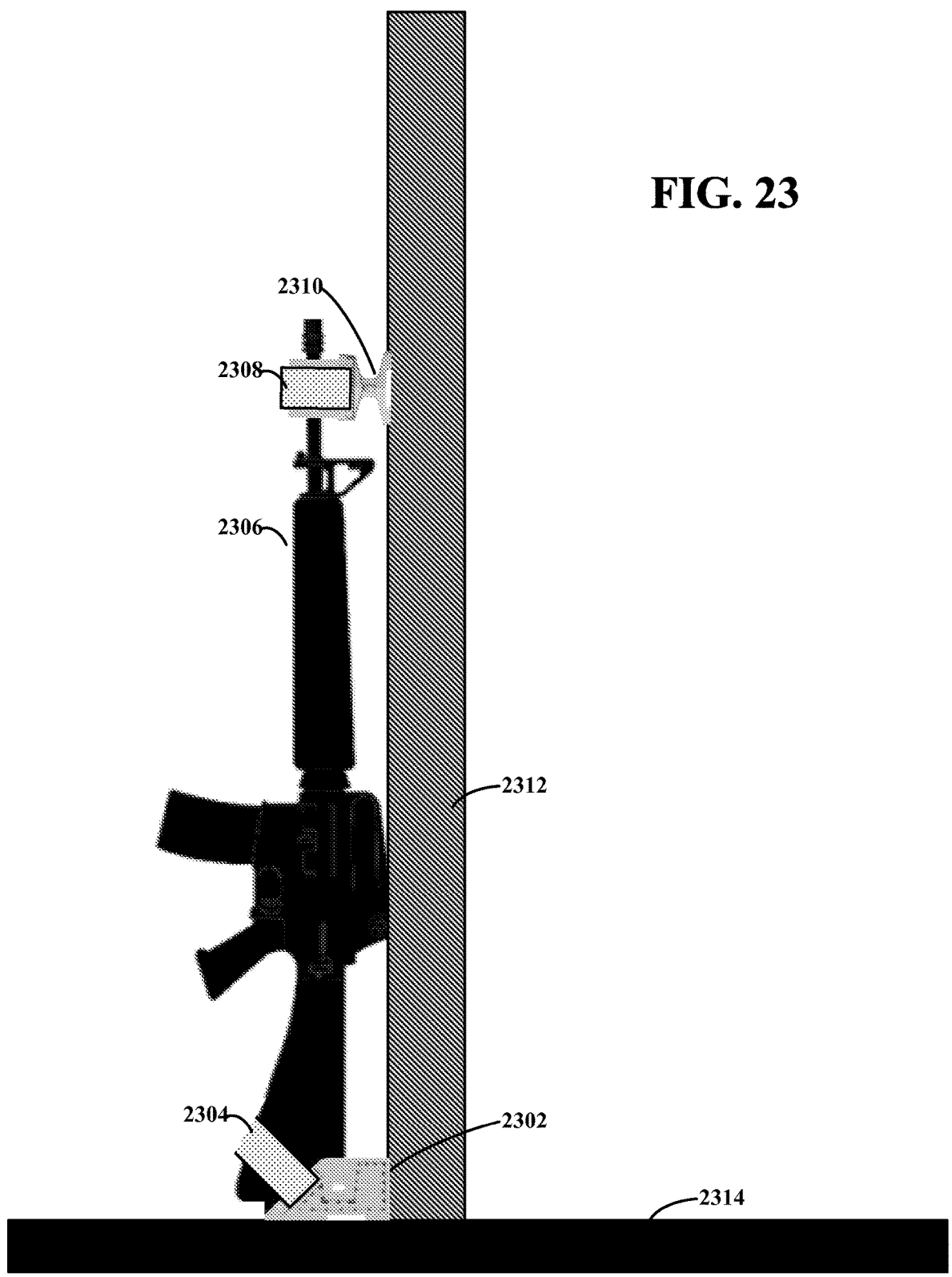
FIG. 23 depicts use of a system including both a MPWH and a MPWBH device against a vertical structure, consistent with embodiments of the present disclosure.

FIG. 23 depicts use of a system including both a MPWH and a MPWBH device against a vertical structure, consistent with embodiments of the present disclosure. The system shown in FIG. 23 includes both a MPWH device 2310 and a MPWBH device 2302. Together these devices can be used to secure firearm 2306 in a secure and efficient manner. Straps 2304 and 2308 can be used to provide additional stability and support. As discussed herein, each of the MPWH device 2310 and the MPWBH device 2302 can be designed with multiple securing options. This allows for the devices 2302, 2310 to be secured to various support structures (such as a wall 2312 and/or a floor 2314) in any of a number of different manners.

Consistent with certain embodiments, the MPWBH device 2302 can be secured in a semi-permanent manner using screws or nails. At the same time, the MPWH device 2310 can be secured using magnets or a reclosable fastener system. This can be particularly useful for allowing different soldiers to share the use of the MPWBH device 2302, while keeping and using their own MPWH device 2310, Moreover, this can facilitate the use of different sized firearms with the same MPWBH device 2302. For example, each time the MPWBH device 2302 is used, a solider can position their own MPWH device 2310 at the proper height for their firearm.

Consistent with embodiments of the present disclosure, the MPWBH device 2302 can be positioned further out from the wall 2312. This allows the firearm 2306 to be secured at a desired angle relative to the floor 2314.

Figure 24:
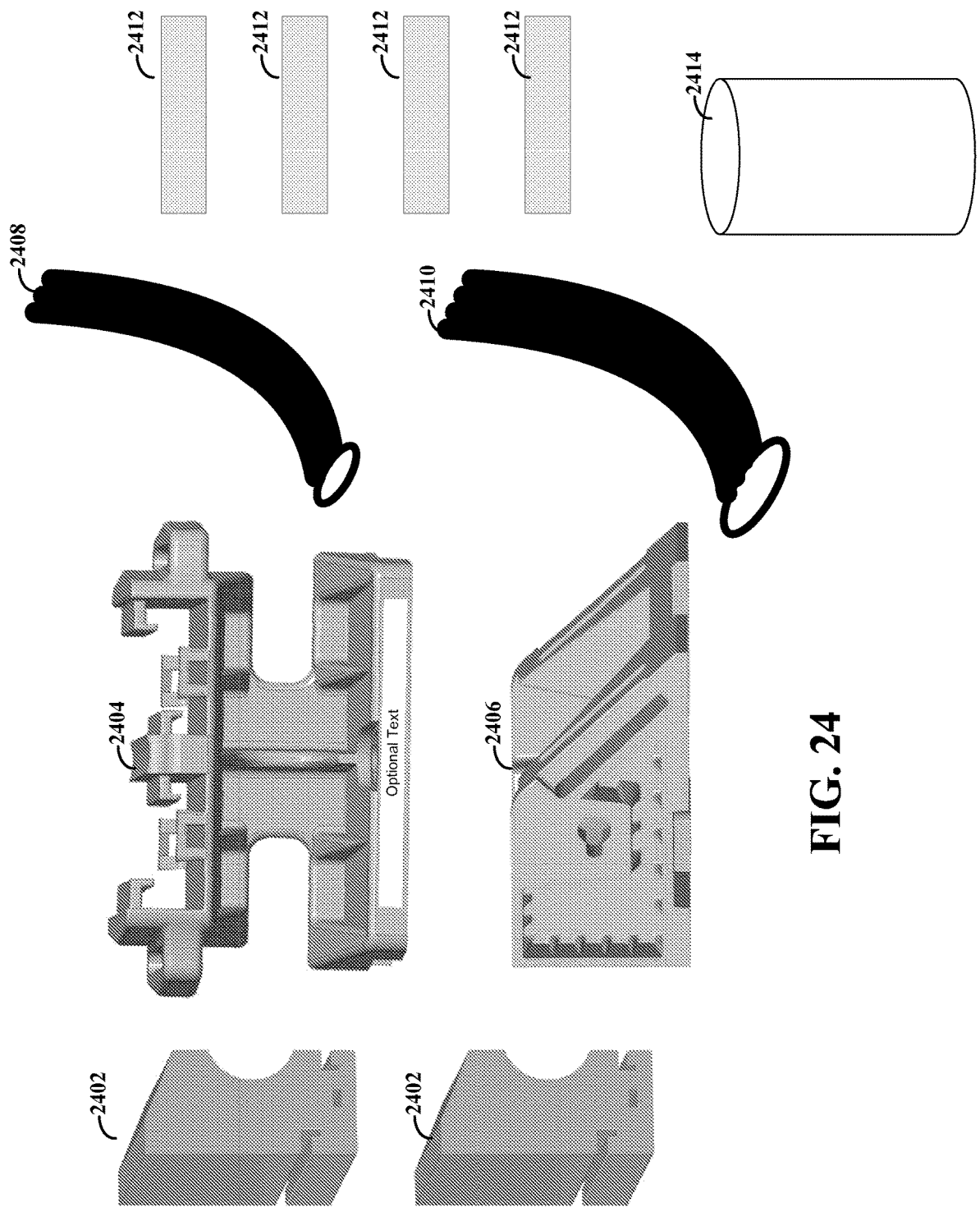
FIG. 24 depicts a kit for use in securing objects such as firearms, consistent with embodiments of the present disclosure.

FIG. 24 depicts a kit for use in securing objects, consistent with embodiments of the present disclosure. The kit can include one or more of the depict component elements. These elements include a base 2404. Two or more deformable pieces 2402 can be included. These deformable pieces 2402 can be configured and arranged to snap into place within the base 2404. A device 2406 can also be part of the kit. One or more straps 2408 and 2410 can be included for use with base 2404 and/or device 2406. In certain embodiments, these straps 2408 and 2410 can include D-rings and/or hook-and-loop fasteners.

Consistent with embodiments of the present disclosure, the kit can include components designed for use in attaching the base 2404 and/or device 2406 to various support-structures. For instance, strips 2412 can be provided. One side of the strips 2412, an adhesive, can be covered by a peelable protective layer. The other side of the strips 2412 can include one half of a reclosable fastener system. The other half of the reclosable fastener system can be on the base 2404 and/or device 2406. A user of the kit can remove the peelable protective layer, place the strips 2412 at desired locations and then bond the base 2404 and/or device 2406 thereto.

The kit can also be configured to include cleaner 2414. This cleaner can be used to clean the support structure and/or the reclosable fastener system before the strips are used. For instance, cleaner 2414 can be a container with an isopropyl alcohol wipe to clean a surface before it is used.

FIG. 25 depicts a plurality of MPHDs used together, consistent with embodiments of the present disclosure. In certain embodiments, devices 2504 and devices 2502 can be designed with similar (or identical) outer diameter sizes. This allows for many devices 2504 and devices 2502 to be easily aligned in a row while using as little space as possible.

Figure 26A:
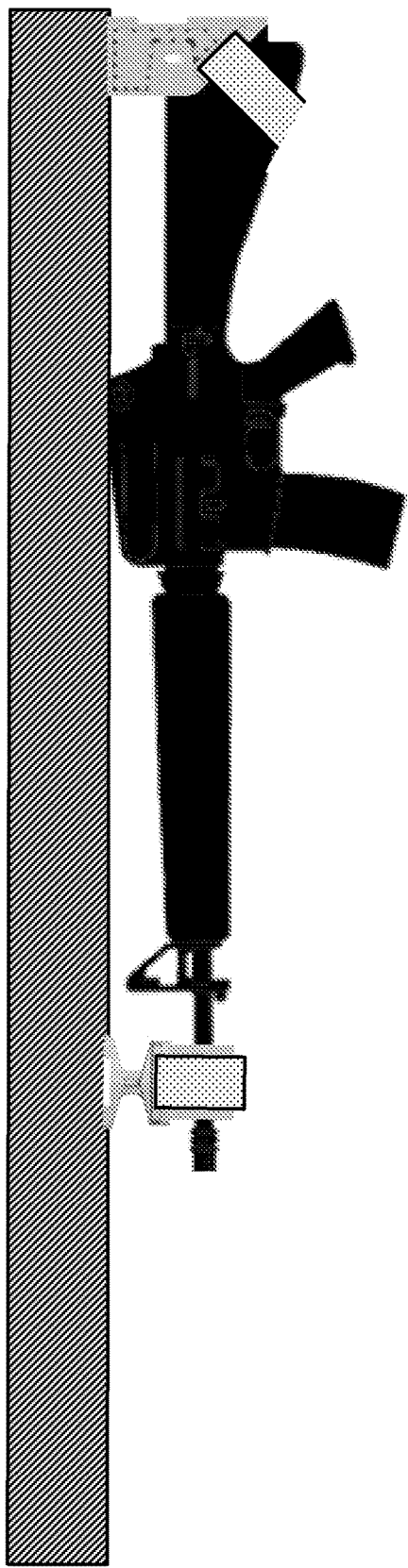
FIG. 26A depicts a use of MPWH and MPWBH devices that allows an object such as a firearm to be secured in a first horizontal manner, consistent with embodiments of the present disclosure.

FIG. 26A depicts a use of MPWH and MPWBH devices that allows a firearm to be secured in a first horizontal manner, consistent with embodiments of the present disclosure. FIG. 26A shows the flexibility and robust nature of embodiments of the systems of the present disclosure. In particular, the combination of strapping systems and multiple attachment options can allow for a firearm to be "hung" from the underside of a structure (e.g., underneath a table or from a ceiling).

Figure 26B:
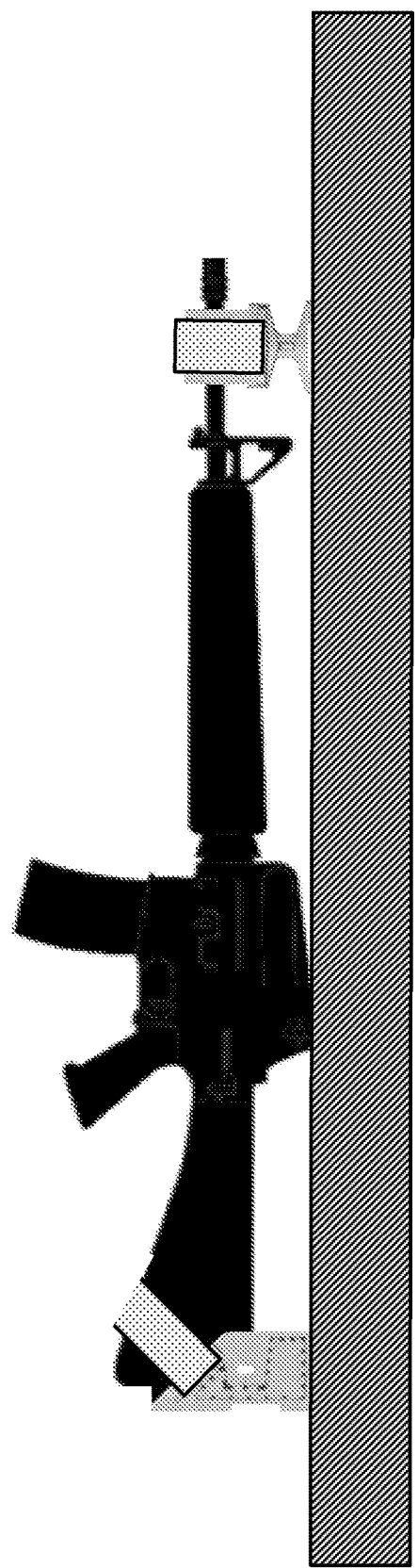
FIG. 26B depicts a use of MPWH and MPWBH devices that allows an object such as a firearm to be secured in a second horizontal manner, consistent with embodiments of the present disclosure.
Figure 27:
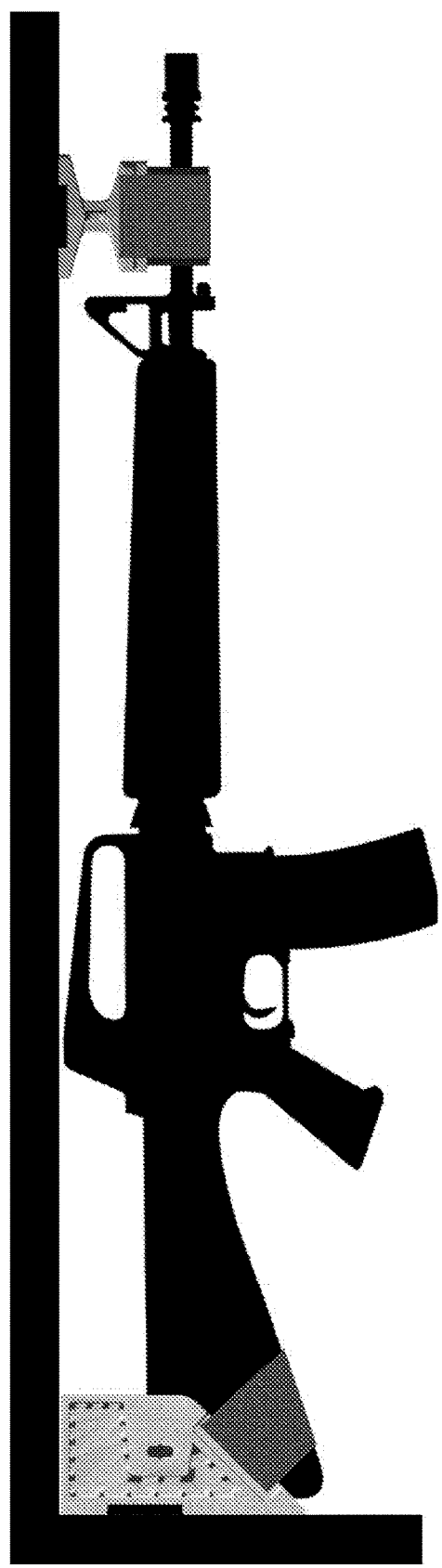
FIG. 27 depicts a kit for use in securing objects such as firearms, consistent with embodiments of the disclosure.
Figure 28:
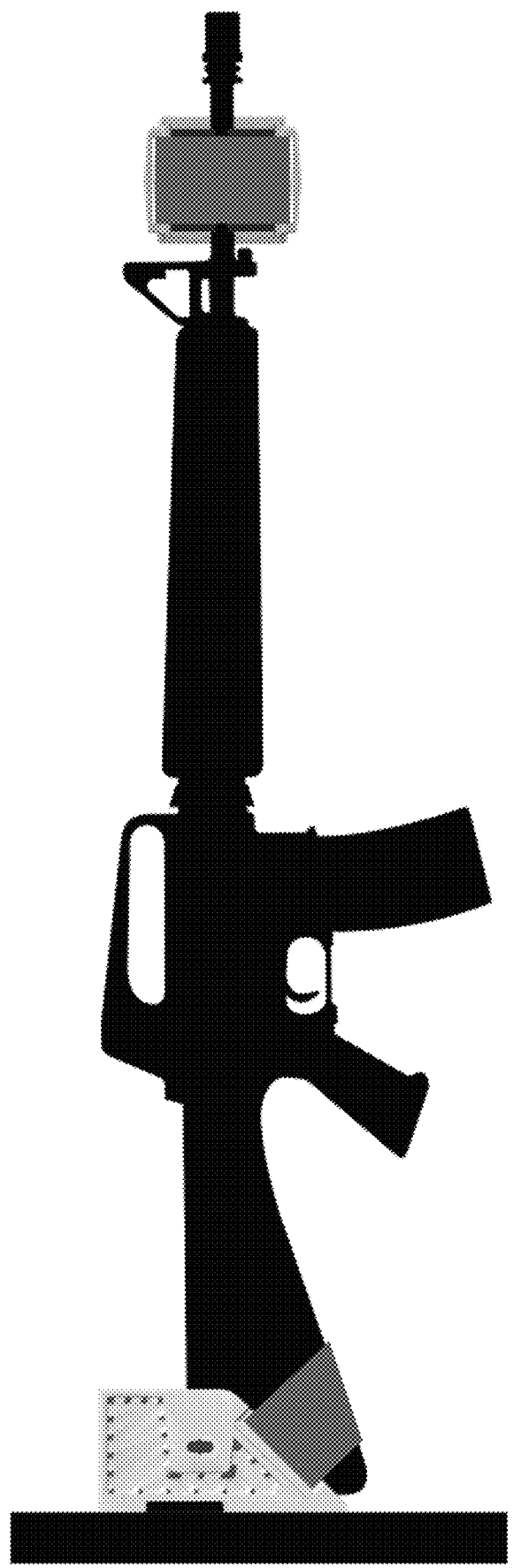
FIG. 28 depicts a kit for use in securing objects such as firearms, consistent with embodiments of the disclosure.
Figure 29:
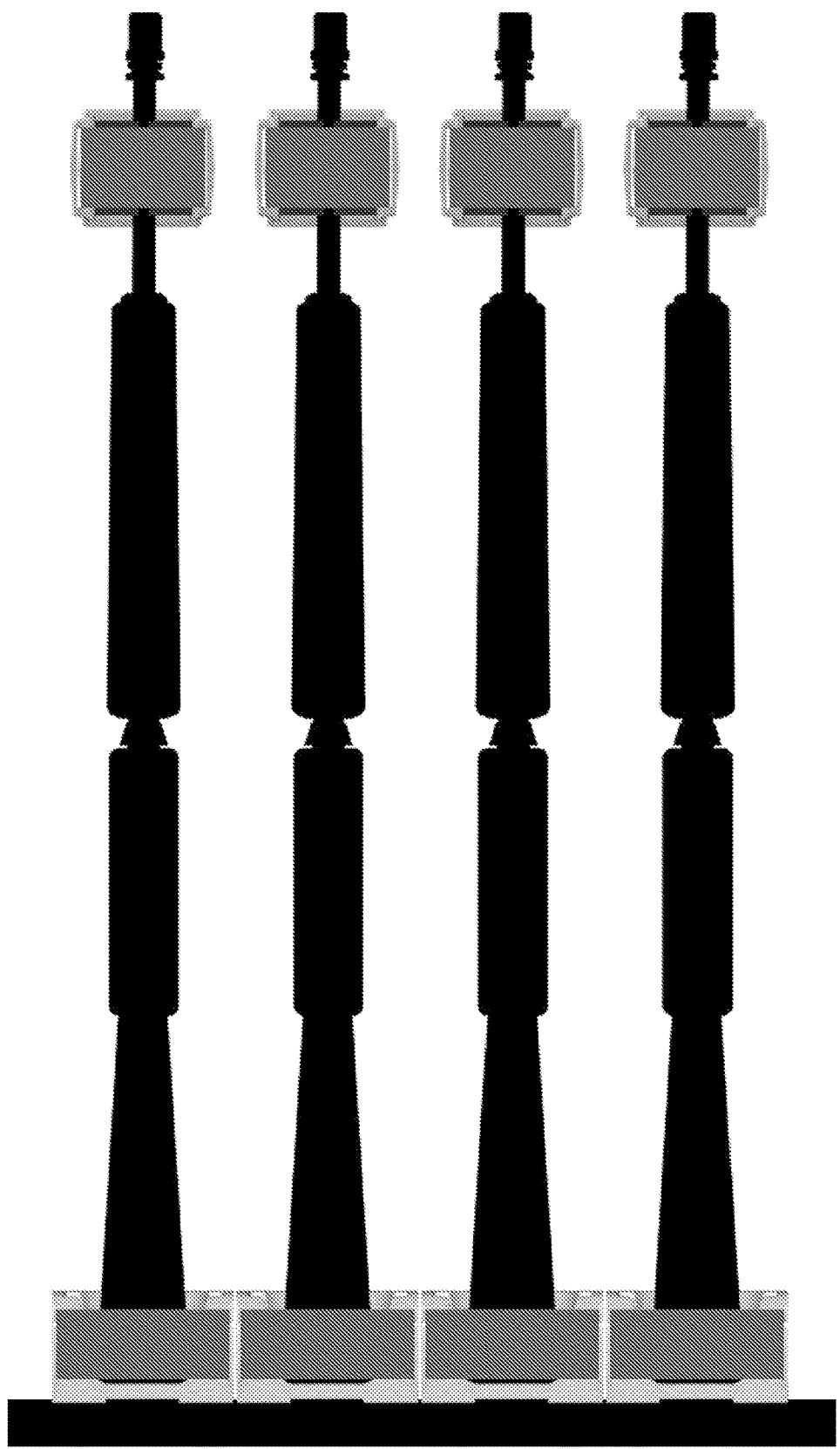
FIG. 29 depicts a kit for use in securing objects such as firearms, consistent with embodiments of the disclosure.
Figure 30:
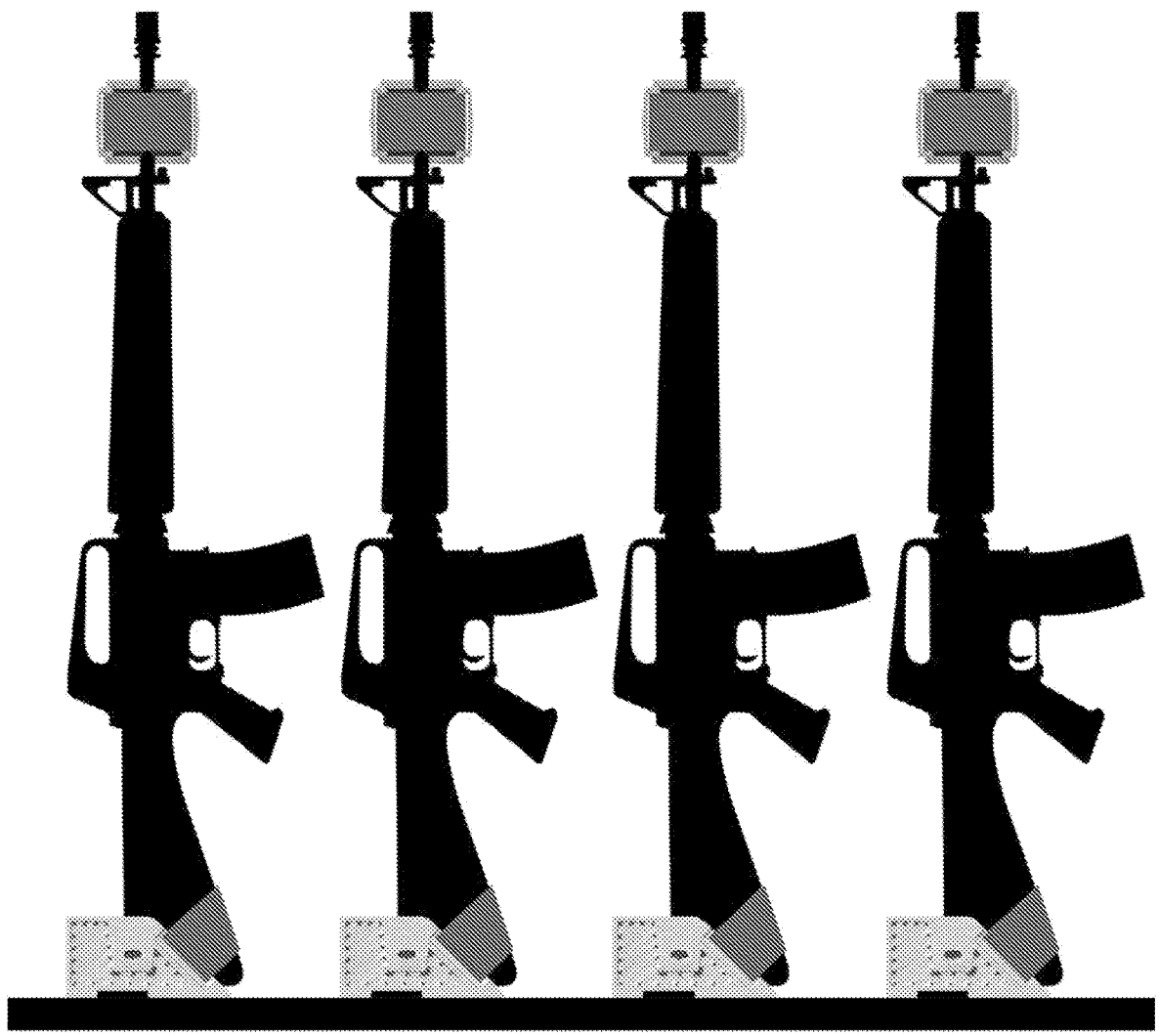
FIG. 30 depicts a kit for use in securing objects such as firearms, consistent with embodiments of the disclosure.
Figure 31:
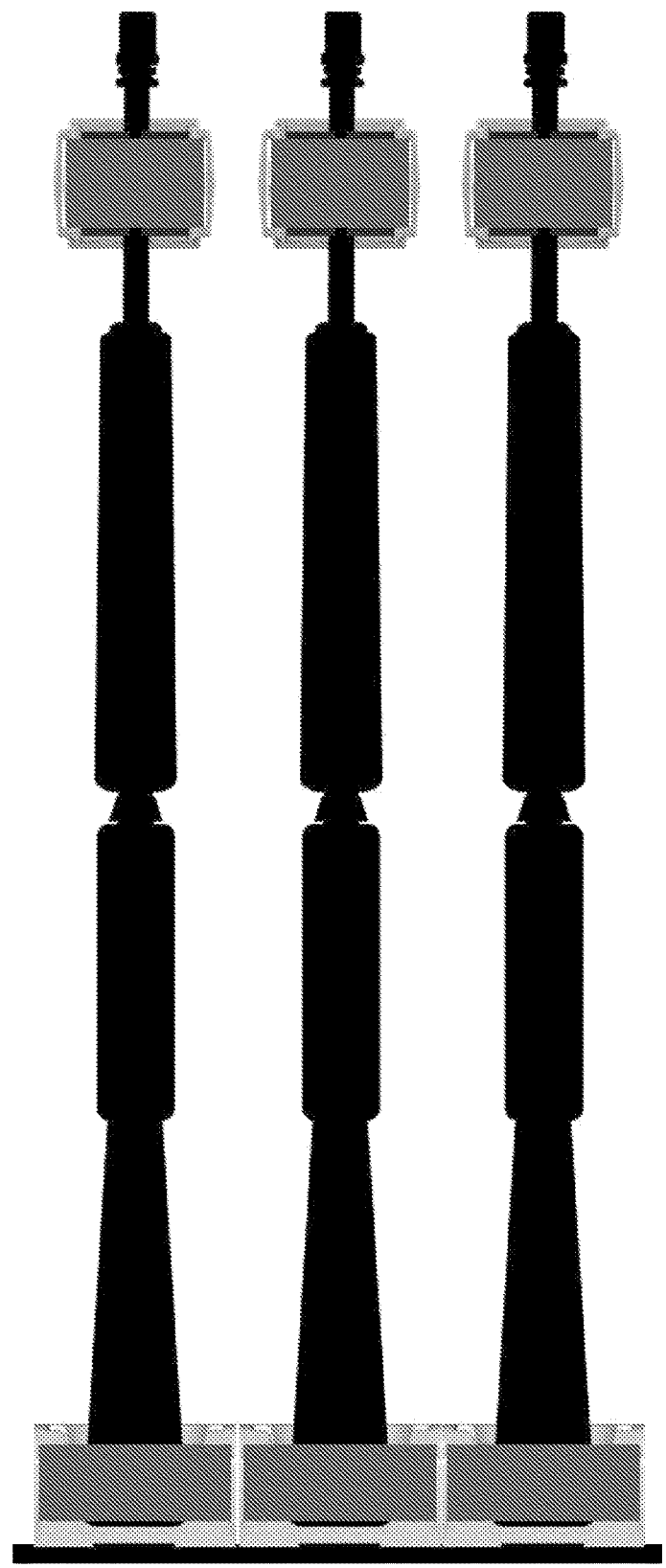
FIG. 31 depicts a kit for use in securing objects such as firearms, consistent with embodiments of the disclosure.
Figure 32:
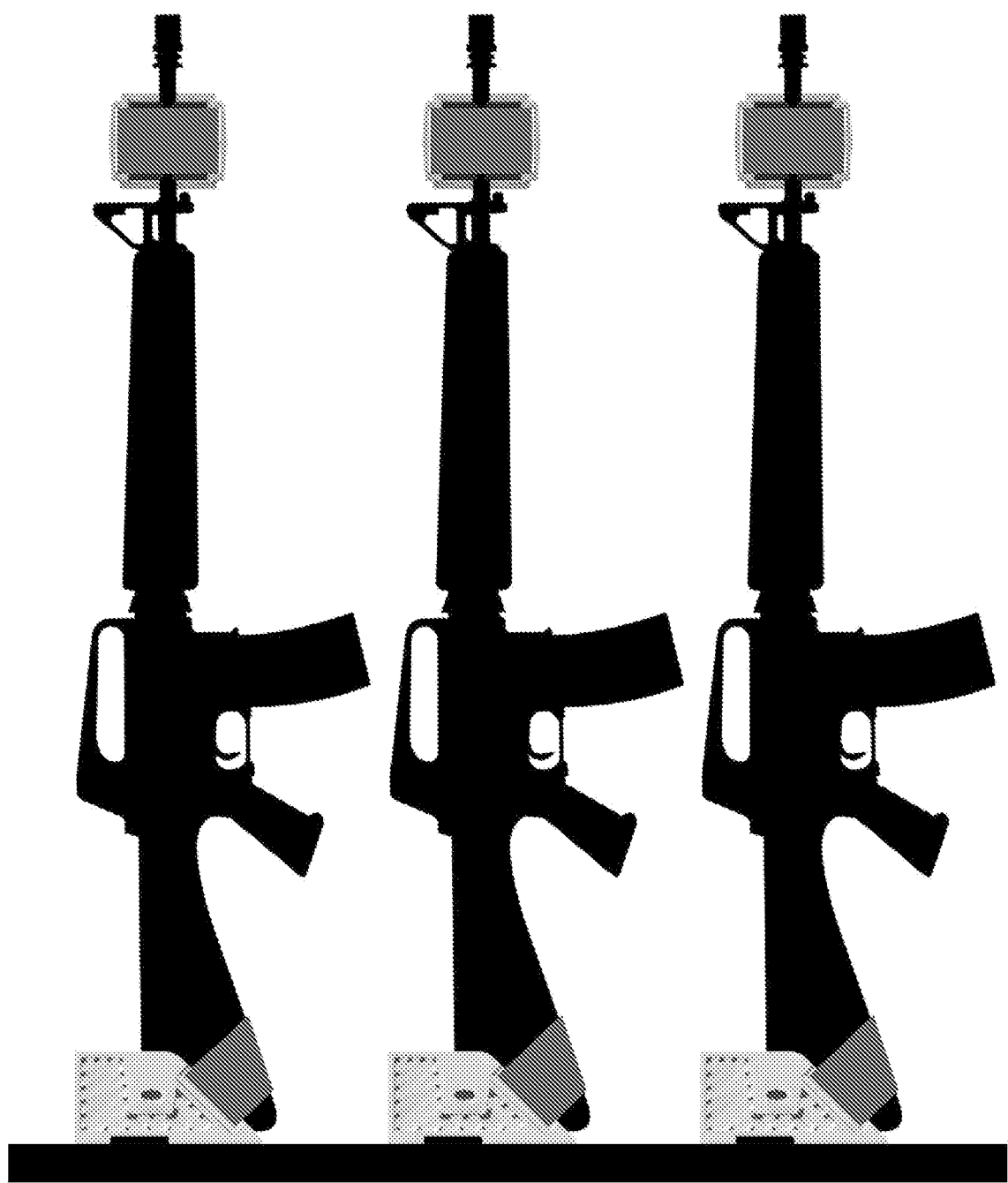
FIG. 32 depicts a kit for use in securing objects such as firearms, consistent with embodiments of the disclosure.
Figure 33:
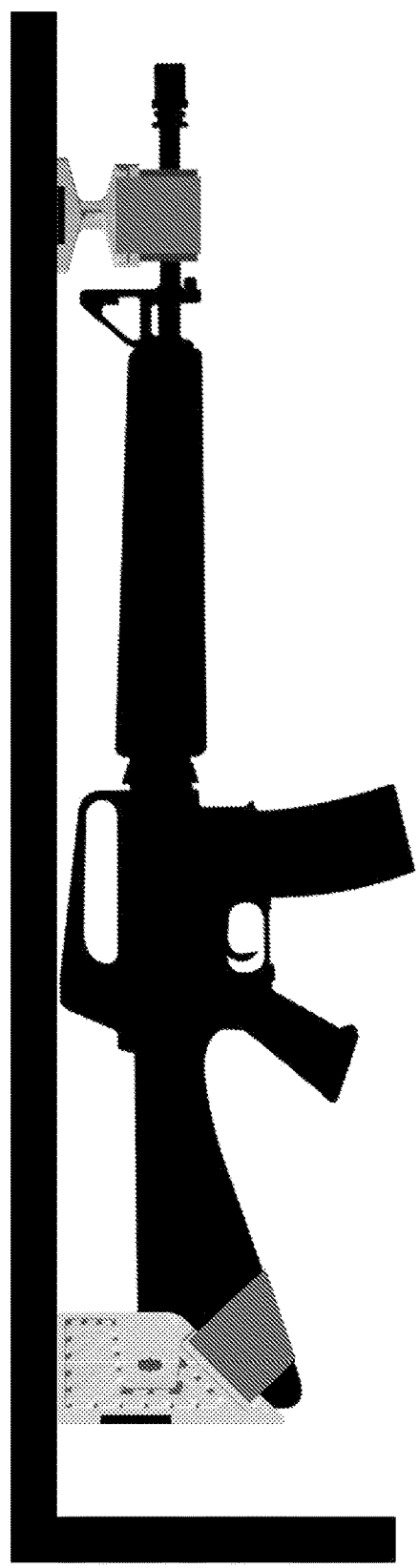
FIG. 33 depicts a kit for use in securing objects such as firearms, consistent with embodiments of the disclosure.
Figure 34:
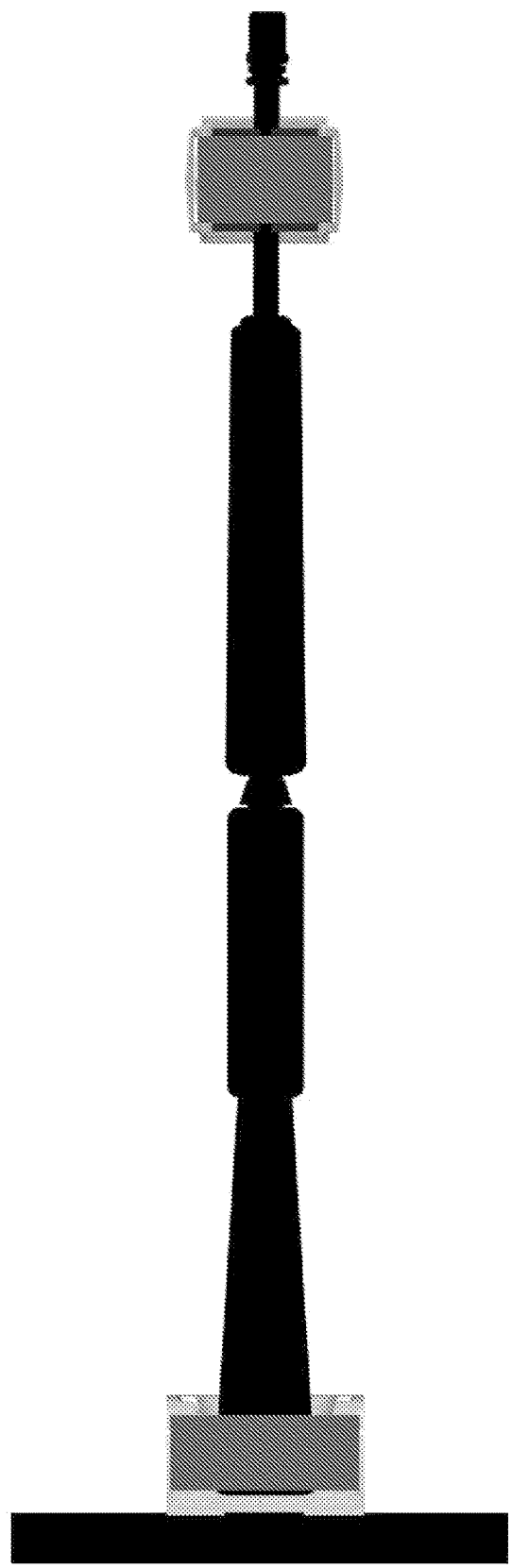
FIG. 34 depicts a kit for use in securing objects such as firearms, consistent with embodiments of the disclosure.
Figure 35:
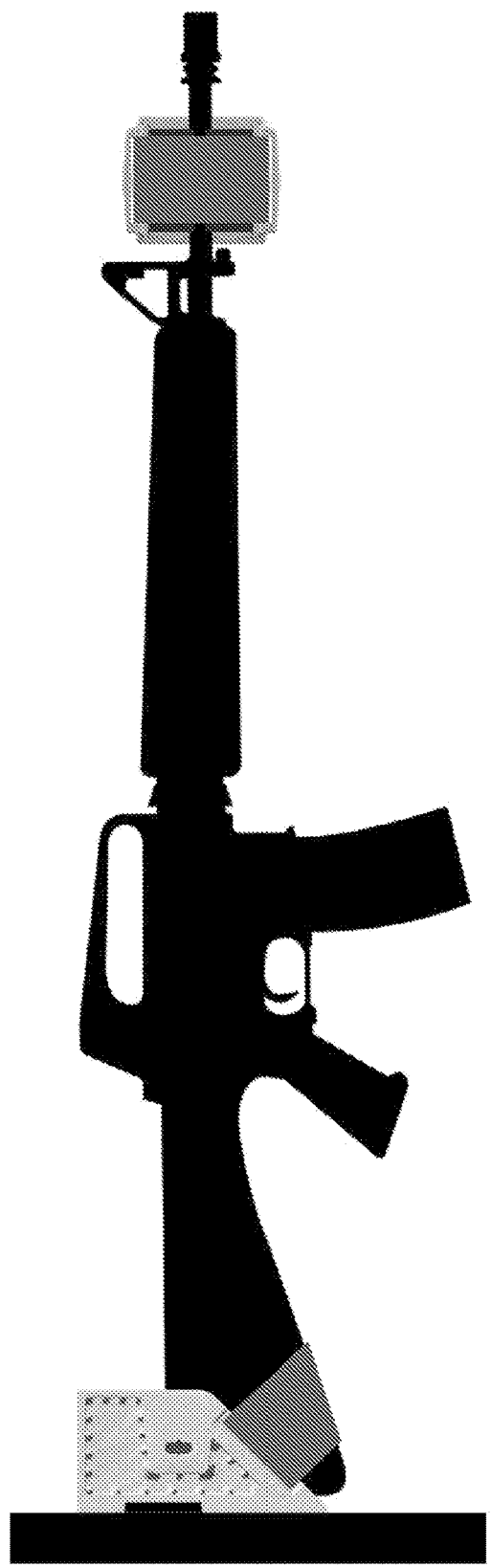
FIG. 35 depicts a kit for use in securing objects such as firearms, consistent with embodiments of the disclosure.
Figure 36:
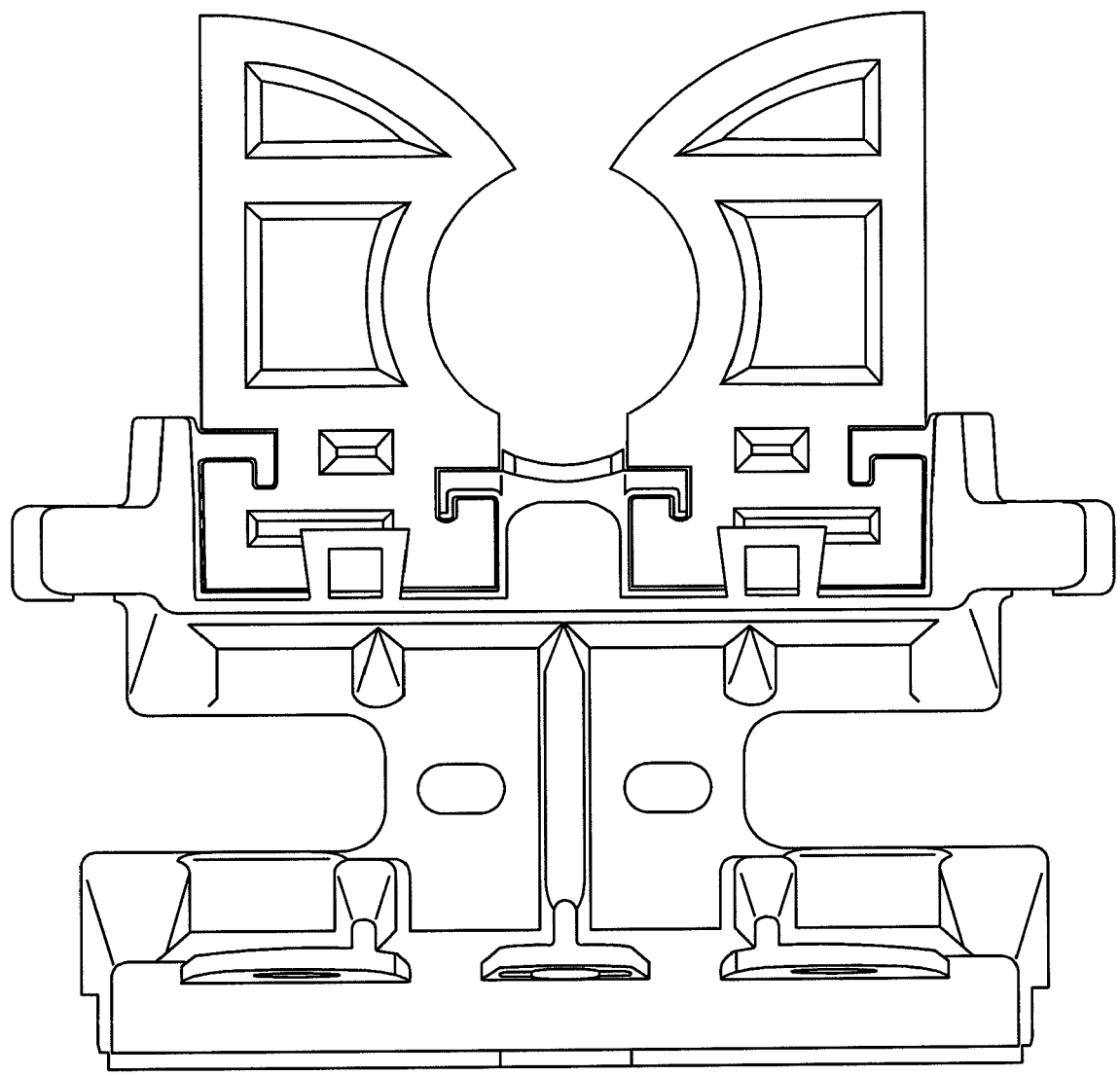
FIG. 36 depicts a platform and sheath for securing objects, consistent with embodiments of the disclosure.
Figure 37:
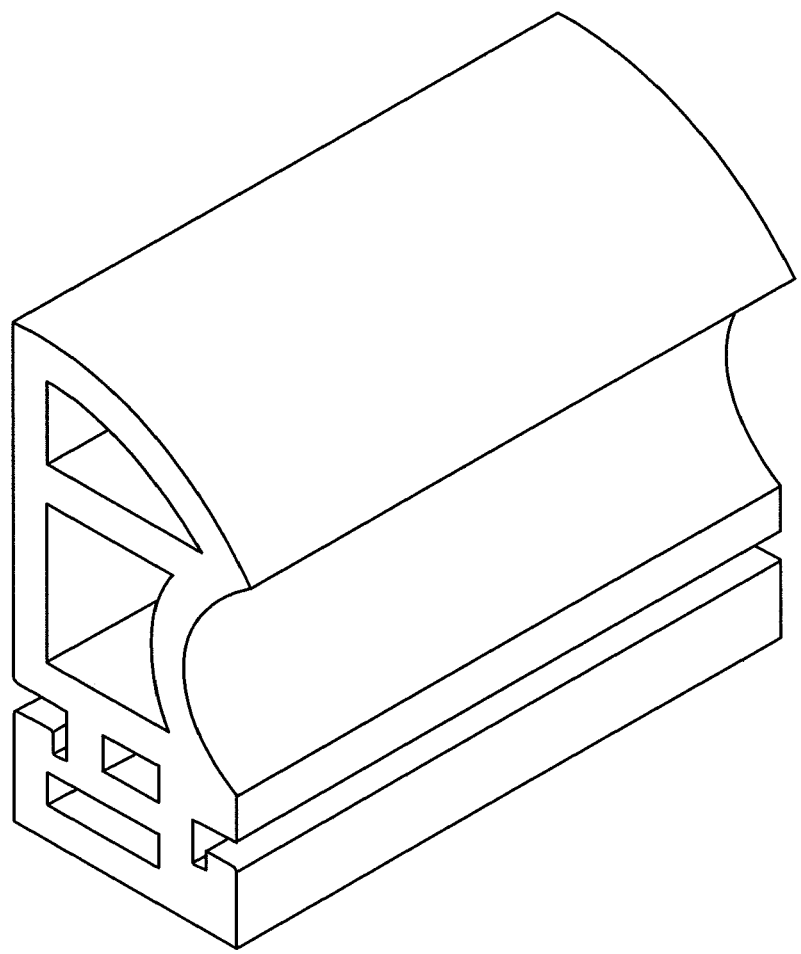
FIG. 37 depicts a sheath for securing objects, consistent with embodiments of the disclosure.
Figure 38:
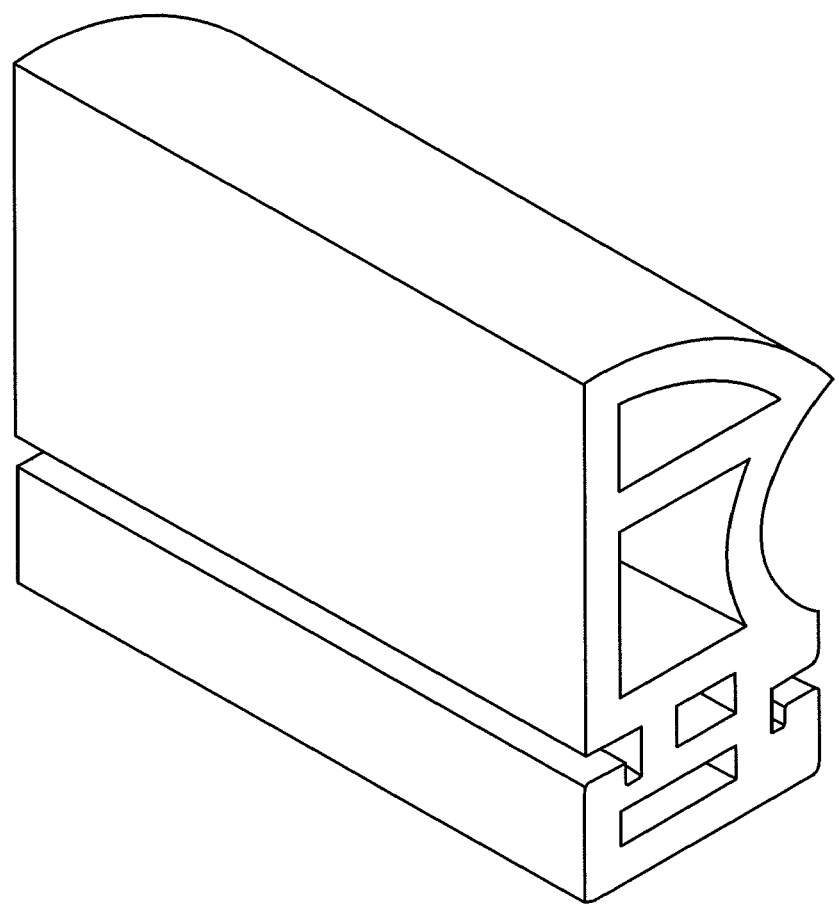
FIG. 38 depicts a sheath for securing objects, consistent with embodiments of the disclosure.
Figure 39:
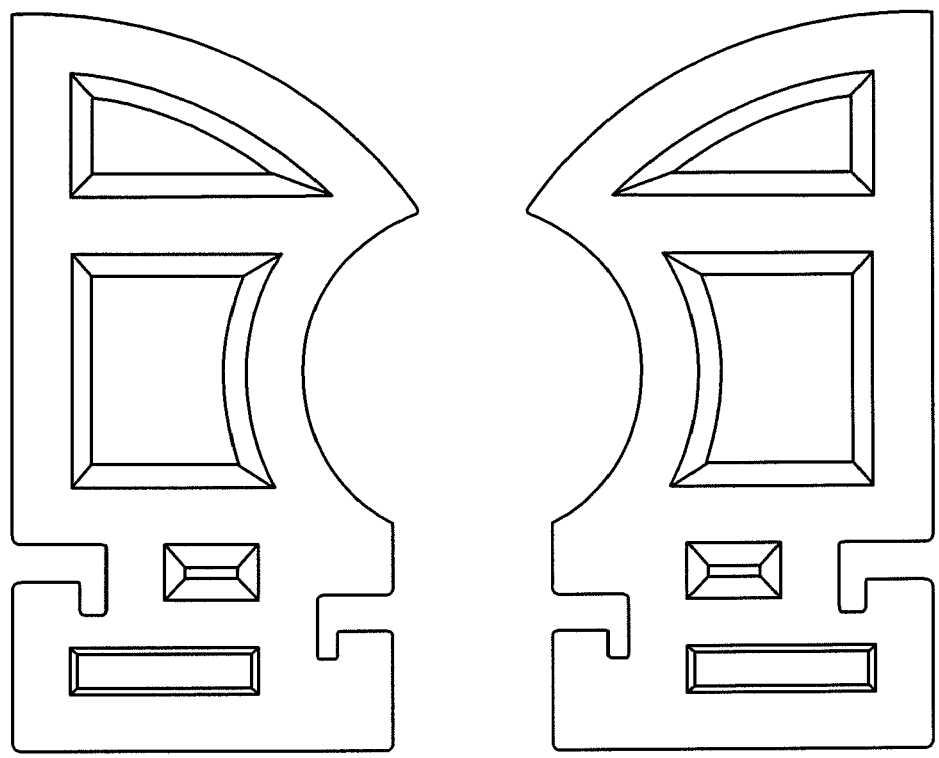
FIG. 39 depicts a sheath for securing objects, consistent with embodiments of the disclosure.
Figure 40:
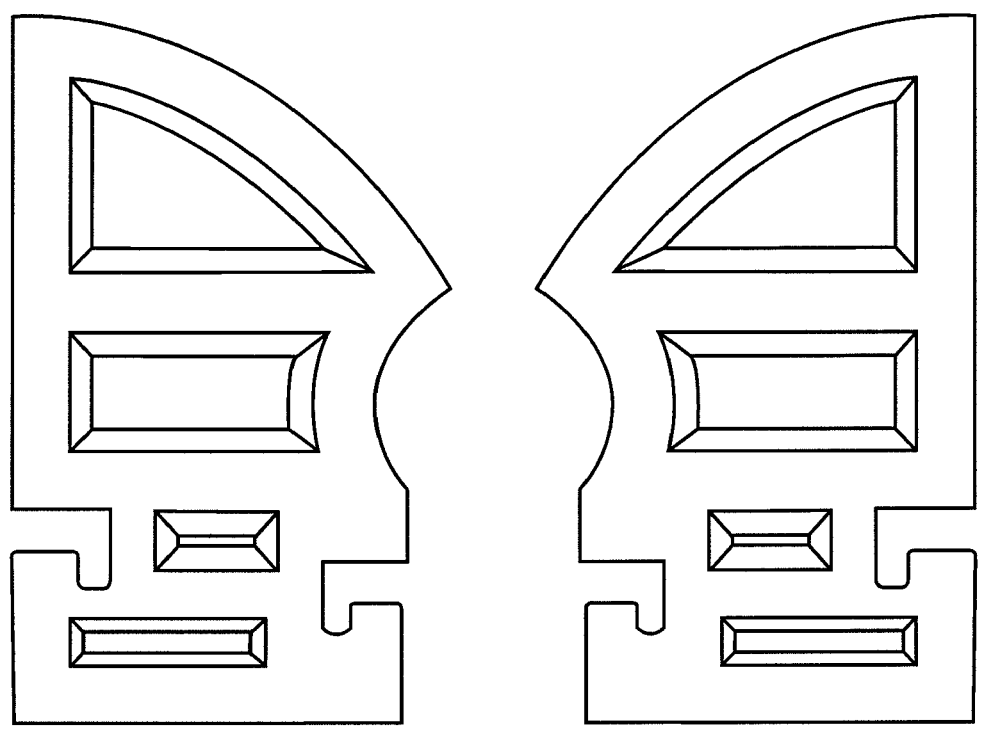
FIG. 40 depicts a sheath for securing objects, consistent with embodiments of the disclosure.
Figure 41:
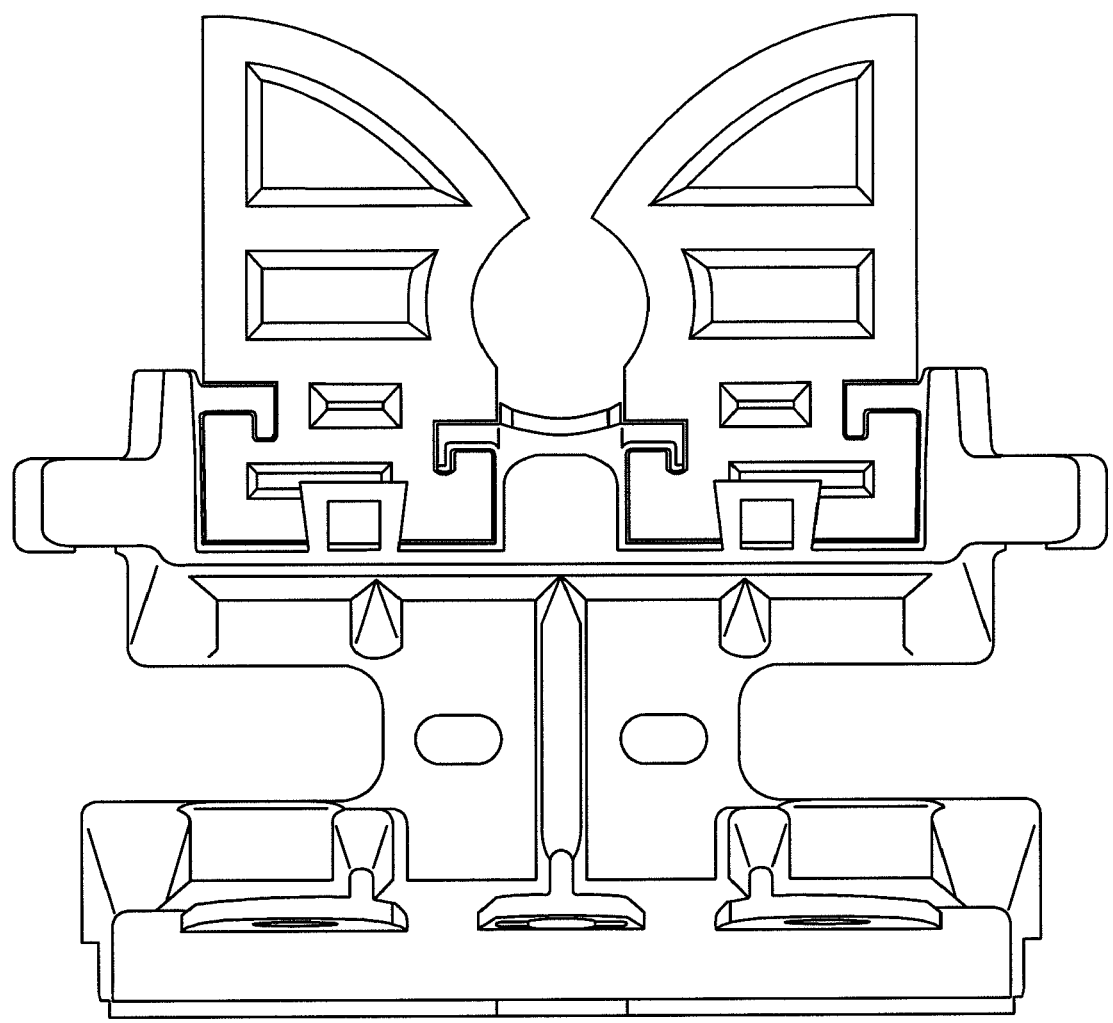
FIG. 41 depicts a platform and sheath for securing objects, consistent with embodiments of the disclosure.
Figure 42:
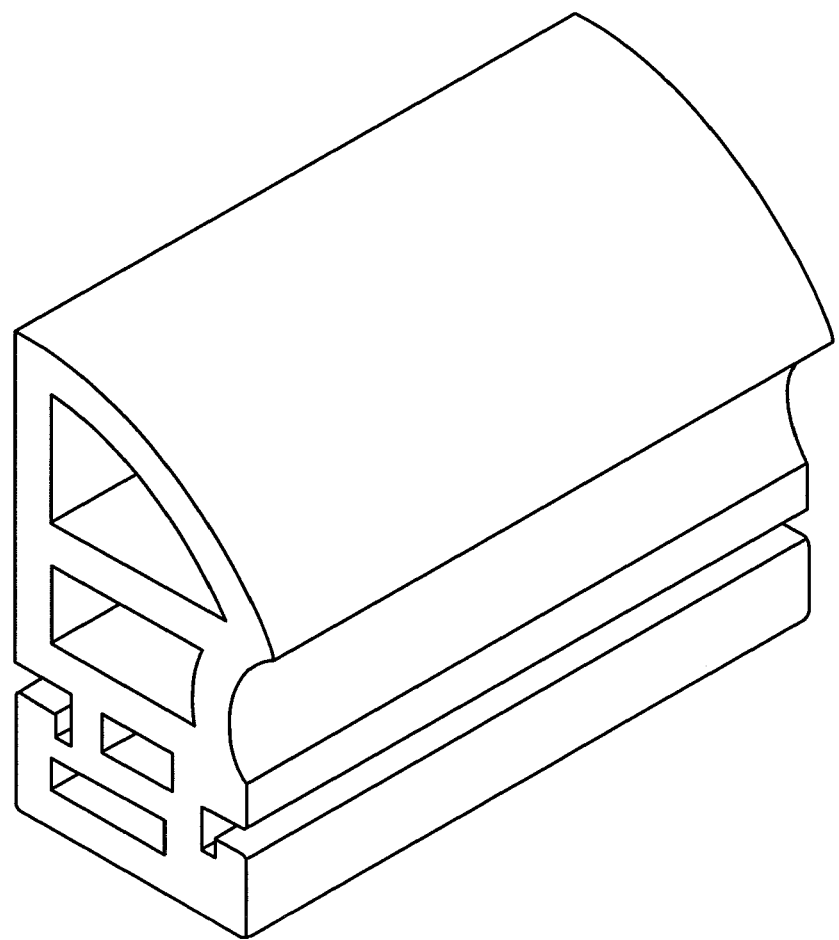
FIG. 42 depicts a sheath for securing objects, consistent with embodiments of the disclosure.

FIG. 26B depicts a use of MPWH and MPWBH devices that allows a firearm to be secured in a second horizontal manner, consistent with embodiments of the present disclosure. The firearm can also be secured on the top of a horizontal structure (e.g., on the floor or the top of a table), Moreover, the use of a system that includes both MPWH and MPWBH devices can keep the firearm a few inches above the surface. This can be particularly useful for keeping the firearm clean when the surface is damp and/or dirty.

Various embodiments are directed to a multi-purpose holding device (MPHD), which can operate independently or as component of an apparatus that holds and secures a wide range of objects with multiple securing and attachment methods. Such objects may include, for example, weapons, tools and sporting gear such as rifles, fishing poles, golf clubs, archery equipment, baseball bats, tools, rakes, shovels and others. The MPHD includes upper and lower platforms joined together by a connecting stem. The upper platform can accommodate any number of different interchangeable mechanisms and therein secure a variety of objects. The lower platform provides a stable platform for the MPHD with several options for fastening or mounting the system to almost any surface and on any plane. The connecting stem provides spacing between the two platforms in addition to securely connecting them. In various implementations, the MPHD is injection molded from plastic resins or metals such as steel or aluminum. By way of example, FIGS. 27-35 show approaches using such upper and lower platforms with a weapon, with the indicated approaches being amenable to implementation for holding a variety of components.

The upper platform has an upper and lower surface. The upper surface contains one or more walls, ridges, rails, locking mechanisms, straps and fastening devices that work together to operate as a mounting and securing system for a series of interchangeable and replaceable securing devices for a wide range of objects (e.g., which may be interchanged or replaced without the use of tools).

In some implementations, an upper surface of the upper platform is rectangular and has a center ridge bisecting the platform into two halves that are about equal. The side walls of the center ridge and the upper surface of the platform intersect at 90 degree angles. The center ridge has a concave upper surface and, in some implementations, has one or more openings (e.g., circular holes and crescent-shaped holes). In some implementations, the circular holes house threaded brass inserts which are molded into the center ridge. One or more inserts may be placed within the center ridge. One or more additional inserts may be placed on an upper surface (top) or on ends of the center ridge. Inserts of a material such as brass and others are used in accordance with various embodiments. In some implementations, inserts or threads are built into a mold for the MPHD.

In some implementations, crescent shaped holes in an upper surface of the center ridge serve as anchors for an anti-slip over molded material. The concave shape of the upper surface accommodates the shape of an object secured thereto, such as a tool, rifle barrel or other object. L shaped rails are attached to the two outer long edges of the center ridge. End walls are molded into the upper platform on ends of the upper surface, and parallel to the center ridge. The interior walls of the end walls and the upper surface of the platform intersect at 90 degree angles. Rails are attached to the inside edges of the end walls.

Figure 50:
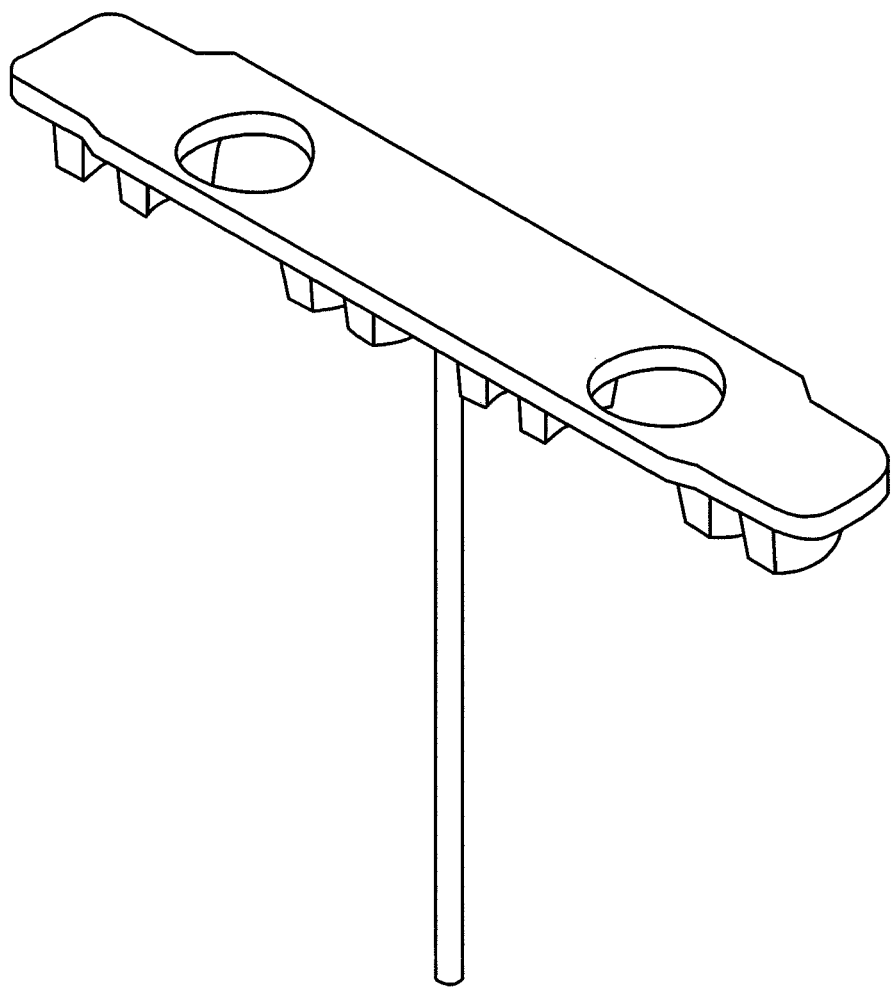
FIG. 50 depicts an overmold for a portion of a platform, consistent with embodiments of the disclosure.
Figure 51:
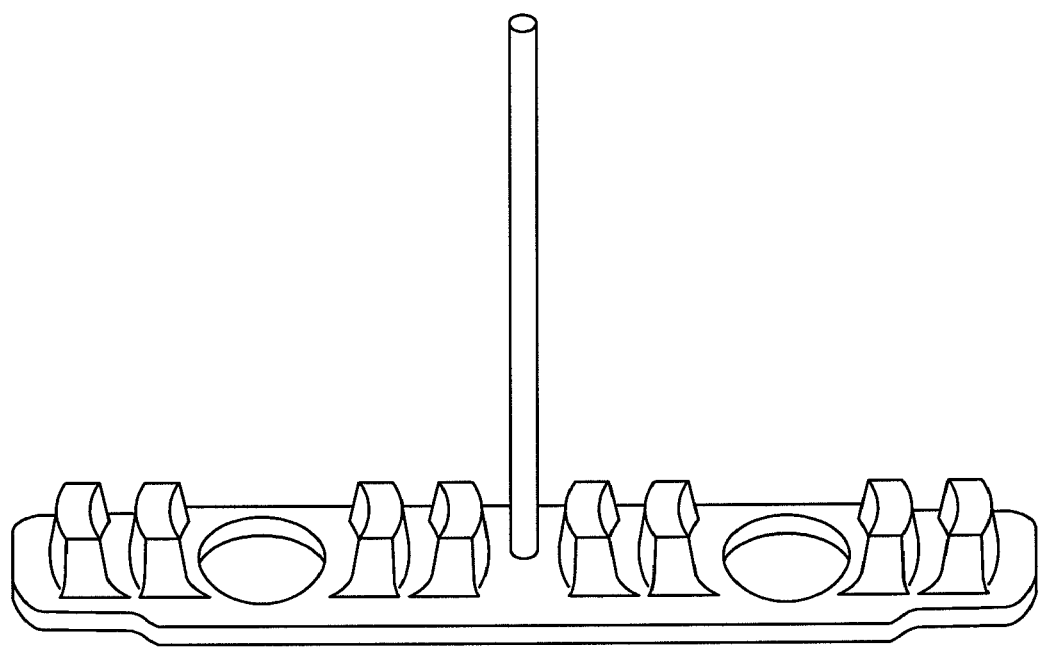
FIG. 51 depicts an overmold for a portion of a platform, consistent with embodiments of the disclosure.
Figure 52:
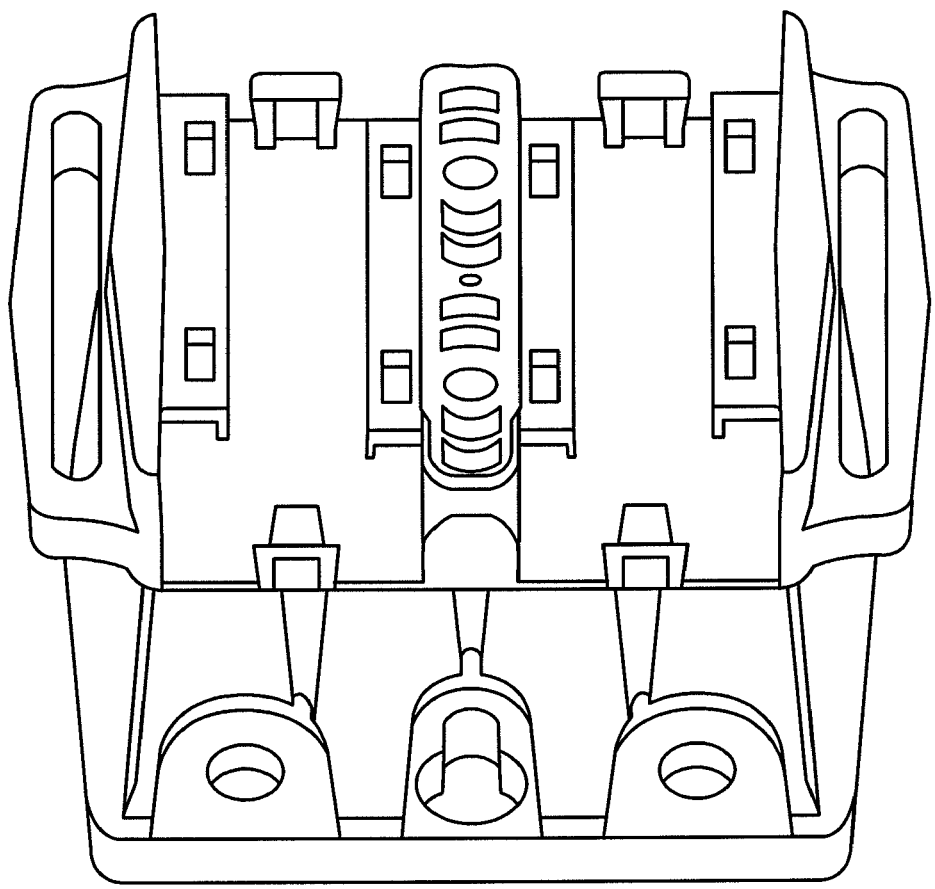
FIG. 52 depicts a platform for securing objects, consistent with embodiments of the disclosure.
Figure 53:
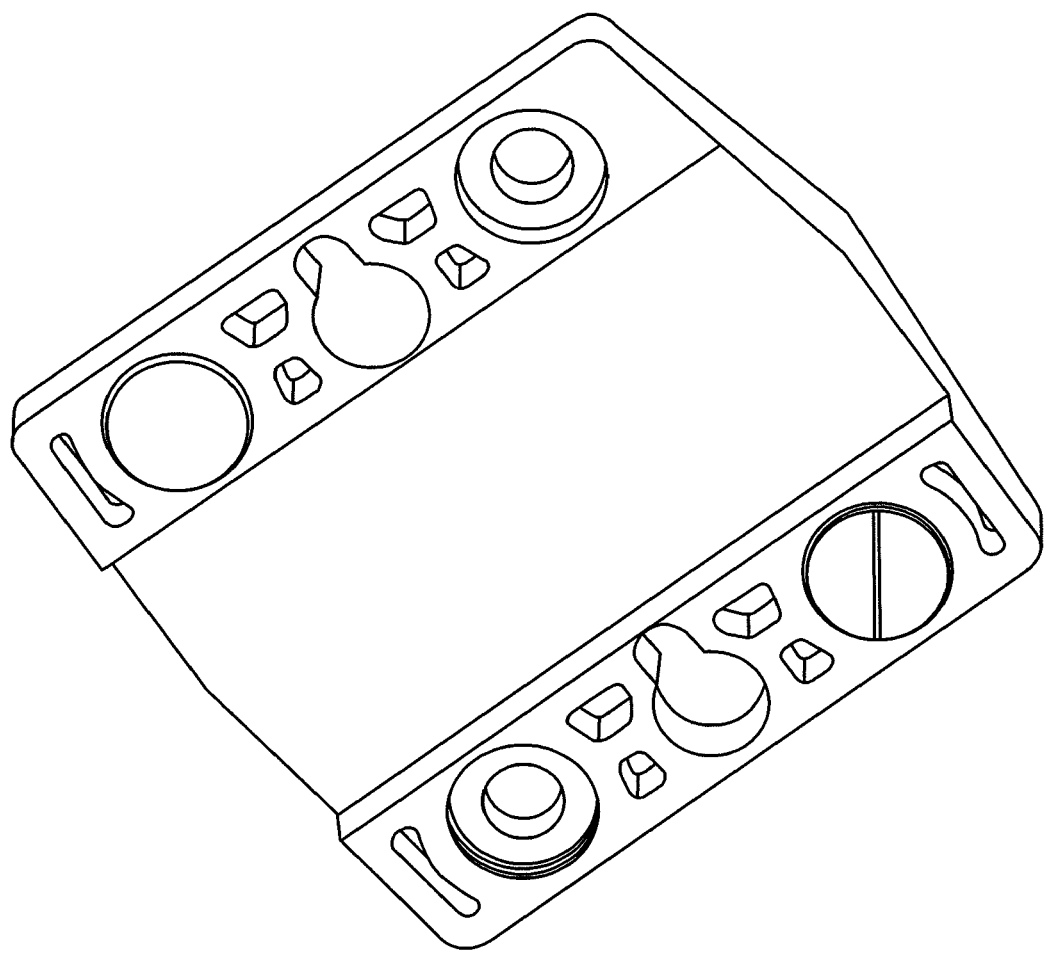
FIG. 53 depicts a platform for securing objects with threaded or pressure-fit magnet inserts, consistent with embodiments of the disclosure.
Figure 54:
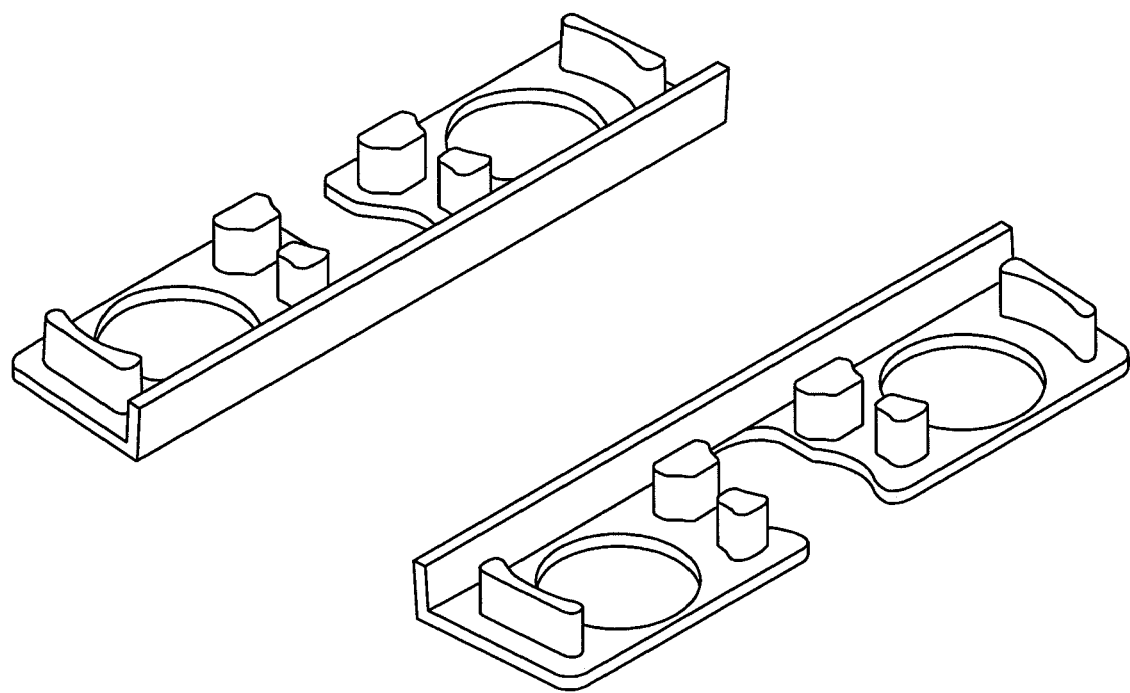
FIG. 54 depicts mold inserts for a platform, consistent with embodiments of the disclosure.
Figure 55:
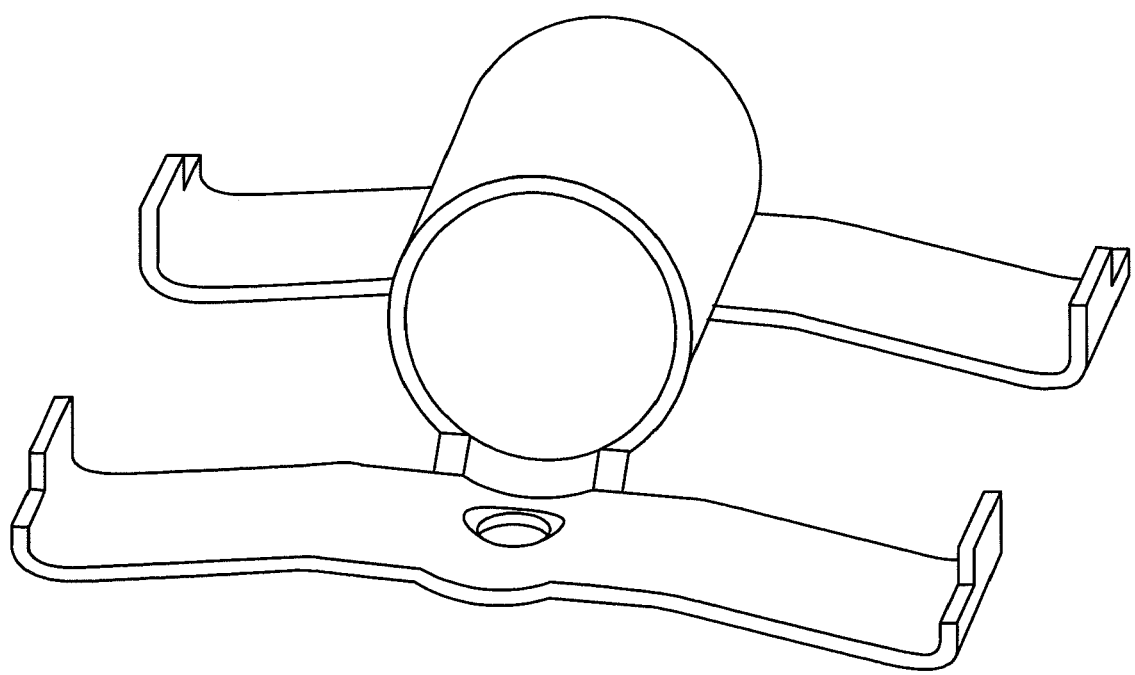
FIG. 55 depicts a pressure-fit component for securing objects to a platform, consistent with embodiments of the disclosure.
Figure 56:
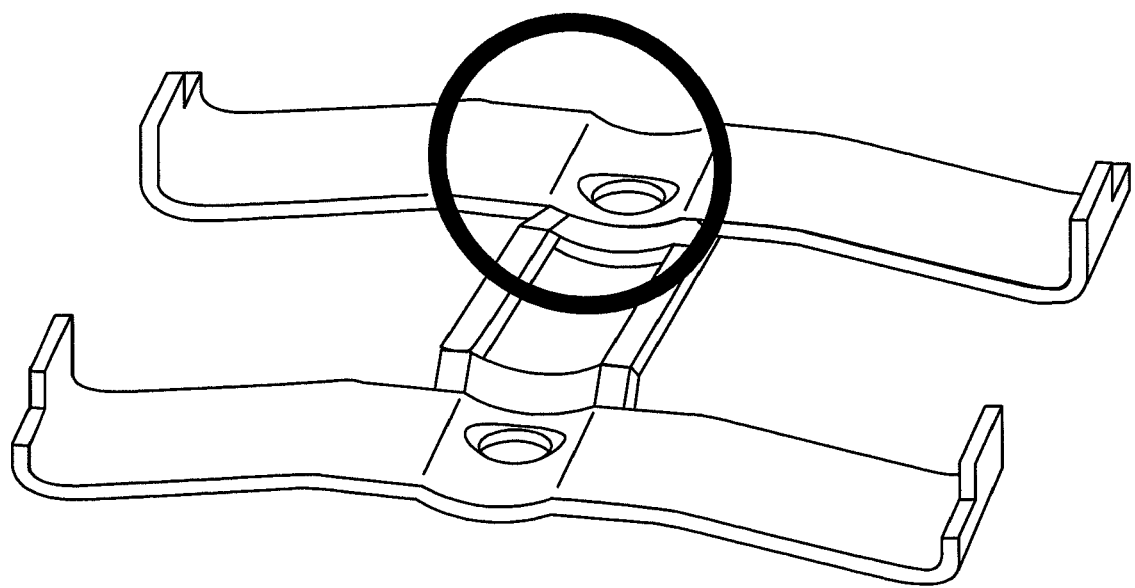
FIG. 56 depicts a pressure-fit component with a ring structure for securing objects to a platform, consistent with embodiments of the disclosure.
Figure 57:
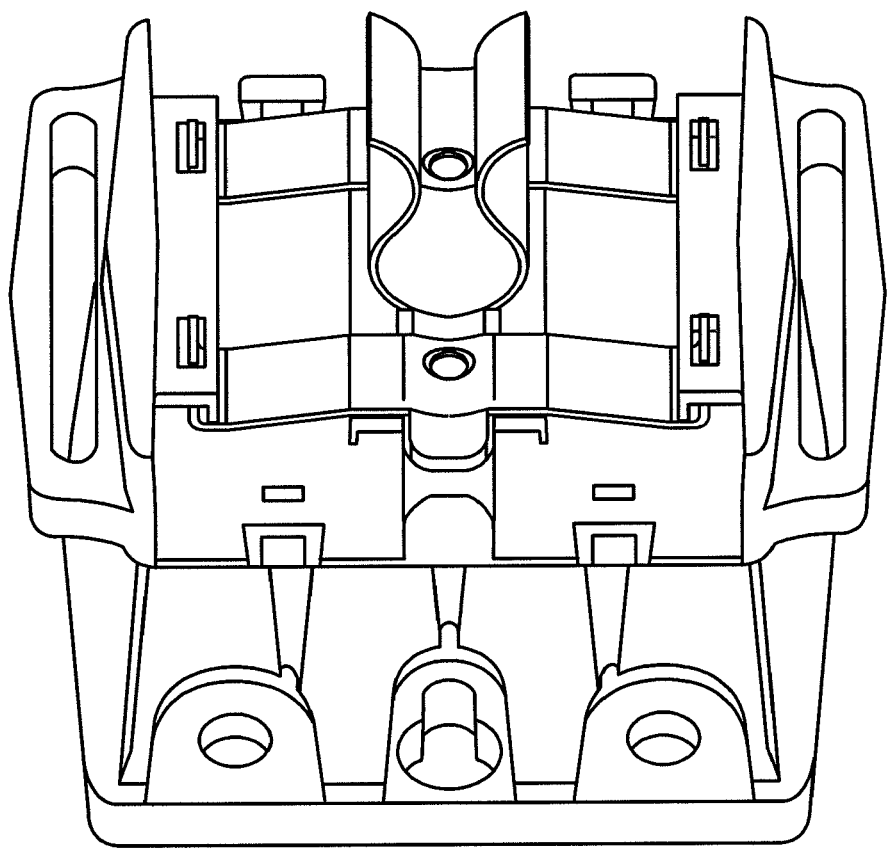
FIG. 57 depicts a platform with a pressure-fit clamp structure for securing objects, consistent with embodiments of the disclosure.
Figure 58:
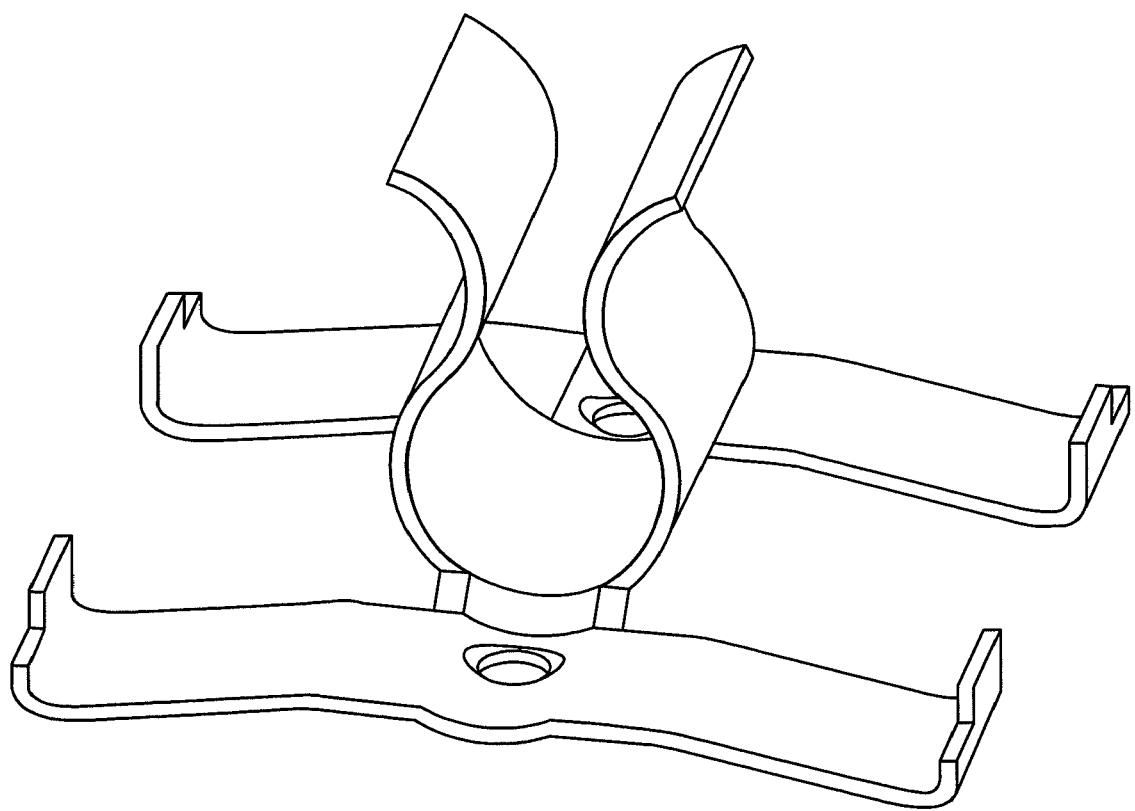
FIG. 58 depicts a pressure-fit component with a clamp structure for securing objects to a platform, consistent with embodiments of the disclosure.
Figure 59:
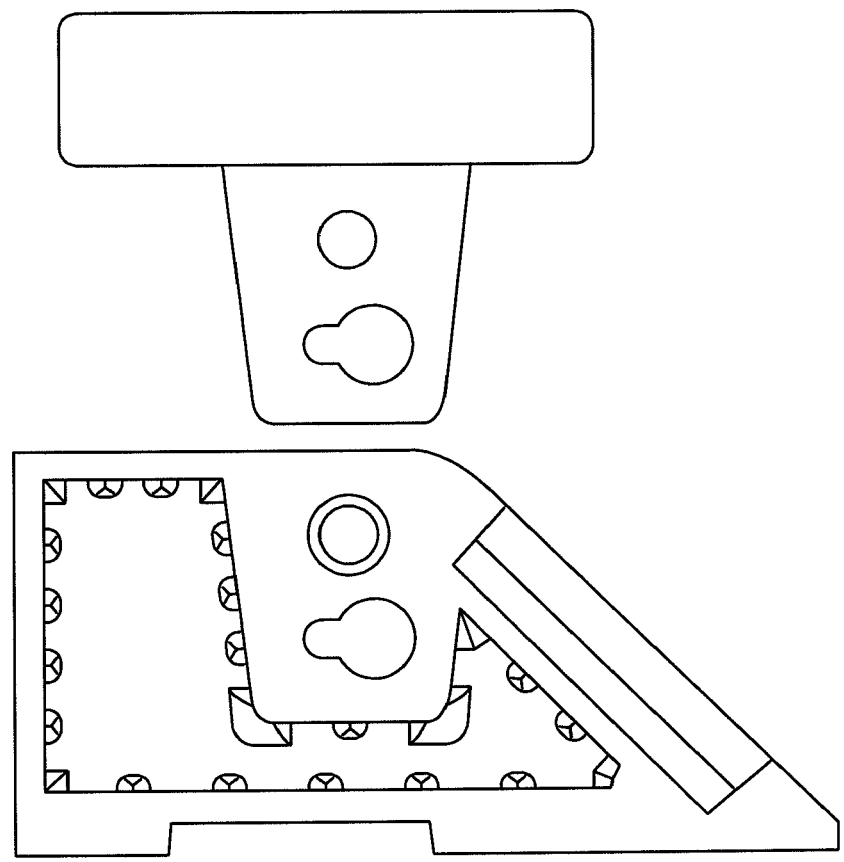
FIG. 59 depicts a base/lower platform and insert for securing objects, consistent with embodiments of the disclosure.
Figure 60:
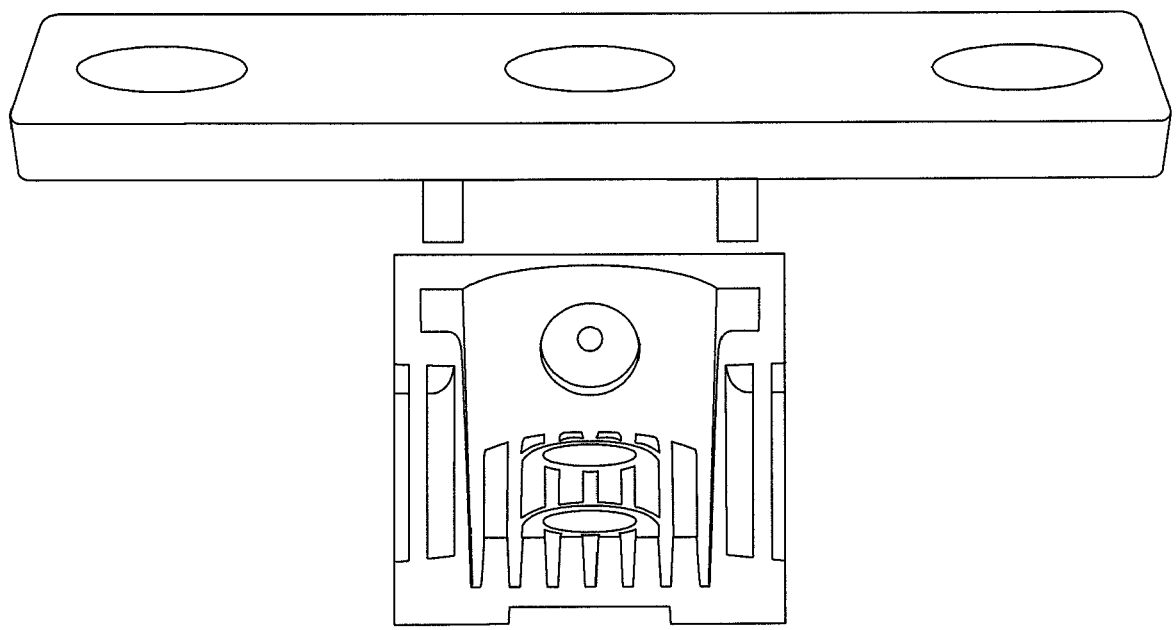
FIG. 60 depicts a base/lower platform and insert for securing round objects such as fishing poles, consistent with embodiments of the disclosure.
Figure 61:
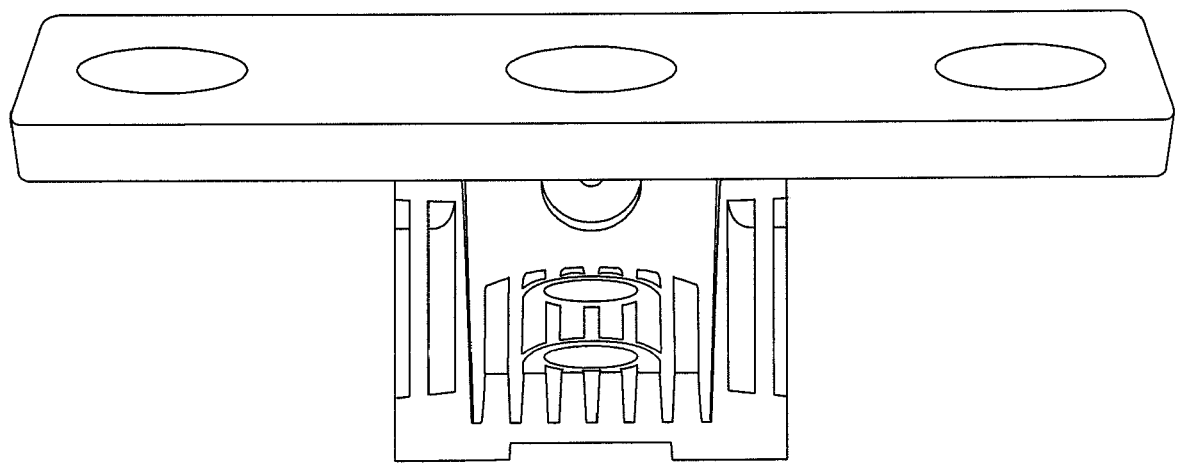
FIG. 61 depicts a base/lower platform and insert for securing round objects such as fishing poles, consistent with embodiments of the disclosure.
Figure 62:
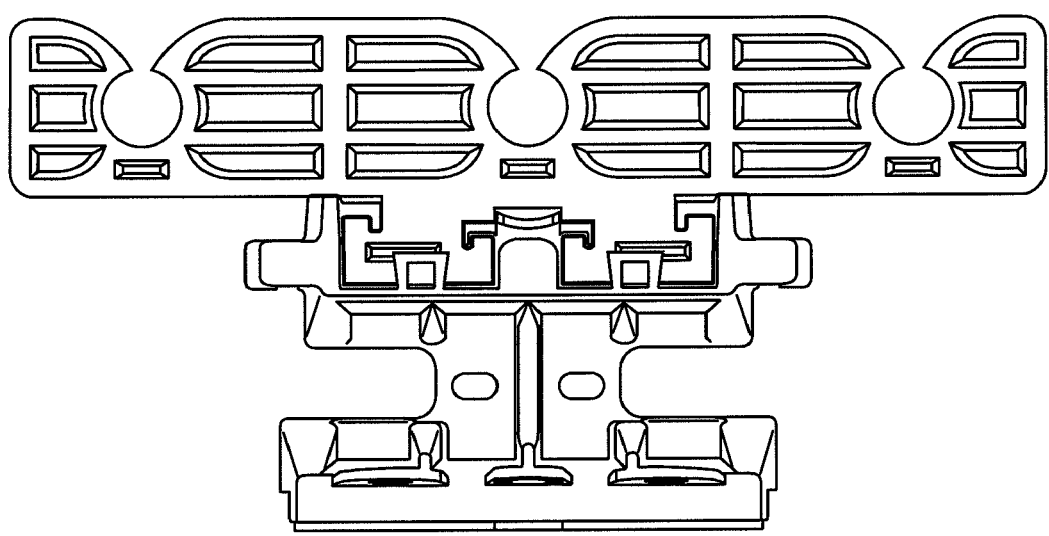
FIG. 62 depicts a base/lower platform and insert for securing round objects such as fishing poles, consistent with embodiments of the disclosure.
Figure 63:
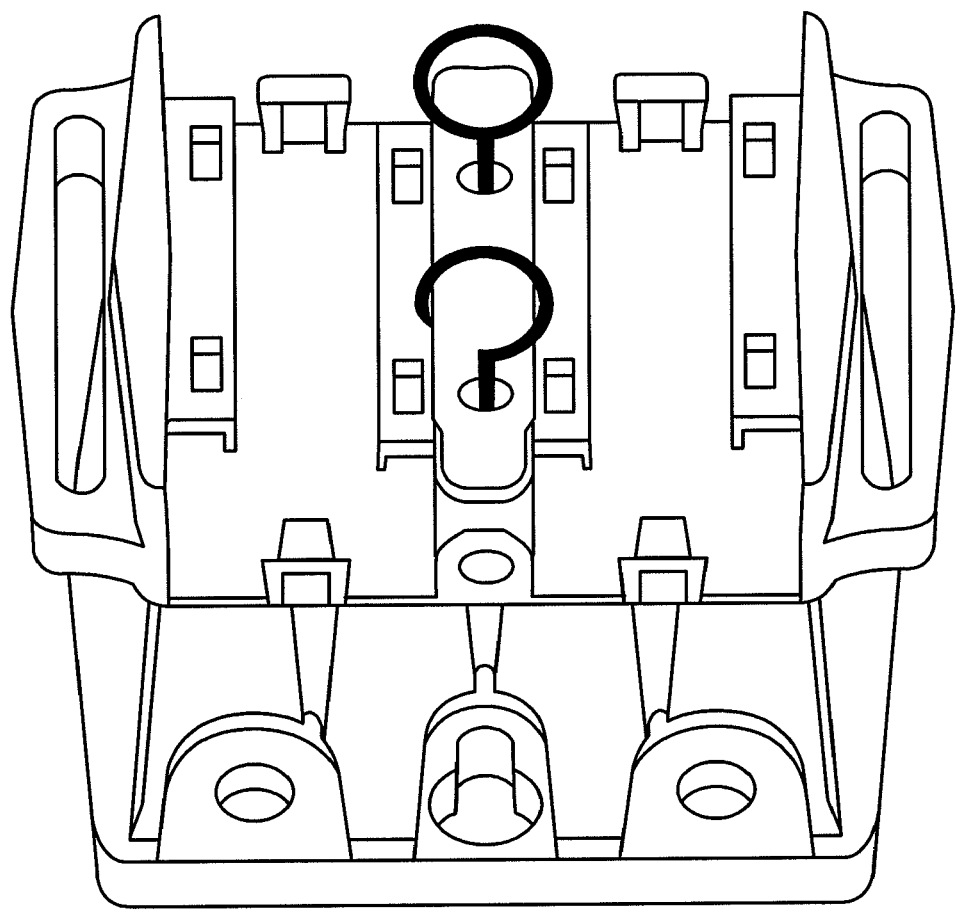
FIG. 63 depicts a platform with fasteners for securing objects such as fishing poles, consistent with embodiments of the disclosure.
Figure 64:
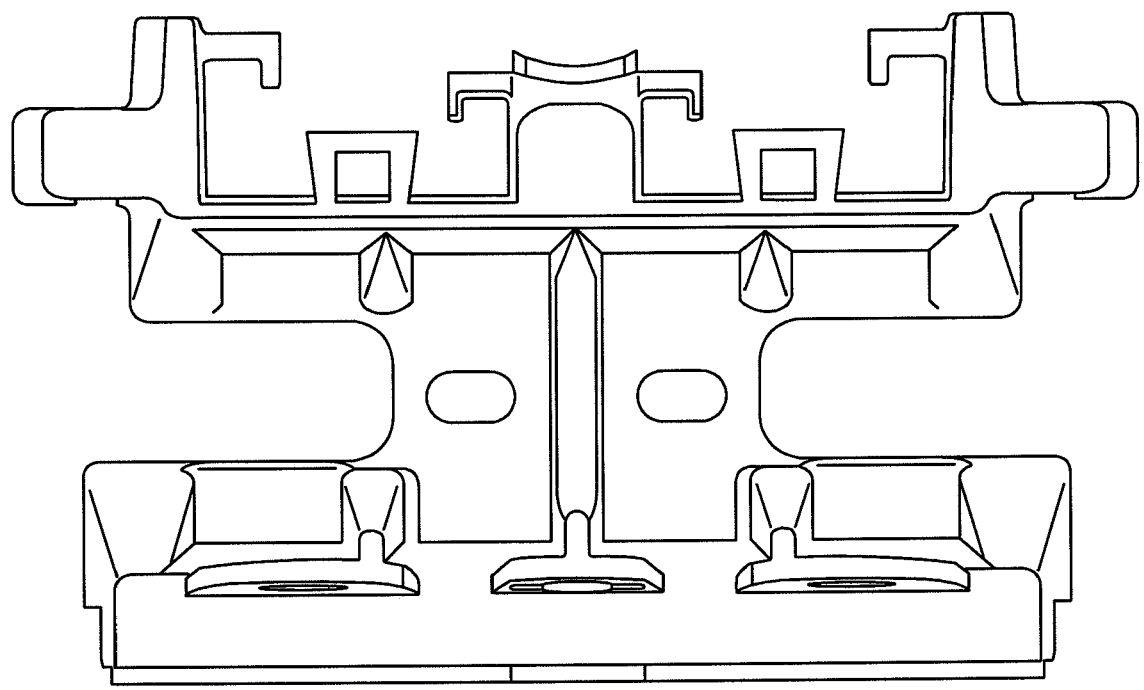
FIG. 64 depicts a platform with sidewalls having retaining components, consistent with embodiments of the disclosure.
Figure 65A:
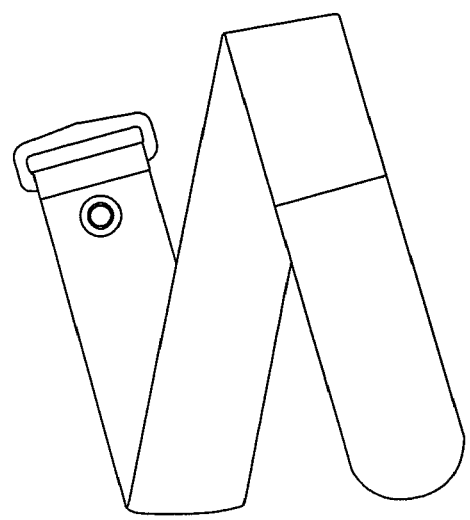
FIG. 65A depicts a strap as may be implemented with embodiments of the disclosure.
Figure 65B:
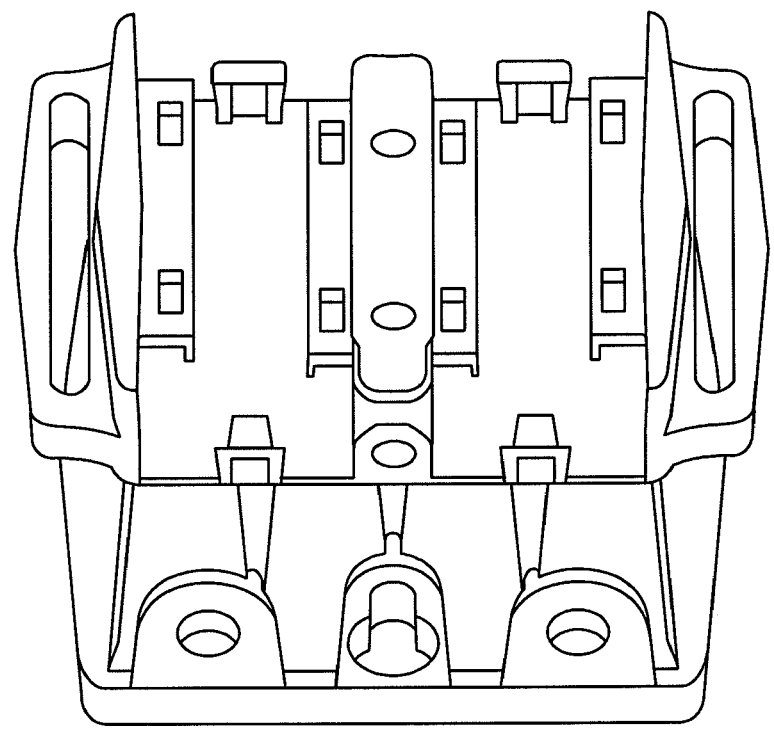
FIG. 65B depicts a platform with sidewalls, as may be implemented with the strap shown in FIG. 65A, and consistent with embodiments of the disclosure.
Figure 66:
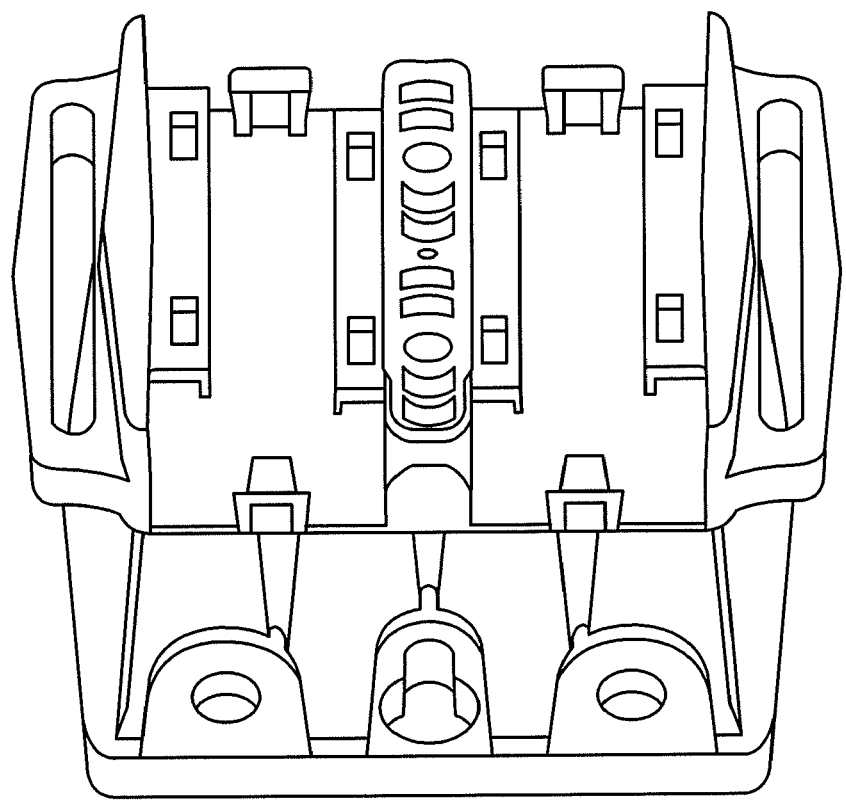
FIG. 66 depicts a platform with sidewalls having retaining components, consistent with embodiments of the disclosure.
Figure 67:
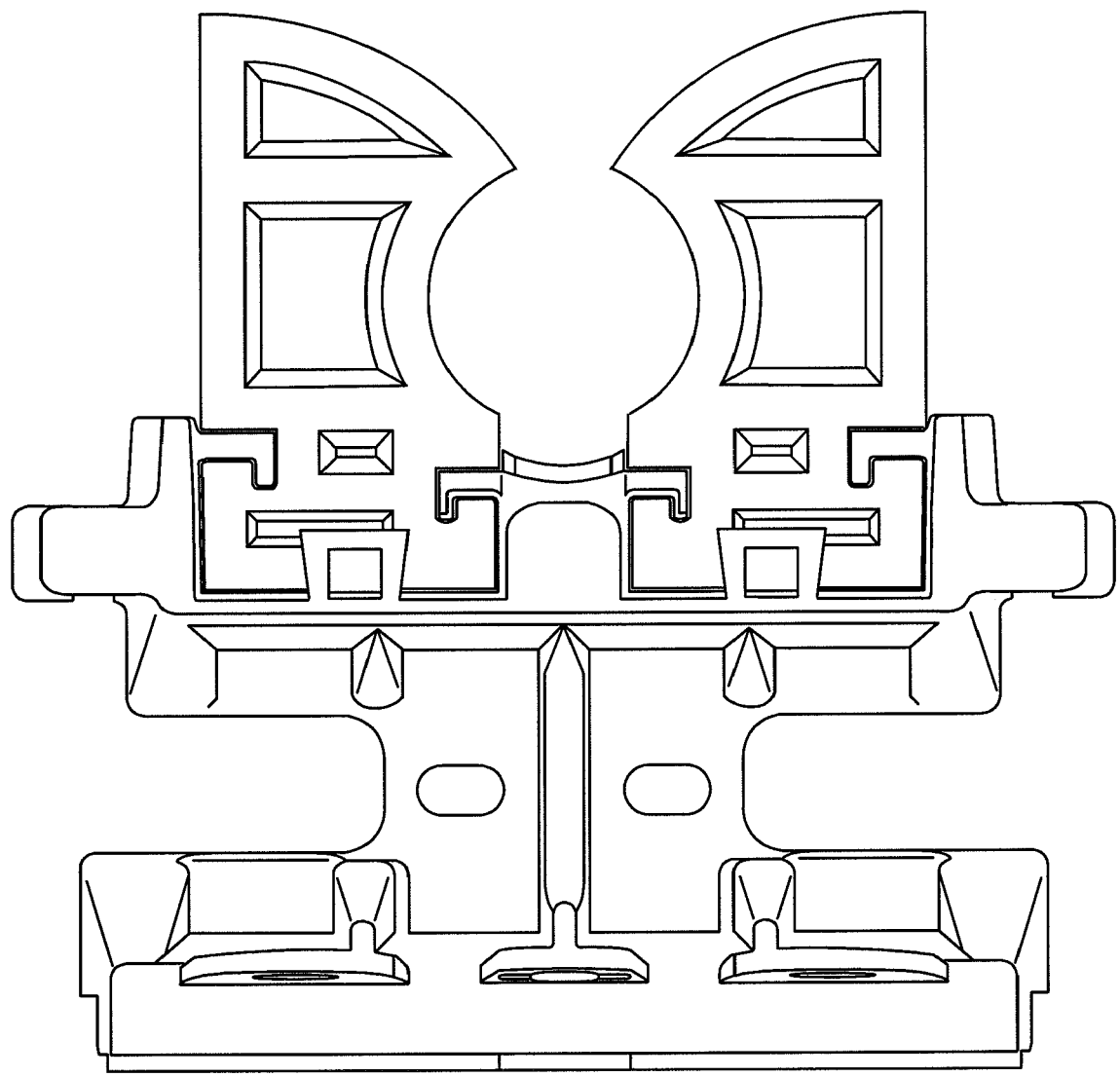
FIG. 67 depicts a platform with sidewalls having retaining components and a sheath structure therein, consistent with embodiments of the disclosure.
Figure 68:
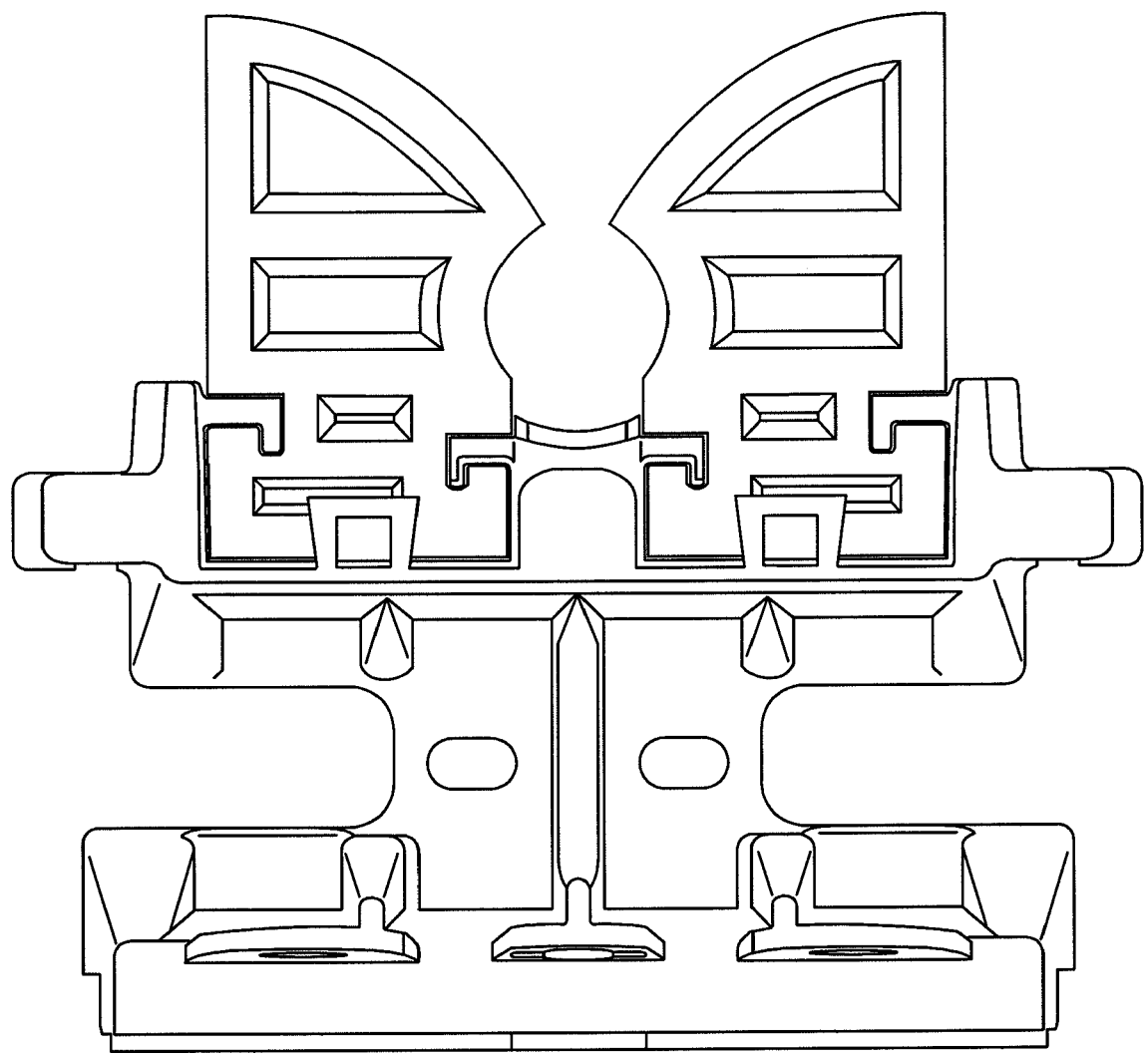
FIG. 68 depicts a platform with sidewalls having retaining components and a sheath structure therein, consistent with embodiments of the disclosure.
Figure 69A:
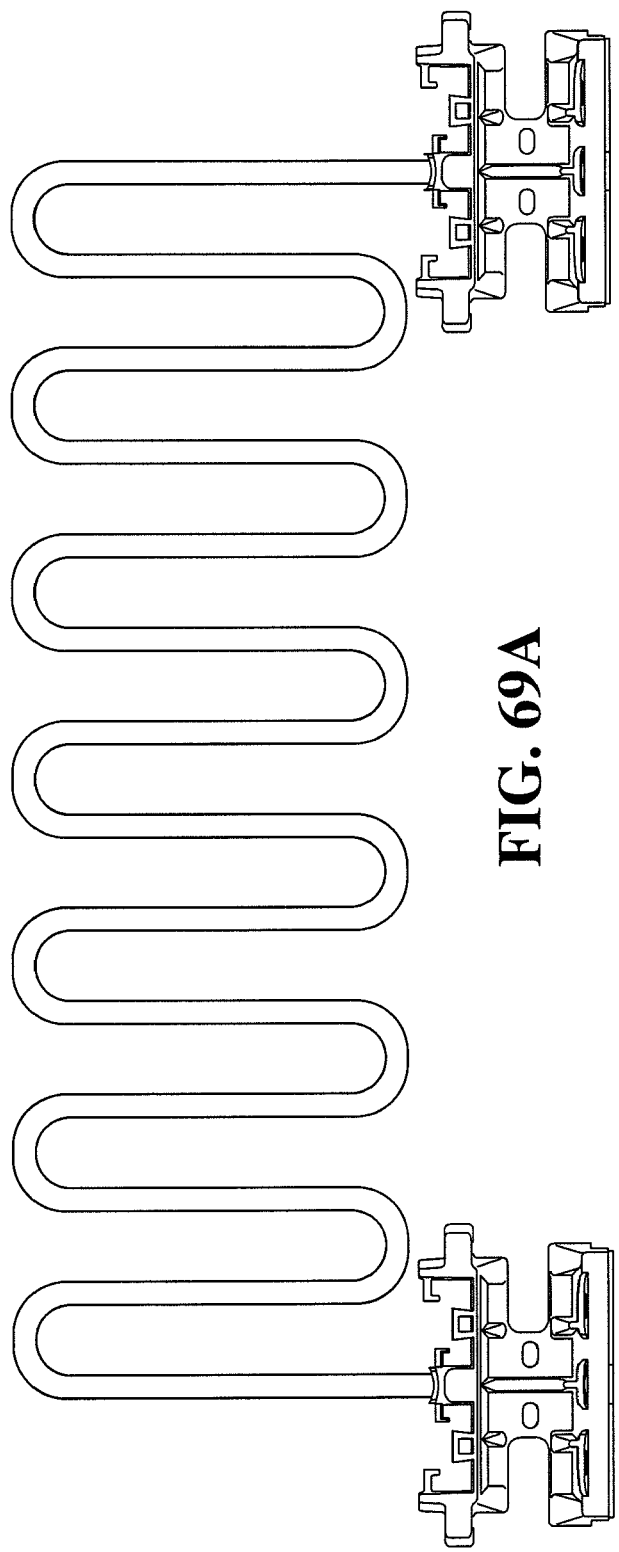
FIGS. 69A and 69B depict top and side views of platforms connected via a component secured to each platform, consistent with embodiments of the disclosure.
Figure 69B:
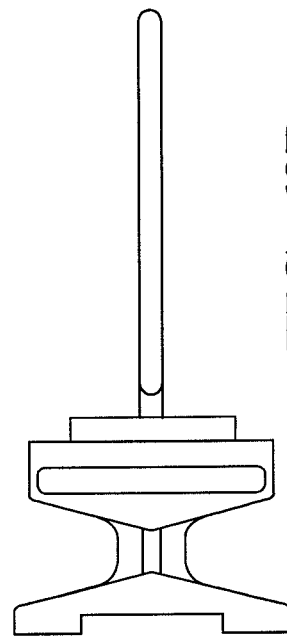
Figure 70A:
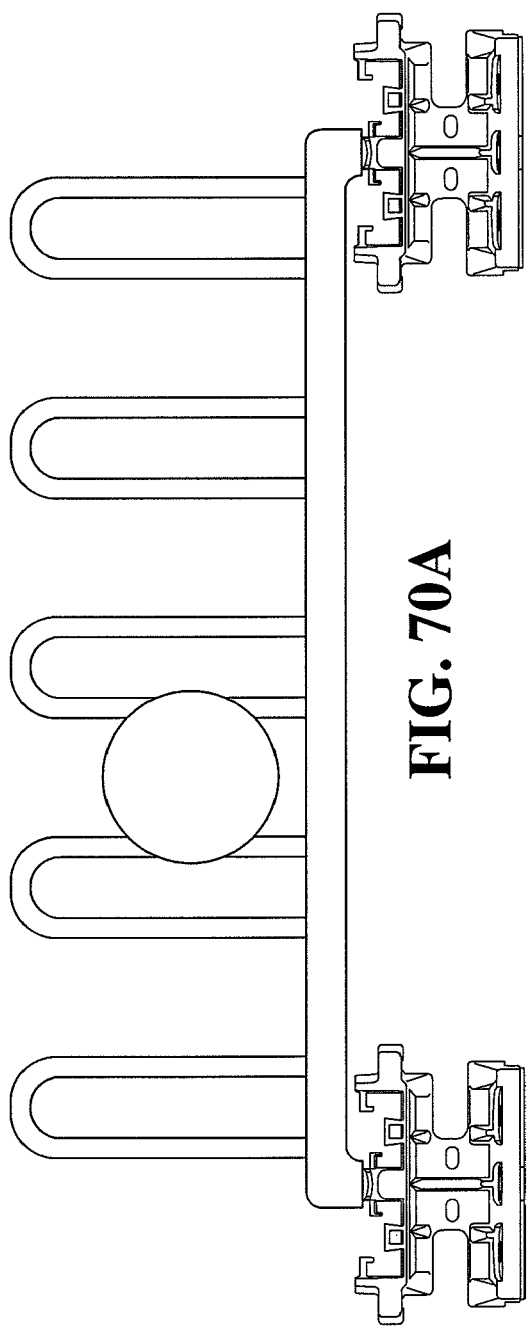
FIGS. 70A and 70B depict top and side views of platforms connected via a component secured to each platform, consistent with embodiments of the disclosure.
Figure 70B:
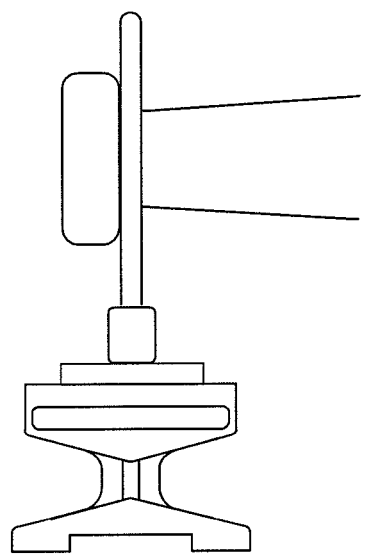

In some implementations, slotted handles are molded into the outer surface of the end walls and are implemented with a strap-type fastener that holds an object. The handles may also be used for engagement and disengagement when securing or removing the MPHR. Various MPHD embodiments may be implemented, for example, in connection with the components shown in FIGS. 46-54, with certain embodiments involving overmolds as shown in FIGS. 50-51 for concave surfaces, and in FIGS. 64-68, with the strap shown in FIG. 65A being implementable with a variety of the MPHD structures and/or with lower platform components such as the butt plate kit described herein. Such a strap as shown in FIG. 65A may also be implemented with one or both upper and lower platforms as shown in connection with FIGS. 27-35.

FIGS. 69A-70B show example embodiments in which two or more platform components are coupled together. A connector between respective platforms is shown, which can be implemented with a pressure-fit and/or other type of fastener with each platform. Such a connector may, as shown in FIG. 70A, be used to support items such as tools.

A variety of securing components may be implemented with a MPHD as discussed above, for track and rail type mounting. Various embodiments are directed to base components that facilitate changing or replacing components on the MPHD quickly and easily without tools, which can be useful for a variety of applications such as those involving military or law enforcement use.

In some embodiments, the MPHD is implemented with interchangeable components using a track and rail mounting system that facilities sliding components on and off, and locking the components in place. The track and rail mounting system works in conjunction with locking mechanisms. When a component is slid onto the rail system of the MPHD, locking mechanisms catch and lock a component in place (e.g., at the end of the rail). A combination of rails, tracks and locking mechanisms can be used to secure components from all four sides.

In some implementations, 90 degree angles at the base of end walls and both sides of the center ridge of the MPHD create additional support for components using the track and rail system. The four 90 degree angles create four additional L-shaped supports that prevent lateral movement at the base of components fastened in the MPHD. Such approaches and supports may be implemented, for example, with the approaches shown in FIGS. 36-42.

By way of example, four locking mechanisms may be used between the center ridge and end walls on the long edges of the upper platform. The locking mechanisms are molded wedge-shaped devices facing toward the centerline of the platform. The wedges fit into and secure various interchangeable components. The locking mechanisms are part of the mounting and securing system that work in conjunction with other features of the system to secure components to the MPHD.

In some implementations (and shown in drawings by way of example), the rail system includes rails on the end walls that are higher than rails on the center ridge. The offset height of the rails secures components higher on the outer edges and lower along the center ridge. This design allows some components to flex more outwardly towards the end walls, allowing the item being secured (e.g., a rifle barrel, a fishing pole) to be more easily inserted and removed. It also allows the item being secured to be closer to the center ridge, which can be useful during certain functions when being used with a weapon.

Various types of securing components can be used to secure objects to the base structures as shown. In some embodiments, a strap-type fastener is used. Slotted handles on the exterior of the end walls accommodate a strap or strap components that secure items held by any component attached to the MPHD. Such a strap can mitigate issues relating to mitigating or preventing an object such as a weapon from being knocked or kicked out of a holding device. This strap-type approach can be particularly useful in applications subject to movement, such as on vessels encountering strong seas and engine vibration, and as on aircraft that encounter turbulence, vibrations and forces from banking. When used in conjunction with a butt plate kit or other MPHD system component, the strapping system allows items to be hung on any plane, including from a ceiling. When the MPHD is secured by Dual Lock, the strap can be used as a quick release device. By pulling the strap straight up with force, a Dual Lock attachment will disengage. One or more grommets can be built into the strap and used to secure the MPHD to packs and vests. On tactical vests both the strap itself and the grommets can be used as attaching devices. The grommets can also be used to attach other objects to the MPHD while in use. Straps of varying lengths can be used to secure the MPHD to objects such as trees, poles and other objects by pulling the strap behind the MPHD and around the object it is being attached to.

Various embodiments are directed to components attached to an MPHD using a pressure fit. As with the track and rail system, the pressure fit method allows for rapid change of components without necessarily using tools. In certain implementations, pressure fit components have three main sections including a center ridge element, extending elements with locking tabs and a securing device.

In some embodiments, each of four L shaped rails attached to the center ridge as well as end walls as described above have two rectangular holes molded into them. The rails and holes are part of a mounting and securing system that work in conjunction with other features of the system to secure pressure fit components to the MPHD. The rail holes in the MPHD shown and/or described as rectangular can be implemented using other shapes such as square or round shapes. Similarly, rails characterized as L-shaped can be implemented with a T-shape.

With pressure fit components, a height differential between tracks on end walls and tracks on the center ridge can facilitate the pressure fit. Various components employing a pressure fit are designed with a center ridge element, employing a concave shape corresponding to a top of a center ridge as shown. The concave section of the component is designed to rest on top of the center ridge.

In various embodiments, pressure fit components use extending elements such as mechanisms that extend out from the center ridge to the rails on end walls. Tabs on the ends of the extending elements fit into holes in the rail system, locking components in place using pressure.

A wide range of securing devices can be built into pressure fit components for the MPHD. Clips, hooks, eyelets and many other attaching and securing mechanisms of varying sizes and shapes can be used with the pressure fit system. These types of devices can be configured to secure weapons, fishing poles, golf clubs, rope lines, tarps and countless other items, such as shown in the drawings. FIGS. 59-63 show various embodiments as may be implemented with objects such as fishing gear and others.

To attach pressure fit components to the MPHD, the extending elements facing the outer rails are pushed downward while the component is slid onto the center ridge. When the holes in the center ridge element are aligned with the holes in the top of the center ridge, the downward pressure is released and the locking tabs on the end of the extending elements lock into the rectangular holes on the rails.

Components employing such a pressure fit attaching method can be made from flexible materials such as spring steel or materials with similar properties. These components exert a sufficient continual upward pressure when engaged, locking the component in place without using additional fastening methods.

In some embodiments, pressure fit components are securely or permanently fastened to the MPHD. For instance, holes on a center ridge element are positioned over threaded inserts on the top surface of the center ridge. Components may be secured to MPHD by screwing into the threaded inserts. In some implementations when the MPHD is molded from plastic resin, threaded inserts are used which can withstand approximately 315 pounds of pull before pulling out of MPHD. Using two available inserts by way of example, approximately 630 pounds of pull strength is achieved. If the MPHD is molded from aluminum or steel, the pull strength can be much higher. Additional pull strength is added from the extending elements. Attaching pressure fit components with screws can be useful in vehicles, such as military vehicles in which the additional securing strength provided by the inserts can prevent components from becoming secondary shrapnel in explosions.

A variety of fastener inserts are used in connection with one or more embodiment. For example, in addition or as an alternative to securing pressure fit components, threaded inserts can be used to accommodate hooks, eyelets or other hardware that can be used to attach tarps, lines, bungee cords and other devices to the MPHD. Items fastened into the insert can have an approximate pull strength of 315 lbs. In various embodiments, inserts such as those available from Dodge Inserts, a division of Stanley Engineered Fastening of Shelton, Connecticut.

A wide range of securing devices can be built on or into components that would attach to the MPHD by using threaded inserts. Clips, hooks, eyelets and many other attaching and securing mechanisms of varying sizes and shapes can be used on components using this method of attachment. These types of devices can be configured to secure weapons, fishing poles, golf clubs, rope lines, tarps and countless other items.

In some implementations, threaded inserts are used to connect two or more MPHD's to each other by using components with center ridge elements in two or more locations. This configuration can be used to connect an unlimited number of MPHD's to each other by overlapping the center ridge elements on the ends of components prior to screwing them into the inserts. Mounting a center ridge element perpendicular to its normal configuration allows two MPHDs to connect together at a 90 degree angle. Continuing this pattern would allow four MPHDs to connect in a square. Mounting the center ridge element at various angles would allow MPHDs to connect in an unlimited number of configurations.

A variety of weapon securing components are implemented, in accordance with various embodiments. For instance, interchangeable components can accommodate a variety of different types of weapons and different securing conditions such as those relating to temperature, barrel size and location of MPHD placement. One such component is an injection molded sheath that uses a track and rail attachment system as discussed herein. Sheaths with different designs are developed to accommodate weapons with different barrel sizes. Sheaths can be molded from a variety of materials such as Santoprene or other resins with similar properties. Various embodiments are directed to extreme temperature components that employ different durometers to perform certain levels. For instance, Santoprene can withstand wide temperature swings and the durometer rating of Santoprene can be controlled using different blends. Cold weather sheaths are implemented with lower durometer materials to maintain flexibility in subzero temperatures. High temperature sheaths are blended with higher durometer materials to prevent materials from becoming too soft in desert and tropical conditions. In various embodiments, a flame retardant is implemented with sheaths as discussed herein, such as a flame retardant that achieves a UL94 V-O vertical burn level. Such flame retardancy can be used to stop burning within 10 seconds and mitigates/prevents flaming drips. Controlling durometer and flammability at specific levels for specific conditions is relevant for a variety of applications such as military, law enforcement and civilian use, especially when the MPHD is used with ammunition and firearms.

IN some embodiments, MPHD sheaths have three main sections including upper, mid and lower sections, each performing separate functions which collectively operate as a system. In various embodiments, sheaths exhibit structural strength via a series of walls and platforms that create horizontal and vertical stability while continuing to allow flexibility. The walls and platforms may, for example, act in a similar fashion to the framework of a building, allowing the sheath to be strong and flexible while containing a large percentage of empty space.

In various embodiments, an upper section of a sheath is designed capture the barrel of a weapon. Beginning at the top outer corner, the sheath curves downward toward a midline. When two sheaths are attached to an MPHD, the upper surfaces create a widened V shape to guide the barrel of a weapon into a mid-section of the (combined) sheath, which houses the barrel. The sloping curve on the upper surface of the sheath ends at the top of the circular opening in the mid-section. A middle section of the sheath has a circular shape with openings at the top and bottom. An upper open space between the sheaths is designed to allow the barrel of a weapon to enter and exit the mid-section. The opening at the bottom of the mid-section is created by the center ridge.

The diameter of the circular opening can be varied depending on the type and size of weapon being secured. The framework of the sheath is based on the barrel diameter it will secure. For example, the MPHD may use 0.5" and 0.75" diameter openings. These two dimensions can accommodate a majority of long barreled weapons and are easily be interchangeable in seconds.

The lower section of the sheath includes elements for securing it to the MPHD. In some embodiments, flat sidewalls contain tracks for the track and rail attachment. A flat bottom of the sheath meets both side walls at 90 degree angles, creating a squared bottom designed to fit securely in the area between the end and center ridge walls, preventing lateral movement. In some implementations, lower portions of the sheath's end walls contain openings designed to accommodate locking mechanisms on the MPHD. These combined features allow the sheath to be slid on and off of the MPHD and lock the sheath in place when it is on the tracks. To unlock the sheath for removal, pressure is applied to one end of the sheath to disengage it from the locking mechanism. When the locking mechanism is disengaged, the sheath can be slid off of the rail in the direction of the disengaged locking mechanism. The MPHD sheath system can be implemented in conjunction with a strap-type component as described herein to secure weapons or other objects housed by the sheathing system. These and related approaches may, for example, be implemented in connection with FIGS. 36-42.

A variety of embodiments employ pressure fit components, such as for securing weapons. Metal clamps can be used for securing weapons in a variety of applications, such as military applications susceptible to adverse conditions such as in vehicles subjected to explosive devices. Some embodiments employ steel weapon clamps attached to an upper surface of a center ridge, with extending portions and locking tabs that secure the component to the MPHD using the pressure fit. When these components are used in potentially hostile environments, attachment to threaded inserts or via strap-type components as discussed herein can also be used. Components with varying clamp diameters can be used to accommodate weapons with varying barrel diameters, such as described above. FIGS. 55-58 show approaches with pressure fit components such as metal clamps, as may be implemented in various embodiments.

The four rails, four locking mechanisms, four 90 degree angles, center ridge, threaded inserts and strapping system combine to create a mounting and securing system that can accommodate any number of different shaped interchangeable components with mechanisms capable of securing any number of items, rifles, fishing poles, golf clubs, archery equipment, baseball bats, tools, rakes, shovels and other components.

In some implementations, an overmold component is coupled to a center ridge as discussed herein. For instance, an over molded resin on the top surface of the center ridge can provide an anti-slip surface to prevent an object such as a weapon barrel from moving. The center ridge can thus be implemented with a sheath as discussed herein to facilitate the securing of objects.

Figure 43:
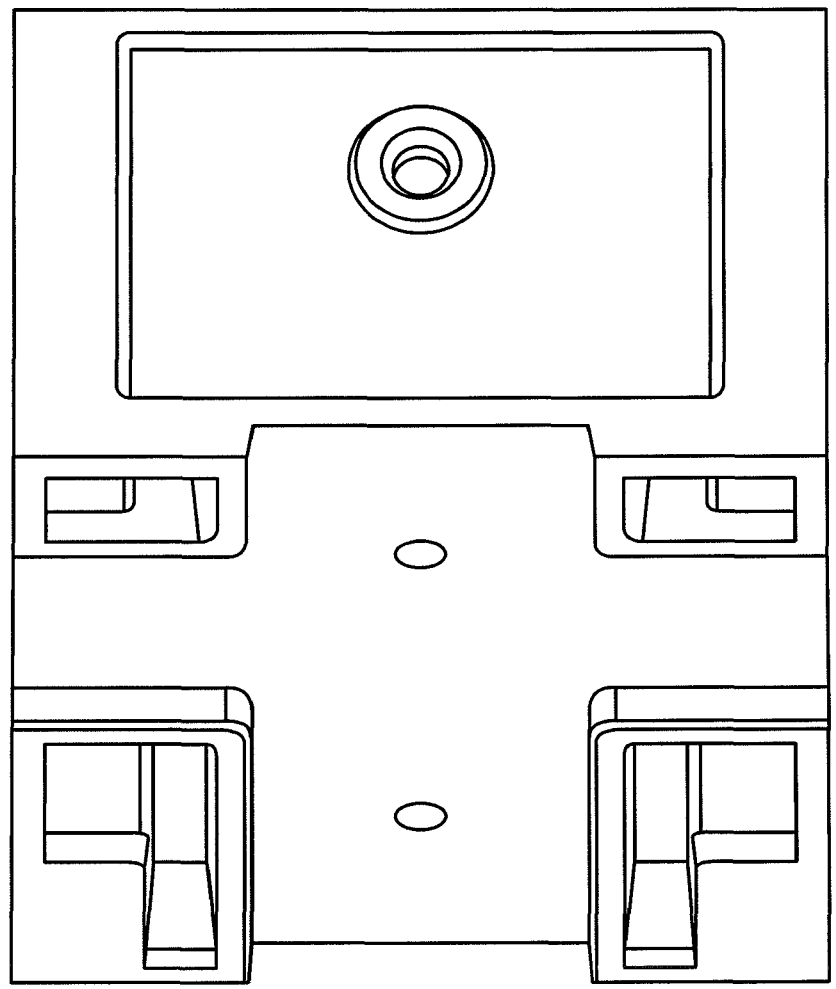
FIG. 43 depicts a lower platform for securing objects, consistent with embodiments of the disclosure.
Figure 44:
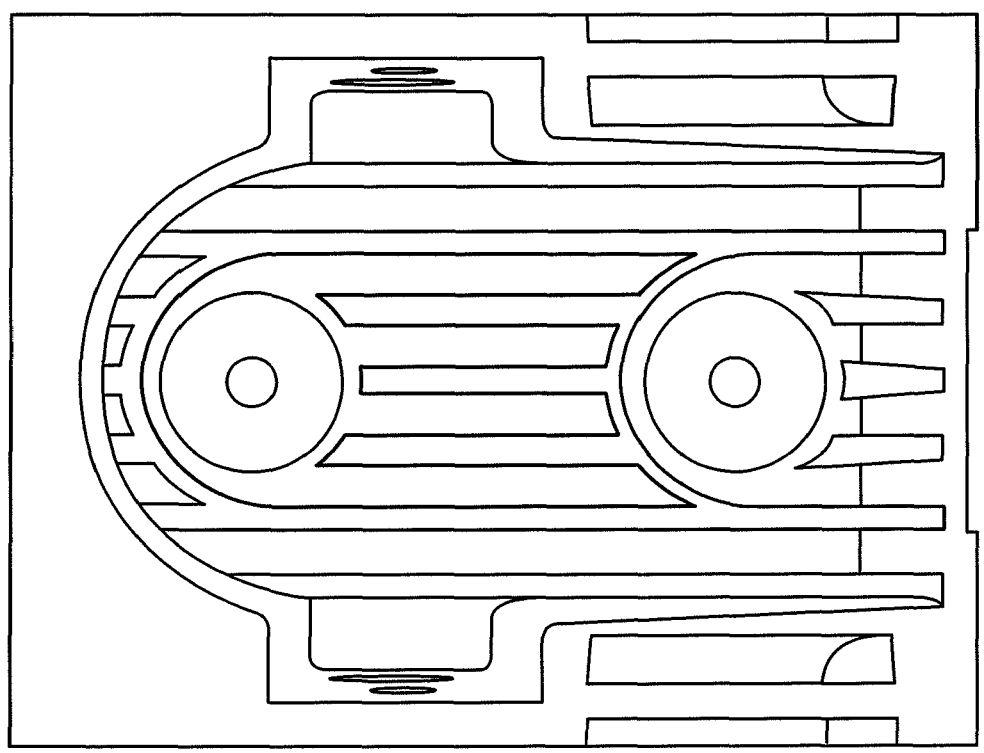
FIG. 44 depicts a lower platform for securing objects viewed from above, consistent with embodiments of the disclosure.
Figure 45:
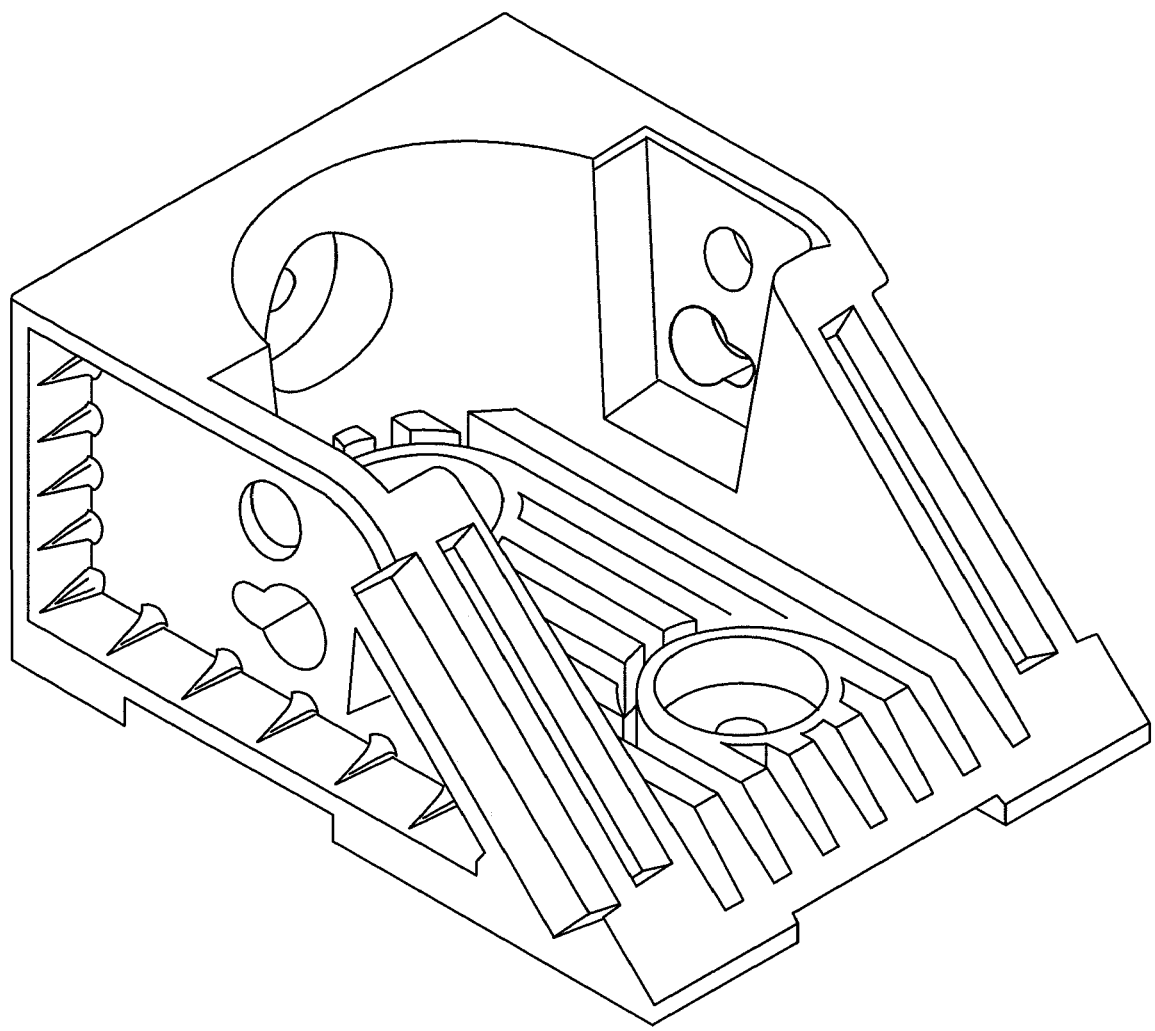
FIG. 45 depicts a lower platform for securing objects with grooves for removal of water and slots for fastening, consistent with embodiments of the disclosure.
Figure 46:
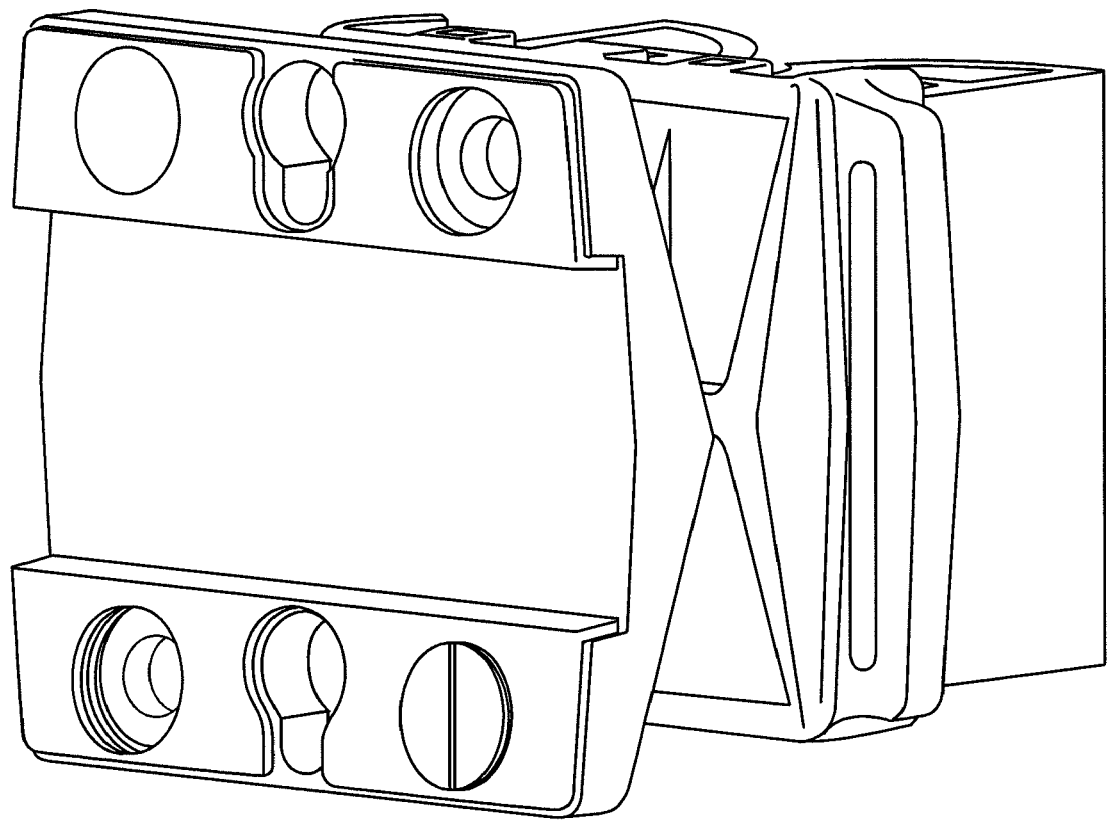
FIG. 46 depicts a platform for securing objects with threaded or pressure-fit magnet inserts, consistent with embodiments of the disclosure.
Figure 47:
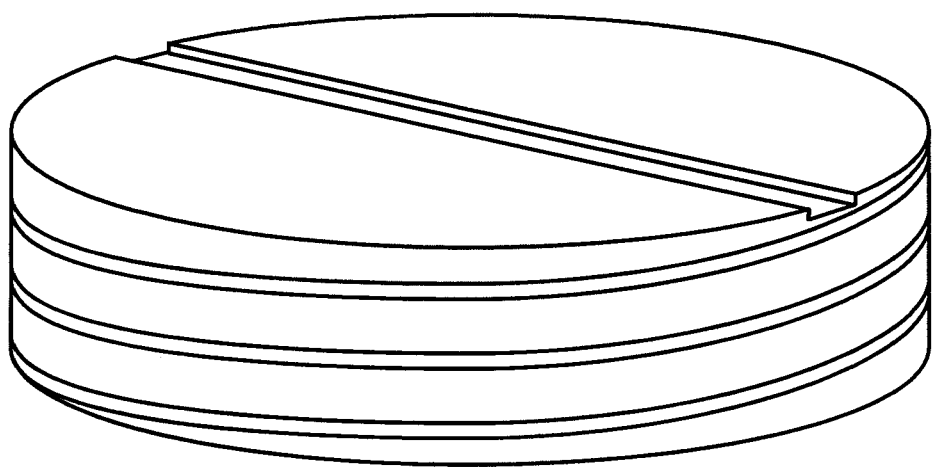
FIG. 47 depicts a threaded magnet insert, consistent with embodiments of the disclosure.
Figure 48:
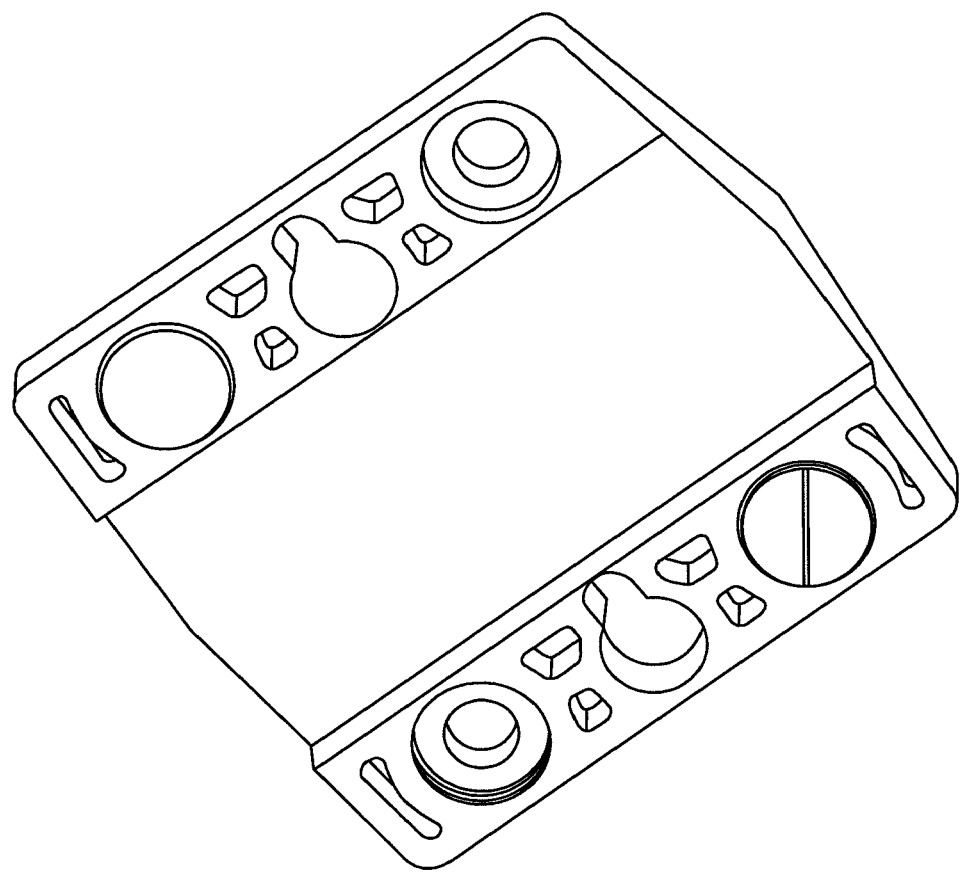
FIG. 48 depicts a platform for securing objects with threaded or pressure-fit magnet inserts, consistent with embodiments of the disclosure.
Figure 49:
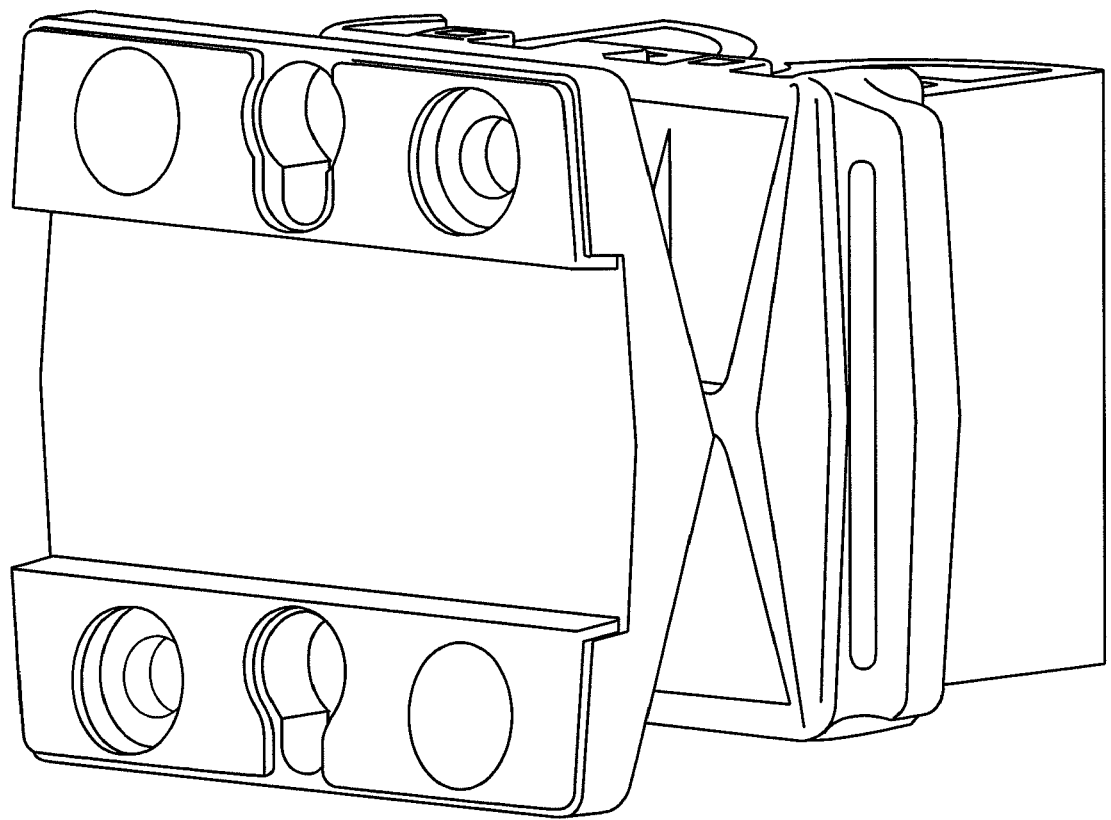
FIG. 49 depicts a platform for securing objects with pressure-fit magnet inserts, consistent with embodiments of the disclosure.

Lower support components such as those referred to as a butt plate kit (BPK) as may be implemented for sporting good objects or weapons can be implemented in a variety of manners. In some embodiments, such a component includes one or more of a slotted floor that facilitates strength and/or drainage, a flat back that facilitates coupling to a vertical surface such as a wall, and locking components. For example, raised slots can be used to divert water from a back portion of a BPK adjacent a surface interface (e.g., wall) to an open sloped front where the water drains out. The slots are positioned to channel water around fastening wells, preventing excessive moisture from seeping into any holes created by fasteners such as screws or bolts. The slots can also be implemented to elevate the floor of the BPK above the fastening wells, preventing the butt of a weapon or other object from being damaged by the heads of any fastening mechanisms such as nuts, bolt or screw heads. Conversely, the fastening well prevents the weapon from damaging the fastening mechanisms. FIGS. 43-45 show exemplary embodiments with such a lower support, including a platform with rigid support and mountable to a surface to secure a device such as a weapon; such approaches may also be readily implemented with a strap as shown in FIG. 65A.

In some implementations, the back of a BPK has a flat rectangular shape that allows it to be used as a mounting surface on any plane, and can accommodate Dual Lock attachment. Centered toward the top of the back wall is the opening from the fastening well on the inner surface of the wall.

In some embodiments, interior side walls of a BPK contain a recessed area designed to be used to attach or fasten the BPK to another surface. Outer walls of recessed areas contain key slot and circular holes. These holes can be used for multiple purposes. They can all be used to attach the BPK to another surface. Holes can also be used as a locking mechanism by feeding a cable lock through the hole on one side, then through an object being secured (such as through a weapon trigger guard) and out through a hole on the opposite side. This technique can secure multiple objects in multiple BPK's placed side by side. In some implementations, such BPK's are bolted into a floor, wall or other surface (at any plane) that prevent it from moving.

In some embodiments, recessed sections and holes are used to connect components to the BPK. When securing a weapon, the barrel and the butt can be secured. When securing fishing poles, the tip and the handle can be secured.

In some embodiments, fishing poles are secured using a horizontal device that secures the handles of the poles attached to vertical tabs having the same shape as the indented spaces in the side walls. The outer walls of the vertical tabs contain protruding molder shapes that mirror the key slot and circular holes on the BPK sidewalls. As the tabs are slid into the recesses of the sidewalls, the protruding key slot and circular pieces lock into the corresponding holes in the side walls. The tabs are positioned such that the combination of the tab shape and position keep the component locked in place. The underside of the horizontal element rests on the flat upper surface of the side walls of the BPK. In some implementations, channels in the underside of the horizontal component stabilize the component when locked in place. To remove the component, pressure is placed on the tabs through any of the holes from the outer wall.

The underside of an upper platform as discussed herein, such as an upper platform of an MPHD, is implemented in a variety of manners to suit particular embodiments. In some embodiments, the underside of an upper platform has a center stabilizing bar running the length of the platform in the direction of handles. The stabilizing bar provides support and strengthens the upper tray. Two of the supporting walls of the connecting stem attach to and become part of the stabilizing bar. The stabilizing bar has buttresses attached to it (e.g., ten total, five on each side). The buttresses provide support for and strengthen the outer edges of the tray. This design allows the MPHD to be both lightweight and extremely strong.

Connecting stems are implemented in a variety of embodiments, to connect an upper platform to a lower platform, such as with an MPHD device as discussed herein. In some embodiments, the stem has a cross-shaped design that withstands pressure from all four sides of both platforms. Two supporting walls of the connecting stem are connected to and become part of the center stabilizing bars of both the upper and lower platforms. Other supporting walls of the stem connect to the center buttress on both sides of the stabilizing bars on both platforms. Supporting walls of the connecting stem have a wide radius where they connect to both platforms, allowing pressure to be disbursed from above or below. Elliptical shaped holes are in each of the supporting walls connecting to the stabilizing bars. The holes are centered on the supporting walls between the platforms. The elliptical shape can run horizontally or vertically. The holes can be used to attach an MPHD to large objects such as a tree using a bungee cord or other attaching device.

The upper surface of a lower platform as described herein can be implemented in a variety of manners, in connection with various embodiments. In some embodiments, the upper surface has a stabilizing bar running the length of the platform and that stabilizes and strengthens the lower platform, which may mitigate additional stresses from engagement and disengagement. Two supporting walls of the connecting stem connect to and become part of the stabilizing bar. Buttresses connect to the stabilizing bar and provide support for and strengthen the upper surface of the tray. The center buttress on both sides of the stabilizing bar is shortened to allow for the placement of key slot attaching mechanisms in the center of both sides of the platform. Each of shortened buttresses also serves as a connecting point for one supporting wall of the connecting stem.

In some implementations, the lower platform contains holes in addition to key slots. The holes are placed on either side of the key slots on both sides of the platform, such as shown in connection with one or more of the Figures. These holes can be used to attach the MPHD using screws or bolts and nuts. An area around the holes on the upper surface of the platform is designed to be flat relative to securing the platform, instead of sloping like the other surfaces. The shape of the flat area is circular by the buttresses and radiates out to the edge of the tray. This design provides a flat surface for attaching devices such as washers, nuts, bolts or screw heads, may accommodate a washer, and may prevent movement. This shape and design also allows entry from the front or top of tools such as socket and standard wrenches.

In some implementations, the top of the lower platform and the bottom of the upper platform are ergonomically designed to allow a user to quickly and comfortably engage or disengage the unit. The open space between platforms, the buttresses and textured surfaces allow for a firm grip on both platforms and stem, even when wet. The space between the platforms allows for storage of a strap when not in use.

The underside of the lower platform is implemented in a variety of manners, to suit particular applications, such as for securing an MPHD to a wide range of surfaces. Fastening approaches may include, for example, Dual Lock, key slots, screws, bolts and magnets as discussed herein. To properly engage (attach together) two pieces of Dual Lock, a rocking motion can be employed, fastening the pieces from one end to the other. The platform design of the MPHD's molded base allows the user to quickly and securely grip the MPHD while engaging the Dual Lock with a rocking motion. The use of Dual Lock (e.g., SJ3550CF Dual Lock) can facilitate use of the MPHD to be used on any surface both vertically and horizontally on almost all surfaces and in all weather conditions without movement.

In some embodiments, the bottom of the lower platform has a horizontal channel which runs completely through it and is visible on either end of the platform. A fastener is placed in the channel. The open ends of the channel allow the MPHD to be rapidly secured, and allow a user to visually line up the fastener on the MPHD with the Dual Lock attached to the fastening surface. The channel is designed to be an exact depth, so that the fastener will not interfere with the other functions of the MPHD, but will be able to interact with another piece of the fastener. A clear foam adhesive can be used to blend with any resin color.

In certain embodiments, the bottom of the lower platform also contains circular cavities, one in each corner. The cavities are designed to serve several functions. The center section of the cavity has a hole that goes through the platform and is accessible from the upper surface of the platform. The holes (e.g., 0.250" diameter) are designed to accommodate screws or bolts used to attach the MPHD. The holes work in conjunction with the flat sections on the upper surface of the platform, such as shown in connection with one or more of the Figures. The diameter of the hole widens, creating a rim or ledge with the smaller hole in the middle. The remaining depth of the hole from the ledge to the lower surface of the bottom platform is designed to accommodate a magnet, such as shown in connection with FIGS. 46-49. Threads may be implemented on the interior walls of the holes to accommodate threaded magnets. These magnets can be installed or removed using a screwdriver. Non-threaded magnets can be pressure fit into the holes. Non-threaded magnets can be removed by pushing them out from above. This can be done from the upper surface of the lower platform through the screw/bolt holes. Using these holes, the MPHD can accommodate several magnets, such as shown in connection with the Figures.

In various embodiments, the flat surfaces on either side of the center channel on the underside of the lower platform are over molded with a Santoprene or similar resin. This material can prevent the MPHD from sliding on both horizontal and vertical planes. The over mold on the underside of the lower platform wraps around from the platform surface onto the sidewalls of the center channel. Strategically placed and shaped cavities in the MPHD act as anchors for the over molded material. Additionally, all over molded parts are connected as one unit. This design allows the over molded area on the upper platform to be connected to the over molded areas on the lower platform. This can be used to achieve individual over molded areas are much less likely to fall off over time.

In some embodiments, exterior surfaces of the MPHD are heavily textured to achieve a sandpaper like exterior for easy gripping even in wet conditions. The heavy texturing can be coupled with nylon construction to create a stealthy matt finish that won't reflect light. Components of the MPHD can be designed to function in extreme temperature ranges to assure proper functioning from Arctic to desert conditions, and can be replaceable.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. For example, the methods, devices and systems discussed herein may be implemented in connection with various military environments and various types of applications. In addition, methods described in this context, such as for holding a weapon, may be implemented for holding a variety of objects. As another example, two or more of the platform-type components may be used to secure an object together, such as two MPHR components as described above, with or without additional components. The disclosure may also be implemented using a variety of approaches such as those involving manufacturing variations and different uses of the various components of the system. Such modifications and changes do not depart from the true spirit and scope of the present disclosure, including that set forth in the following claims.

What is claimed is:

1. An apparatus comprising:
   a first device interface having a flexible structure coupled to a concave surface and being configured and arranged to flexibly secure to a first portion of a securable device via the concave surface;
   a first surface interface connected to the first device interface and configured and arranged with the first device interface to mitigate movement of the first portion of the securable device relative to a surface, in response to force applied to one of the first device interface and the securable device, by interfacing with the surface;
   a second device interface configured and arranged to secure to a second portion of the securable device; and
   a second surface interface connected to the second device interface and configured and arranged with the second device interface to mitigate movement of the second portion of the securable device relative to the surface, by interfacing with the surface,
   further including first, second and third rigid protrusions that are coupled to the concave surface, the second and third rigid protrusions extending along an edge portion of the concave surface, the first, second and third rigid protrusions extending parallel to one another, wherein:
   the first rigid protrusion protrudes along a central portion of a surface of the first device interface; and
   the second and third rigid protrusions are configured and arranged with the flexible structure to secure the flexible structure to the first device interface by applying a force that is about opposite in direction from a force applied to the flexible structure by the first rigid protrusion.

2. The apparatus of claim 1, wherein the first device interface and first surface interface are configured and arranged with the second device interface and the second surface interface, to secure the securable device to the surface via two different points of contact on the securable device that are separated by a distance, and therein prevent rotation of the securable device relative to the surface.

3. The apparatus of claim 1, wherein:
   the first device interface and first surface interface are incorporated in a first securing mechanism; and
   the second device interface and second surface interface are incorporated in a second securing mechanism.

4. The apparatus of claim 1, wherein
   the flexible structure is coupled to the rigid protrusions and configured and arranged to flexibly secure the first portion of the securable device to the first device interface via the concave surface.

5. The apparatus of claim 1, wherein the first surface interface is configured and arranged with the first device interface to mitigate movement of the first device interface and the first portion of the securable device relative to the surface, in response to force applied to one of the first device interface and the securable device, by interfacing with the surface.

6. The apparatus of claim 1, further including the securable device, wherein the first device interface and the second device interface are both secured to different portions of the securable device that are offset from one another by a distance, the securable device being configured and arranged to structurally affix the first device interface relative to the second device interface and to form a structural member of the apparatus.

7. The apparatus of claim 1, wherein the first surface interface is configured and arranged with the first device interface to mitigate the movement of the first portion of the securable device in response to force applied toward or away from the first device interface.

8. The apparatus of claim 1, wherein the flexible structure is coupled to the first rigid protrusion.

9. The apparatus of claim 8, wherein the second rigid protrusion is coupled to the first device interface, said first rigid protrusion and the second rigid protrusion being parallel to one another and configured and arranged to collectively mitigate movement of the first portion of the securable device relative to a first securing mechanism.

10. The apparatus of claim 1, wherein the rigid protrusions include latch regions and flexible structure includes:
    a center portion configured and arranged to engage with the first rigid protrusion, and
    at least two flexible arms that respectively extend, in different directions, from the center portion to an end portion, each arm at the end portion being configured and arranged to elastically engage with the latch regions upon application of a bending force and, via the engagement with the latch regions and upon release of the bending force, apply an elastic force that secures the center portion to the first rigid protrusion, thereby flexibly securing the first portion of the securable device to a first securing mechanism.

11. The apparatus of claim 1, wherein
    the second and third rigid protrusions have sidewall surfaces that extend parallel to and face one another; and
    the flexible structure includes:
    first opposing sidewall surfaces that respectively face and engage with the sidewall surfaces of the first and second rigid protrusions, and second opposing sidewall surfaces that respectively face and engage with facing sidewall surfaces of the first and third rigid protrusions.

12. The apparatus of claim 1, further including a support piece that physically connects the first device interface to the first surface interface, the support piece being configured to provide space between the first device interface and the first surface interface and to facilitate grasping via a human hand in the space.

13. The apparatus of claim 1, wherein the second surface interface is configured and arranged to mitigate movement of a second securing mechanism and the securable device, relative to the surface, in response to force applied to one of the second securing mechanism and the securable device in a direction toward or away from the surface.

14. The apparatus of claim 1, wherein
the second surface interface is configured and arranged to interface with the surface along a first plane, and
the second device interface is configured and arranged to secure the second portion of the securable device to the second device interface by extending around a portion of the securable device and applying a force to a surface of the securable device that faces away from the second device interface, and
inhibit movement of the second portion of the securable device in response to a force applied to the securable device in a direction away from the first plane.

15. The apparatus of claim 1, wherein
the second surface interface is configured and arranged to interface with the surface along a first plane, and
the second device interface has sidewalls configured and arranged to secure the second portion of the securable device to the second device interface and to inhibit movement of the second portion of the securable device in response to a force applied to the securable device in a direction along the plane.

16. The apparatus of claim 1, further including:
a third surface interface configured and arranged to secure to the surface; and
a connector configured and arranged to secure the third surface interface to the first surface interface by engaging with a first securing mechanism.

17. The apparatus of claim 1, wherein the second device interface has a supporting surface that extends in a direction away from said surface and that is configured and arranged to, when the second surface interface is connected to an about vertical surface, support the securable device while mitigating accumulation of liquid on the surface.

* * * * *